(12) United States Patent
Speidel et al.

(10) Patent No.: US 12,040,880 B2
(45) Date of Patent: Jul. 16, 2024

(54) CELLULAR CORE NETWORK AND RADIO ACCESS NETWORK INFRASTRUCTURE AND MANAGEMENT IN SPACE

(71) Applicant: Lynk Global, Inc., Falls Church, VA (US)

(72) Inventors: Tyghe Robert Speidel, Falls Church, VA (US); Charles E. Miller, Falls Church, VA (US)

(73) Assignee: Lynk Global, Inc., Falls Church, VA (US)

( * ) Notice: Subject to any disclaimer, the term of this patent is extended or adjusted under 35 U.S.C. 154(b) by 317 days.

(21) Appl. No.: 17/274,374

(22) PCT Filed: Sep. 6, 2019

(86) PCT No.: PCT/US2019/050030
§ 371 (c)(1),
(2) Date: Mar. 8, 2021

(87) PCT Pub. No.: WO2020/051508
PCT Pub. Date: Mar. 12, 2020

(65) Prior Publication Data
US 2022/0052753 A1 Feb. 17, 2022

Related U.S. Application Data

(60) Provisional application No. 62/727,972, filed on Sep. 6, 2018, provisional application No. 62/728,015, filed on Sep. 6, 2018.

(51) Int. Cl.
*H04B 7/185* (2006.01)

(52) U.S. Cl.
CPC ..... *H04B 7/18513* (2013.01); *H04B 7/18519* (2013.01)

(58) Field of Classification Search
CPC ........... H04B 7/18513; H04B 7/18519; H04B 7/18521; H04B 7/1851; H04B 7/18526;
(Continued)

(56) References Cited

U.S. PATENT DOCUMENTS 3,349,398 A 10/1967 Werth
4,218,654 A 8/1980 Ogawa et al.
(Continued)

FOREIGN PATENT DOCUMENTS

AU 714923 B2 1/2000
CN 1185252 A 6/1998
(Continued)

OTHER PUBLICATIONS

International Search Report and The Written Opinion of the International Search Authority, or the Declaration, dated Feb. 4, 2020, PCT/US2019/050030, 19 pages, ISA/US.
(Continued)

*Primary Examiner* — Farid Seyedvosoghi
(74) *Attorney, Agent, or Firm* — Haynes and Boone, LLP

(57) ABSTRACT

A cellular network management system manages terrestrial base station communications and orbital base station communications with user equipment to provide wireless service and allocate links among terrestrial base stations and orbital base stations according to base station availability determined from state space predictions.

18 Claims, 33 Drawing Sheets

(58) Field of Classification Search
CPC ....... H04W 4/02; H04W 4/022; H04W 4/027; H04W 16/10; H04W 84/06
See application file for complete search history.

(56) References Cited

U.S. PATENT DOCUMENTS

| | | | |
|---|---|---|---|
| 5,467,345 A | 11/1995 | Cutler, Jr. et al. | |
| 5,740,164 A | 4/1998 | Liron | |
| 5,841,766 A | 11/1998 | Dent et al. | |
| 5,943,324 A | 8/1999 | Ramésh et al. | |
| 5,978,653 A | 11/1999 | Taylor et al. | |
| 5,991,598 A | 11/1999 | Nawata | |
| 6,008,758 A | 12/1999 | Campbell | |
| 6,031,826 A | 2/2000 | Hassan | |
| 6,043,776 A | 3/2000 | Chiba et al. | |
| 6,084,865 A | 7/2000 | Dent | |
| 6,112,054 A | 8/2000 | Kita | |
| 6,157,621 A | 12/2000 | Brown et al. | |
| 6,278,861 B1* | 8/2001 | Ward | H04B 7/18567 455/430 |
| 6,404,769 B1 | 6/2002 | Kapoor | |
| 6,493,322 B1 | 12/2002 | Chennakeshu et al. | |
| 6,553,225 B1 | 4/2003 | Zhao et al. | |
| 6,606,309 B1 | 8/2003 | Wang | |
| 7,257,371 B1 | 8/2007 | Bettinger et al. | |
| 7,358,899 B1 | 4/2008 | Ville et al. | |
| 7,471,720 B2 | 12/2008 | Ram et al. | |
| 7,515,566 B2 | 4/2009 | Dale et al. | |
| 7,574,224 B2 | 8/2009 | Lane et al. | |
| 7,792,488 B2 | 9/2010 | Karabinis et al. | |
| 8,078,101 B2 | 12/2011 | Karabinis et al. | |
| 8,538,327 B2 | 9/2013 | Sayeed et al. | |
| 8,665,771 B2 | 3/2014 | Nam et al. | |
| 8,705,436 B2 | 4/2014 | Dutta et al. | |
| 8,914,536 B2 | 12/2014 | Beeler et al. | |
| 9,184,829 B2 | 11/2015 | Miller et al. | |
| 9,628,956 B1 | 4/2017 | Kim | |
| 9,788,306 B2 | 10/2017 | Chen et al. | |
| 9,888,426 B2 | 2/2018 | Ulupinar et al. | |
| 9,900,856 B2 | 2/2018 | Wu et al. | |
| 10,084,535 B1 | 9/2018 | Speidel et al. | |
| 10,742,311 B2 | 8/2020 | Speidel et al. | |
| 2001/0022779 A1 | 9/2001 | Wheatley, III et al. | |
| 2002/0097690 A1 | 7/2002 | Fleeter et al. | |
| 2002/0151273 A1 | 10/2002 | Marko | |
| 2002/0164986 A1 | 11/2002 | Briand et al. | |
| 2004/0090935 A1 | 5/2004 | Courtney | |
| 2004/0192197 A1 | 9/2004 | Capots et al. | |
| 2004/0192201 A1 | 9/2004 | Febvre et al. | |
| 2006/0246913 A1 | 11/2006 | Merboth et al. | |
| 2006/0285481 A1 | 12/2006 | Lane et al. | |
| 2007/0155316 A1 | 7/2007 | Monte et al. | |
| 2007/0184778 A1 | 8/2007 | Mechaley, Jr. | |
| 2007/0218931 A1 | 9/2007 | Beadle et al. | |
| 2008/0311844 A1 | 12/2008 | Eidenschink | |
| 2010/0039967 A1 | 2/2010 | Karabinis et al. | |
| 2010/0117901 A1 | 5/2010 | Uchida | |
| 2010/0322337 A1 | 12/2010 | Ylitalo et al. | |
| 2011/0013678 A1 | 1/2011 | Smith et al. | |
| 2011/0086638 A1 | 4/2011 | Medapalli | |
| 2012/0177085 A1* | 7/2012 | Fleeter | H04B 7/216 375/141 |
| 2012/0178363 A1 | 7/2012 | Moore, III | |
| 2012/0302160 A1 | 11/2012 | Silny et al. | |
| 2014/0105054 A1 | 4/2014 | Sægrov et al. | |
| 2014/0141784 A1 | 5/2014 | Schmidt et al. | |
| 2015/0146631 A1 | 5/2015 | Kim et al. | |
| 2016/0080072 A1 | 3/2016 | Baudoin et al. | |
| 2016/0132773 A1* | 5/2016 | Chandrasekaran | G06F 16/243 706/11 |
| 2016/0192235 A1 | 6/2016 | Ahluwalia et al. | |
| 2016/0204866 A1* | 7/2016 | Boroson | H04B 10/61 398/97 |
| 2016/0205560 A1 | 7/2016 | Hyslop et al. | |
| 2017/0127409 A1 | 5/2017 | Mishra et al. | |
| 2017/0215121 A1 | 7/2017 | Condeixa et al. | |
| 2017/0324465 A1 | 11/2017 | Sotom et al. | |
| 2017/0374596 A1 | 12/2017 | Benammar et al. | |
| 2018/0022474 A1 | 1/2018 | Meek | |
| 2018/0034538 A1 | 2/2018 | Baudoin et al. | |
| 2018/0160427 A1 | 6/2018 | Ravishankar et al. | |
| 2018/0183511 A1* | 6/2018 | Oga | H04B 7/208 |
| 2018/0254824 A1 | 9/2018 | Speidel et al. | |
| 2018/0254825 A1 | 9/2018 | Speidel et al. | |
| 2019/0181946 A1* | 6/2019 | Wendling | H04W 84/06 |
| 2020/0067661 A1 | 2/2020 | Siomina et al. | |

FOREIGN PATENT DOCUMENTS

| | | |
|---|---|---|
| CN | 108476057 A | 8/2018 |
| EP | 2999136 A1 | 3/2016 |
| JP | H04-207529 A | 7/1992 |
| JP | H11-502985 A | 3/1999 |
| JP | 2003115827 A | 4/2003 |
| JP | 2003134022 A | 5/2003 |
| JP | 2003-526959 A | 9/2003 |
| JP | 2009526501 A | 7/2009 |
| JP | 2013-526227 A | 6/2013 |
| JP | 2017-168898 A | 9/2017 |
| WO | 2006038992 A1 | 4/2006 |
| WO | WO 2012/177343 A1 | 12/2012 |
| WO | 2017/068201 A1 | 4/2017 |
| WO | 2017072745 A1 | 5/2017 |
| WO | 2017177343 A1 | 10/2017 |
| WO | 2017189862 A1 | 11/2017 |
| WO | WO 2018/004825 A1 | 1/2018 |

OTHER PUBLICATIONS

European Supplementary Partial Search Report issued in EP Application No. 19858031.8, dated Mar. 21, 2022.
European Supplementary Extended Search Report issued in EP Application No. 19858031.8, dated Jul. 29, 2022.
Coulomb et al., "Low Earth Orbit satellite payload for Personal Communications", 3rd European Conference on SatelliteCommunications—ECSC-3, 1993. (Year: 1993).
Ekici et al., "A Multicast Routing Algorithm for LEO Satellite IP Networks", IEEE /ACM Transactions on Networking, IEEE / ACM, New York, NY, US, vol. 10, No. 2, Apr. 1, 2002 (Apr. 1, 2002), pp. 183-192, XP058194575, ISSN: 1063-6692.
European Supplementary Partial Search Report issued in EP Application No. 18761611, dated Nov. 4, 2020.
European Supplementary Search Report issued in EP Application No. 18810437, dated Nov. 4, 2020.
European Supplementary Search Report issued in EP Application No. 18761611, dated Jun. 16, 2021.
Hemmati, "Laser Communications: From Terrestrial Broadband to Deep-Space" 2014 16th International Conference on Transparent Optiocal Networks (ICTON) IEEE, 2014.
International Search Report and The Written Opinion of the International Search Authority, dated May 17, 2018, in PCT/US2018/020205, 6 pages.
International Search Report and The Written Opinion of the International Search Authority, dated Nov. 19, 2018, in PCT/US2018/020778, 8 pages.
Office Action Issued for Eurasian Patent Application No. 201991901, 5 pages.
Radhakrishnan et al., "Survey of Inter-Satellite Communication for Small Satellite Systems: Physical Layer to Network Layer View", IEEE Communications Surveys & Tutorials, vol. 18, No. 4, Fourth Quarter 2016 (Year: 2016).
Search Report Issued for Eurasian Patent Application No. 202292710, 3 pages.

* cited by examiner

CELLULAR CORE NETWORK AND RADIO ACCESS NETWORK INFRASTRUCTURE AND MANAGEMENT IN SPACE

CROSS-REFERENCES TO PRIORITY AND RELATED APPLICATIONS

This application claims priority from and is a non-provisional of U.S. Provisional Patent Application No. 62/728,015 filed Sep. 6, 2018 entitled "Network Management and Resource Allocation in a Communication Network Having Both Orbital Nodes and Terrestrial Nodes in a Common Network" and of U.S. Provisional Patent Application No. 62/727,972 filed Sep. 6, 2018 entitled "Orbital-Based Cellular Network Infrastructure Management System".

The following patents/applications may be referenced herein:
1) U.S. patent application Ser. No. 15/857,073, filed Dec. 28, 2017 entitled "Method and Apparatus for Handling Communications between Spacecraft Operating in an Orbital Environment and Terrestrial Telecommunications Devices That Use Terrestrial Base Station Communications" (hereinafter "Speidel I");
2) U.S. Provisional Patent Application No. 62/465,945, filed Mar. 2, 2017 entitled "Method for Low-Cost and Low-Complexity Inter-Satellite Link Communications within a Satellite Constellation Network for Near Real-Time, Continuous, and Global Connectivity" (hereinafter "Speidel II"); and
3) U.S. Provisional Patent Application No. 62/490,298 filed Apr. 26, 2017 entitled "Method for Communications between Base Stations Operating in an Orbital Environment and Ground-Based Telecommunications Devices" (hereinafter "Speidel III").

The entire disclosures of the patents/applications recited above are hereby incorporated by reference, as if set forth in full in this document, for all purposes.

FIELD

The present disclosure relates to space communications networks that may operate to provide communications alongside terrestrial mobile cellular networks.

BACKGROUND

In a typical terrestrial cellular telecommunications network, a plurality of mobile devices communicates with a plurality of telecommunications infrastructure elements. This telecommunications infrastructure might comprise hardware that could include, but not be limited to, towers, antennas, radios, transceivers, digital signal processors, electrical cabinets, servers, computers, etc. This telecommunications infrastructure is typically organized by functionality and connects together as an integrated system to manage telecommunications traffic amount the various mobile devices which is serves. This integrated system may comprise one, or more, networks and networks themselves are typically designed to also connect to each other through a variety of interfaces and protocols. Some of these protocols and interfaces may include, but are not limited to TCP/IP, ISDN, SS7, etc. A terrestrial cellular network, and their functionalities, might be used in the context of a typical LTE cellular network, however, the structure and functionality behind this type of network could be used for other terrestrial cellular networks, such as a GSM, CDMA, EDGE, UMTS, etc. network.

FIG. 1 illustrates the high-level architecture for a typical LTE terrestrial cellular network. Each node in FIG. 1 represents an operating "node" in the network, which in some embodiments is implemented by software executed and hosted by electronic hardware. Each node may serve a specific function, or set of functions, and be responsible for control plane signaling and/or user plane traffic routing and has an interface to other nodes in the network to route control or user traffic. A visiting network 102 might host a radio access network (RAN) 106 and a core network 108. The visiting network may interact with a home network 104 which also hosts the same, or similar type of radio access network and core network as the visiting network. For simplicity, all elements might not be shown. A network can be a home network or a visiting network depending on the subscribing end user.

A radio access network might be an E-UTRAN and a core network might be an EPC. The E-UTRAN might comprise base stations 110 that enable communications with UEs 112 over an air interface (Uu). A base station might be a base station for an LTE network. Such base stations might be "Evolved Node B" or "UTRAN Node B" base stations, each often referred to as an "eNodeB" or "base station". The base station includes hardware to wirelessly connect a mobile phone network with mobile handsets (UEs).

The base stations may maintain a connection to each other to move control and user signaling, over the X2 interface. The base stations connect to the EPC through a control plane and user plane, S1-CP and S1-UP. The control plane interfaces to the MME 114 and the user plane interfaces to the S-GW 116. The MME may connect through another control interface to S-GWs, through the S11 interface; other MMEs through the S10 interface; and HSS databases 122 through the S6a interface. The EPC also hosts a P-GW 118. The P-GW has a control and user plane connection to the S-GW through the S5 interface in a home network. A similar connection can exist between an S-GW of a visiting network and a P-GW of a home network 120. This connection is the S8 interface and also includes a control and user plane. The P-GW maintains a control interface with the PCRF 124. P-GW maintain a connection to PDN Servers 126 through the SGi interface.

FIG. 2 illustrates the control plane protocol stack for each interface in the LTE network. This describes how each node connection to pass control traffic is implemented. Control plane interfaces might be wired or wireless. A UE stack 202 operates an application layer, IP layer, PDCP layer, RLC layer, MAC layer, and PHY layer to communicate with a base station stack 204 over the LTE-Uu interface 212. The base station stack relays application layer and IP layer protocol packets, but uses the PDCP, RLC, MAC, and PHY layers to coordinate air interface interactions and channel assignment, modulation scheme, encoding, HARQ, ARQ, etc. requirements. The base station stack routes traffic from UEs to the core network over the S1-U interface 214 to the S-GW stack 206. A tunneling protocol, GTP-U, is used to pass IP-based data packets between the base station and the S-GW. The S5 and S8 interfaces 216 are nearly identical to the S1 interface. However, the S-GW stack relays IP packets, and the P-GW stack 208 receives IP data packets. The P-GW acts as the serving node for routing IP traffic using the SGi interface 218 between the UE and the Packet Data Network (PDN) stack 210 that is providing back-end IP services for the end UE. The application layer that is compatible with the application layer on the UE exists on the PDN providing the application layer service (e.g., a smartphone application). The base station stacks 204 communicate with each other over the X2-U interface 220. The X2-U interface uses a tunneling protocol GTP-U and the SCTP transport layer to route IP data packets for end UEs during handovers between base stations, etc.

FIG. 3 illustrates the user plane protocol stack for each interface in the LTE network. This describes how each node connection to pass user traffic can be implemented. User plane interfaces might be wired or wireless. A UE stack 302 communicates with a base station stack 304 over the LTE-Uu interface 316. Non-access stratum (NAS) is a functional layer in the LTE wireless telecom protocol stacks between the MME stack 306 and the UE stack. The NAS layer is used to manage the establishment of communication sessions and for maintaining continuous communications with the user equipment as it moves through the network. The base station stack relays this layer between the MME and UE, and uses PDCP to transport radio resource control messages to the UE. The MME stack communicates with the base station stack over the S1-C interface 318. The MME uses SCTP to transport S1-AP protocol sessions based on NAS signaling. The MME communicates with the S-GW stack 308 over the S11 interface 320. This interface uses a tunneling protocol and UDP to transport IP packets. The S-GW stack also communicates with the P-GW stack 310 over the S5/S8 control plane interface 322, using a similar structure as the S11 interface. Additional interfaces exist, such as the X2-C interface 324 between UE stacks 304 that uses UDP to transport X2-AP messages. This is used for control signaling between base stations during UE handovers. MME stacks 306 communicate over the S10 interface 326. This uses UDP to transport tunneling protocol messages. The MME stack also communicates with the HSS database 312 over the S6a interface 328. This interface uses SCTP to transport Diameter messages. The same stack is used on the S7 interface 330 that connects the P-GW stack 310 to the PCRF database 314.

Mobile Handsets/Devices

Generally, individual users carry the mobile devices that operate on the network. These mobile devices are typically mobile phones or cellular phones, often referred to in more technical circles as the User Equipment (UE), or Mobile Station (MS). Mobile devices could also include Machine to Machine (M2M) or Internet of things (IoT) cellular devices or modules. For this description, mobile phones or end user devices of the network being described, may be referred to as UEs.

The UE might comprise hardware and a SIM card. The hardware might include a physical phone, or device, itself. The actual hardware can contain a set of digits known as the International Mobile Equipment Identity, or IMEI, of the device. This number is specific to the exact piece of hardware which it is on and is used to check if the physical device is marked stolen on the network and for other purposes. The physical device typically contains a transmitter and receiver so that it can interface with the cellular network over an air, or RF, interface. Along with the transmitter and receiver may be a digital interface such as a screen/keyboard, or an electrical interface such as GPIO pins, which can be used to control how the device access the network and sends and receives voice, text, or data payloads/packets.

UEs are also typically loaded with firmware and application layer software that allows the user to access certain functions. These functions may be voice calls, sending SMS messages, browsing the internet, or using other applications (e.g., messaging, games, streaming, etc.). The UE may require certain signal levels, or QoS, to achieve particular data rates over the air interface with the mobile network. As an example, SMS texting may operate successfully on relatively weak link levels (and thus lower order modulation schemes, with high coding overhead rates, and thus lower data rates) while video streaming may require higher data rates for reasonable download times and quality video stream (and thus higher order modulation schemes, with low coding overhead rates, and thus higher data rates). Typically, UEs are designed to access the cellular network on a variety of possible bands (e.g., frequencies) and protocols (e.g., GSM, LTE, UMTS, CDMA, etc.). Some smartphones might be referred to as "world phones" because they are designed to accommodate bands and protocols that enable the end user to travel the world and remain able to connect to local cellular network at various locations around the world despite differences in cellular protocols in use. This is because typical cellular band allocations for LTE, GSM, CDMA, etc. protocols are well established, and licenses have been allocated to specific MNOs in certain countries around the Earth.

The Subscriber Identity Module, or SIM, contains subscriber identity information for the user to use the networks. Of the various numbers and information stored on the SIM, one is the International Mobile Subscriber Identity (IMSI), which is a unique number that corresponds to a particular subscriber to a network. Some phones allow for multiple SIM cards, which means a single device could have multiple IMSIs. This enables end users to have local plans in multiple countries, or even the same country, if they prefer, which makes them a "home" user on multiple networks. SIM cards can also be swapped in and out of a device to change its subscriber identity and connect to different networks as a "home" subscriber. This technique may be favorable for users who travel often and do not seek to pay roaming charges every time they do travel.

Radio Access Networks

In order to access the network, the UE uses an air interface with a Radio Access Network (RAN) of a cellular network. A RAN, as the name suggests, can be a network that allows for access using radio frequency communications. The RAN serves as the interface between the mobile devices on a network and the core network of the telecommunications infrastructure itself.

In the LTE architecture, the RAN is often referred to as an Evolved UMTS Terrestrial Radio Access Network (E-UTRAN). The E-UTRAN typically comprises multiple base stations, which are the functional elements that implement the physical interface, or Uu, with the UEs. The physical interface is broken up in time and frequency as time slots and resource blocks (RB). RBs are assigned to UEs by the base station's scheduler, which may be driven by one of a variety of algorithms that optimize traffic flow depending on location, deployment configuration, coverage requirements, etc. Base stations within the network interface with each other through the X2 interface. This enables call/text/data packet forwarding and signaling mostly to support base station to base station handovers as UEs operate in a mobile fashion about the network. The base station also connects the UE to the core network, or Evolved Packet Core (EPC) in LTE networks, through the S1 interface.

The Core Network

The core network, often called the Evolved Packet Core (EPC) in LTE architectures, holds most of the authority functionality in a cellular network acting as the interface between the UE and other UEs on the network, the Internet, and other networks/devices with which the UE might need to communicate. Accessing other networks and the Internet allows subscribers to communicate with users not on their home network and upload/download data to/from the Internet for certain applications/servers. Even when UEs want to communicate with other UEs on the same home network, the EPC handles authentication allowing the UE access.

When using the LTE protocol, a core network typically comprises a Mobility Management Entity (MME), a Serving Gateway (S-GW), a Packet Data Network (PDN) Gateway (P-GW), and a Home Subscriber Server (HSS). In LTE, the MME hosts the Visitor Location Register (VLR), and the HSS hosts the Home Location Register (HLR), Equipment Identity Register (EIR), and an Authentication Center (AuC). The HLR, VLR, EIR, and AuC are databases managed by the EPC and are described later in more detail.

The Mobility Management Entity (MME)

Within the EPC there are several control and user plane interfaces. The E-UTRAN interfaces with the EPC via a control plane with the MME, called the S1-CP interface. The S1-CP interface uses the Non-Access Stratum (NAS) to manage the establishment of communication sessions and for maintaining continuous communications with the user equipment as it moves. The LTE S1-CP interface is responsible for delivering signaling protocols between the base station and the MME. The S1-CP interface comprises a Stream Control Transmission Protocol (SCTP) over IP and supports multiple UEs through a single SCTP association. It also provides guaranteed data delivery. The application signaling protocol is an S1-AP (Application Protocol). The LTE S1-CP is responsible for Evolved Packet System (EPS) bearer setup/release procedures, the handover signaling procedure, the paging procedure and the NAS transport procedure.

The MME also has control plane interfaces with other MMEs through the S10 interface; S-GWs through the S11 interface; and the HSS through the S6a interface.

The S11 interface between MMEs and S-GWs is usually a many-to-many interface, meaning a single MME can handle multiple S-GWs each one with its own S11 interface. These connections can be used to coordinate the establishment of SAE bearers within the EPC. SAE bearer setup can be started by the MME (default SAE bearer) or by the P-GW. Using the S11 Interface, the MME node can create or delete IP sessions, create or delete default bearers, create or delete dedicated bearers, add a rule to create or modify/update a dedicated bearer, perform UE Handover, perform X2 based UE Handover with S-GW relocation, and perform S1 based UE Handover with S-GW relocation.

The Serving Gateway (S-GW)

The E-UTRAN interfaces with the EPC via a user plane with the S-GW, called the S1-UP interface. The S1-UP interface provides non-guaranteed data delivery of LTE user plane Protocol Data Units (PDUs) between the base station and the S-GW. The transport network layer is built on IP transport and GTP-U. UDP/IP carries the user plane PDUs between the base station and the S-GW. A GTP tunnel per radio bearer carries user traffic. The S1-UP interface is responsible for delivering user data between the base station and the S-GW. The IP Differentiated Service Code Point (DSCP) marking is supported for QoS per radio bearer.

The S-GW provides IP routing services for packets to and from the UE and the core network using the GPRS tunneling protocol (GTP) by connecting with P-GWs via the S5 or S8 interface. In principle S5 and S8 is the same interface, except the S8 interface is used when roaming between different operators while S5 interface is used internal to a single (home) network. In the non-roaming case, the S-GW and P-GW functions can be performed in one physical node.

S5/S8 is a many-to-many interface and provides user plane tunneling and tunnel management between Serving GW and PDN GW. The S8 interface is used for Serving GW relocation due to UE mobility and if the Serving GW needs to connect to a non-collocated PDN GW for the required PDN connectivity. The S5 interface is the Inter-PLMN reference point providing user and control plane between the Serving GW in the VPLMN and the PDN GW in the HPLMN. S8 is the inter PLMN variant of S5.

The Packet Data Network Gateway (P-GW)

The P-GW is the node that terminates the SGi interface towards the PDN. If a UE is accessing multiple PDNs, there may be more than one P-GW for that UE. The P-GW provides connectivity to the UE to external packet data networks by being the point of exit and entry of traffic for the UE. A UE may have simultaneous connectivity with more than one P-GW for accessing multiple PDNs. The P-GW performs policy enforcement, packet filtering for each user, charging support, lawful interception and packet screening. This reference point provides connectivity between the P-GW and a packet data network. The SGi interface can provide access to a variety of network types including an external public or private PDN and/or an internal IMS service provisioning network.

Cellular Network Databases

An LTE network may manage a series of databases used for querying during operations to manage mobility of UEs, as well as authentication, billing, policy management, etc. The HSS is home to the HLR which is a database that contains administrative level information about each subscriber that can use its network. The HLR also contains fields which track the last known location of subscribers in the network. This information can be for locating devices when calls, messages, or data needs to be routed. When a user switches their mobile phone or device on or when they move to another Location Area Code (LAC) in the network, or perhaps over some regular periodicity, the mobile devices may update their location so that HLR always knows the latest location. Typically, the location of a device is kept in context of the network (e.g., what base station it is camped on) and not the actual latitude/longitude location of the device. There is typically only one master HLR in any network. However, copies of it may be distributed across various core network nodes for improved operational efficiency.

The HSS is the concatenation of the HLR and the AuC—two functions being already present in pre-IMS 2G/GSM and 3G/UMTS networks. The HLR part of the HSS is in charge of storing and updating when necessary the database containing user subscription information, including (list is non exhaustive): User identification and addressing—this corresponds to the IMSI (International Mobile Subscriber Identity) and MSISDN (Mobile Subscriber ISDN Number) or mobile telephone number; and User profile information—this includes service subscription states and user-subscribed Quality of Service information (such as maximum allowed bit rate or allowed traffic class).

The AuC part of the HSS is in charge of generating security information from user identity keys. This security information is provided to the HLR and further communicated to other entities in the network. Security information can be used for mutual network-terminal authentication, and radio path ciphering and integrity protection, to ensure data and signaling transmitted between the network and the terminal is neither eavesdropped nor altered.

The VLR is the smaller, and temporary version of the HLR in some ways, which contains select information from the HLR. Any "visitor", or UE that roams onto a base station controlled by an EPC that is not part of the home network, is placed on the VLR of the visiting network. A UE can usually only exist in one VLR at a time, which can be very important for network routing of traffic to that UE. The data stored in the VLR is either collected from the user's home network HLR or is collected directly from the UE itself through the base station. The VLR is used to inform the HLR of the home HSS of the updated position of the subscriber so that traffic routing can be completed between the separate networks. The user is removed from a VLR typically precisely when the subscriber becomes inactive for a set period of time (a period which can be configured/set for each network), when the UE roams into a new VLR domain location area, or when the user migrates back onto the home network.

The VLR may contain a portion of field values for each IMSI, including a TMSI, which effectively serves as temporary subscriber identity during roaming operations outside of the home network.

The EIR is a database that holds information of specific handset or mobile equipment, or devices, that could be connected, or try to connect, to the network. This database uses the IMEI to determine whether or not a device has the authority to access the network. Typically, when a phone is reported stolen, the IMEI of the device is put on a list in the EIR which associates it as a stolen device. As such, when the device tries to register to the network, the network can deny it access to prevent the potential thief of the phone from using it inappropriately.

Finally, the AuC is a database which contains information associated with device authentication to the network. The AuC is usually interfaced to the HLR and holds the important keys for a particular IMSI on a network. These keys are also resident on the UE SIM. Matching these keys allows for both device authentication and ciphering (or encryption) over the air interface channels. In roaming scenarios, this authentication keys/information are queried from the home HLR.

Network Operations Center

While the above described components of a terrestrial cellular network operate autonomously, a level of human interaction is typically implemented as well. The Network Operations Center, or NOC (sometimes also known as the Operations Management Center, or OMC) is the component of the network that enables control and monitoring of network infrastructure operations and status. This node in the network is not shown in FIG. 1 but it would maintain a connection to each element in the network. For instance, it can even be used to control the traffic load at the base station/E-UTRAN subsystem. The NOC typically has a connection to each base station, MME, S-GW, P-GW node in the LTE network.

A. Examples of Network Procedures

A network may implement a long list of procedures, but certain specific procedures are used most and can be critical to network functions, such as mobility management, use of spectrum, etc.

A.1 Authentication Procedures

An authentication procedure in an LTE network is used to both authenticate the user's identity (e.g., verify their subscriber number) and allow, or disallow, access to the network. Authentication leverages unique keys that are stored in the HSS, and executes processes on the UE and MME side of the network to compute values, and compare the result to verify authentication. Similar procedures are used for encryption and ciphering of non-access spectrum (NAS) (e.g., signals/packets on network routes) and access spectrum (AS) (e.g., signals/packets on RF interface between UEs and base stations).

FIG. 4 illustrates a typical process for UE authentication in the LTE network. The process involves the UE 402, a base station 404, an MME 406 and an HSS 408. The UE sends the MME a request to attach to a network 410. With this request, it sends its IMSI and other information about its UE handset capability, which the network might need for authentication and management of the air interface with the UE. The MME makes an Authentication Data request 412 to the home network HSS. This message might include a list of IMSIs that need authentication, along with some other information needed by the HSS to respond. The HSS provides a response to the MME 414 with what are called authentication vectors.

Each authentication vector contains an AUTN, XRES, KSAME, and RAND value associated with the output from executing an algorithm called the EPS AKA Algorithm. The MME passes the RAND and AUTN values to the UE through the base station 416. The UE performs the EPS AKA Algorithm using this information and then provides a response the MME 418 which contains the RES value. The RES value, should equal the XRES value calculated by the HSS and provided to the MME. The MME checks that this is true at 420 and if it is, the UE is authenticated to the network.

The MME, and UE, might then perform additional procedural steps 422 to accomplish ciphering and encryption of the AS (RF interface) and NAS (network control interfaces) sessions between the UE and the network. These procedures are similar in nature to authentication in that the UE and/or base station nodes might execute algorithms to calculate unique keys that are checked and verified before being used to encrypt traffic between the nodes. After these procedures are complete, the MME might accept the original attach request from a UE 424 and it may be officially attached to the network and able to move traffic.

Authentication is triggered when a UE first requests access to a network.

A.2 Location Update Procedures

In a classic mobile network, the location of each device might be tracked so that the network knows how to contact the UE that the network needs to deliver information to or from. The various tracking parameters that the networks use are described in herein elsewhere. The location of a UE on a network is tracked from a master database in the HSS. When the location of a UE changes, it is reflected in the HSS. When a UE is connected to a network that is not its own home network, the UE location is tracked by both the HSS and a VLR. The VLR temporarily stores subscriber authentication information, and the location of the UE within its network. When the UE location changes, the VLR might make a request to the HSS for a location update, so that the HSS is managing changing locations for the UE.

Under certain roaming conditions, the physical position of the MME and VLR on which a subscriber is located may be far away from the HSS that holds the important administrative information needed for the device to authenticate. When a query might be routed through the SS7, or another medium that interfaces the various terrestrial networks, authentication can sometimes occur over the course of minutes. When traffic loads are high and databases are located far away, particularly with respect to network procedures, these inter-network interactions can become slowed. As a result, initial access to a foreign network can sometimes lag. Once access is provided, however, typical speeds associated with cellular services typically resume.

Examples of triggers for when a UE might initiate a location update procedure are listed in Table 1.

TABLE 1

| Type | Trigger |
| --- | --- |
| New Tracking Area | Triggered when a UE moves to a tracking area that is outside the UE's list of registered tracking areas. |
| Timer Expiration | Triggered when a timer expires; the UE triggers a tracking area update procedure. The value of the timer might be initialized in an "attach accept message" by the base station during an attach procedure. |
| Tracking Area Update | Triggered by a need for registering with a CS domain for non-EPS service when the UE is already attached for EPS services. This involves completing an IMSI attach as part of the tracking area update procedure. |
| Detected Inter-System Change | Triggered by an inter-system change by registering for EPS service after an inter-system change, such as reselecting to LTE from UMTS. |
| CS-Fallback | Triggered by a CS-fallback; causes re-registration to LTE. |
| MME load balancing | Triggered when the UE initiates TAU procedure if the base station releases the RRC connection with a cause "Load Balancing TAU Required". |
| DRX cycle update | Triggered by the UE-specific DRX cycle being updated. |
| Closed Subscriber Group (CSG) Selected | Triggered by the UE selecting a CSG cell whose CSG Identity is not included in the UE's allowed CSG list. |

FIG. 5 illustrates the procedure for a typical location update or tracking area update. The involved nodes shown are the UE 502, base station 504, the new MME (e.g., new tracking area) 506, the old MME (e.g., old tracking area) 508, the S-GW 510, and the HSS 512. After an RRC connection set up has been made between the base station and the UE, the UE may initiate a Tracking Update Request 514. The base station may route the request 516 to the new MME. The new MME may request information via a context request 518 from the old MME, which it uses to perform authentication/security procedures with the UE. The Old MME might respond 520 to the new MME with the information it requested. The new MME then authenticates the UE 522. After successful authentication, the new MME may acknowledge the request context 524, from the old MME. It may then request a bearer modification 526 from the S-GW. The Bearer modification request from the new MME is responded to 528 and the New MME immediately requests a location update 530 from the HSS. The HSS cancels the current location 532 as being held on the old MME. After the cancellation is acknowledged 534 by the old MME, it acknowledges at 536 the location update request from the new MME. The new MME then accepts the UEs TAU request 538 and the UE acknowledges the completion of the location update procedure 540.

A.3 Handover Procedures

During UE mobility, there are inevitable instances where the UE needs to transition from one cell to another in the network. Each cell may be served by one eNB, and multiple eNBs may be served by one S-GW and/or MME. There are scenarios where only eNB handovers need to be conducted, and others where S-GWs need to be handed over as well. Some instances may even require a P-GW handover.

FIG. 6 illustrates how a handover might be conventionally conducted between eNBs and S-GWs. In the handover procedure, the involved elements are the UE 602, a source eNB 604, a target eNB 606, an MME 608, a source S-GW 610, a target S-GW 612, and a P-GW 614. A handover may be conducted after an IP session has already been established 616 between a UE and a P-GW through a source eNB and source S-GW. Measurement control messages from the UE to the source eNB may trigger a handover to be prepared 618 between it and a target eNB. The target eNB and source eNB can execute the handover 620 over the X2 interface. The source eNB begins forwarding data to the target eNB 622 so that it can downlink the data 624 to the UE. At this time, the uplink data 626 is moving through the target eNB, through the source S-GW, back to the P-GW. The downlink is provided through the same S-GW but through the source eNB and to the target eNB (through the X2 interface) before reaching the UE. The target eNB makes a path switch request 628 to the MME to switch the path of the IP packets to the target S-GW.

The MME makes a Create Session Request 630 to the target S-GW. The target S-GW will request that the P-GW modify the bearer for the UE 632. The P-GW provides a modify bearer response 634 and modifies the bearer to the target S-GW. The target S-GW responds to the MEE with a create session response 646 to indicate that it is prepared to bear the IP traffic from the UE through the target eNB. The MME will acknowledge 638 the original path switch request from the target eNB and the uplink and downlink data will flow from the UE to the target eNB, to the target S-GW, to the P-GW 640. This marks the completion of the S-GW handover, so the link where downlink data used to be forwarded from the source eNB is released 642. The MME deletes the session provided by the original source S-GW 644 and the source S-GW responds 646 after closing the session. After the S-GW handover, the UE may need to update its tracking area and does so with the MME 648.

A.4 Master Information Block (MIB) and System Information Blocks (SIB) Transmission Procedures.

An MIB or Master Information Block is a message or information that is broadcasted by a LTE base station irrespective of any users' presence. The MIB is first among the other system information blocks or SIB, that are also broadcasted by the base station.

The MIB is transmitted using a physical layer channel called PBCH or Physical Broadcast Channel on downlink. The MIB is a 24-bit value encoded as shown in Table 2.

TABLE 2

| Type | # of Bits |
| --- | --- |
| System Bandwidth | 3 bits |
| PHICH information | 3 bits |
| Normal/Extended PHICH | 1 bit |
| PHICH Ng Value | 2 bits |
| System Frame | 8 bits |
| Reserved for Future Use | 10 bits |

Apart from the information in the payload, the MIB CRC also conveys the number of transmit antennas used by the base station. The MIB CRC is scrambled or XORed with an antenna specific mask.

There may be multiple System Information Blocks, each block transmitted with some periodicity, and each containing important information for network access. As an example, the SIB1 block may contain one or more of the variables set forth in Table 3.

TABLE 3

| Variable Name | Variable Value |
| --- | --- |
| PLMN-Identity | Comprises MCC and MNC. The first listed one is the Primary PLMN |
| p-Max | Value applicable for the cell. If absent the UE applies the maximum power according to the UE capability. If base station configures the value more than the value supported by the UE then UE may set the max value supported by the UE capability. Example UE Category 3 supports max 23 db |
| cellReservedForOperatorUse | As defined by operator (Reserved/Not_reserved) |
| trackingAreaCode | TAC which is common to the PLMN Identities |
| cellIdentity | Identifies a cell within the PLMN |
| cellBarred | If Barred then UE is not allowed to camp on the cell |
| intraFreqReselection | If enabled, UE may be able to perform Cell-reselection to INTRA-frequency cells |
| q_RxLevMin | Minimum required RX level in the cell |
| q_RxLevMinOffset | Actual value Qrxlevminoffset = IE value * 2 [dB]. Possibly only applied when a cell is evaluated for cell selection as a result of a periodic search for a higher priority PLMN while camped normally in a VPLMN [5] . During this periodic search for higher priority PLMN the UE may check the S criteria of a cell using parameter values stored from a different cell of this higher priority PLMN. Affects minimum required Rx level in cell. |
| freqBandIndicator | indicates the E-UTRA operating band |
| schedulingInfoList | information regarding the presence of SIB type; other than SIB1 |
| si_Periodicity | Periodicity of the SI-message in radio frames (SI may be transmitted within the specified radio frame) |
| sib_MappingInfo | Carries the List of the SIBs mapped. SIB2 is always present in the first element of schedulingInfoList |
| si_WindowLength (ms) | Specifies that a SIB should be transmitted somewhere within the specified window length. This window starts a tthe starting sub-frame of the mentioned si_periodicity. SIBs can be received in any of the sub-frame as mentioned in the WindowLength. |
| systemInfoValueTag | Indicates if a change has occurred in the SI messages. UEs may use systemInfoValueTag, e.g., upon return from out of coverage, to verify if the previously stored SI messages are still valid. |

B. IP Address Allocation in LTE

LTE networks are often all-IP networks, in that they deliver all user traffic in IP packets, and provide users with "always-on IP connectivity". When a UE joins an LTE network, a Packet Data Network (PDN) address (i.e., the one that can be used in the PDN) is assigned to the UE for its connection to the PDN, and a default bearer is established in the LTE network (i.e., between UE and P-GW). This default bearer remains connected (i.e., the IP address assigned to the UE during the initial attach remains valid) until the UE is detached from the LTE network. A default bearer is established for each APN (Access Point Name) a user has, and thus a unique IP address is assigned for each APN. An IP address can be an IPv4, IPv6 or IPv4/IPv6 type.

When UE initially attaches to an LTE network, it requests for a PDN connection. Then a P-GW allocates an IP address (i.e., PDN address) to be used by the UE for the PDN, and forwards it to the UE while a default bearer connecting the two is being established. With this IP address, the UE can use services provided through the PDN.

IP addresses can be allocated either statically, or dynamically, in an LTE architecture. Typically, IP addresses are assigned dynamically because of limited IP pools in each P-GW. The limited availability of IP addresses is typically associated with IPv4 systems but is less of an issue with IPv6 systems.

In case of dynamic IP allocation, the network (e.g., P-GW) automatically selects an IP address for UE. The network operator has IP pool(s) provisioned at the P-GW in advance. Then later when UE initially attaches to the LTE network, the P-GW dynamically allocates an IP address to the UE. So, a new dynamic IP address is typically allocated to the same UE every time it initially attaches to the network.

In the case of static IP allocation, the network operator allocates a permanent IP address to each UE upon their subscription to the network. The operator has an allocated static IP address provisioned for UE in the network (HSS) along with other subscription information. Then later when the UE initially attaches to the LTE network, the P-GW obtains the static IP address from HSS and forwards it to the UE. So, this particular IP address is allocated to the UE every time it initially attaches from then on.

C. Cellular Network Numbering and Addressing

A mobile network is typically managing mobile devices, and thus might implement different types of geographical areas and addresses, in order to function properly, as UEs attach and detach from base stations in the network managed by different network EPC nodes.

C.1 Geographical Areas

An MME pool area is a geographical area that is controlled, or serviced by a particular MME, or set of MMEs. The MME area is a physical geography through which a mobile device can operate before it the MME that is serving it might change. An S-GW tracking area is a geographical area that is controlled, or services by a particular S-GW or set of S-GWs. In this geographical area, a UE can operate without changing servicing S-GW.

Tracking areas refer to the smallest geographical areas used by the network. MME pool areas comprise S-GW tracking areas which themselves comprise these smaller tracking areas. A tracking area may be as small as a specific cell tower cell, or group of cell tower cells (perhaps a geographical represented closely by a circle of some radius—ranging from a few km in radius to up to 100 km in radius). These tracking areas are similar to Location Area Codes (LACs) used in the GSM or tracking areas used in UMTS and are used, as the name suggests, to track the locations of mobiles on the network that are on standby (e.g., connected to the network and ready to move or receive traffic).

An LTE network therefore comprising many MME areas, even more S-GW tracking areas, and even more tracking areas.

C.2 Network Identifications

The network also manages a host of numeric identifiers which are used as network level addresses. Network IDs are used to define the network itself. The network is identified using a Public Land Mobile Network (PLMN) code, which is a combination, or concatenation, of two unique identifiers, the Mobile Country Code (MCC) and Mobile Network Code (MNC). The MCC is a three-digit code and the MNC is a two- or three-digit code, making the PLMN a 5 or 6 digit code when the two are concatenated.

Each MME in the network is provided a unique identifier known as the MME code, or MMEC, which identifies a particular MME in each of the network MME pools. MMEs that are grouped within the same MME tracking area are given a group level code called the MME Group Identity, or MMEGI. For each MME in the network, another identifier is used, which concatenates the MMEC and the MMEGI, creating the MME identifier, or MMEI, which identifies a particular MME in the entire network. Finally, the PLMN and the MMEI are concatenated to create the Globally Unique MME Identifier, or GUMMEI, which identifies a specific MME anywhere in the entire world.

Tracking areas are identified with codes in a similar fashion as well. A Tracking Area Code, or TAC, is used to identify a specific tracking area within a certain network. This number is concatenated to the PLMN to create the Globally Unique Tracking Area Identity, or TAI, which identifies a unique tracking area across the Earth.

Each cell within a network is also provided a Cell ID so that the specific tower that is needed to communicate with a UE is known and tracked. This Cell ID is often referred to as the E-UTRAN Cell Identifier, or ECI. This value uniquely identifies a cell within a particular network. There is also the E-UTRAN cell global identifier, or ECGI, which identifies a unique cell anywhere on the planet. There is also the physical Cell ID of a tower, which is typically a numerical value between 0 and 503 and is used to differentiate it from its neighbor cells in nearby geographies.

There are Mobile Equipment identifiers to track specific UE hardware as it operates on the network. As mentioned previously, each UE has two unique identifiers, one for the hardware and one for the SIM. The International Mobile Equipment Identity (or IMEI) is used to identify a unique handset hardware. The International Mobile Subscriber Identity (or IMSI) is used to identify a unique subscriber (e.g., SIM) on the network. There is also an M Temporary Mobile Subscriber Identity (or M-TMSI) which is used to identify a specific UE to its serving MME. By concatenating the M-TMSI code to the MMEC, the network generates a S Temporary Mobile Subscriber Identity (or S-TMSI) which is used to identify a specific UE to its serving MME pool tracking area. Finally, concatenating the PLMN, the MMEGI, and the S-TMSI creates the Globally Unique Temporary Identify, or GUTI. The GUTI identifies a unique UE and its temporary address anywhere on the planet.

D. Radio Protocol Architecture

A radio protocol architecture might be defined by two separate planes: a control plane and a user plane. Each node interface in the network may implement a control plane, a user plane, or both. The control plane is where network signaling is packaged and transported between various nodes in the network. In the control plane, typically the Radio Resource Control, or RRC, protocol generates the signaling messages that control how information is passed between the UE and the cellular network. These signaling messages are transported using the appropriate signaling bearers.

The user plane is where actual data, or telecommunications payloads, are transported between UEs and throughout the network. Typically, applications create data packets that are processed by protocols such as TCP, UDP, or IP. For both the control and user planes, information or signaling packets are processed by the packet data convergence protocol, or PDCP, the radio link control protocol, or RLC, and the Medium Access Control protocol, or MAC, before finally being passed to the physical, or RF, layer for wireless transmission to UEs connected to the network.

FIG. 7 illustrates the base station radio protocol stack architecture. A base station 706 maintains an interface with a MME 704 and an S-GW 702 to move required control and user traffic, respectively. The base station 706 has a radio resource control function (RRC) 708 that handles the communication with the MME. The radio resource control function may include some supporting scheduling function, which is used to provide additional information related to the control messages sent to the lower layers in the protocol stack. Together the PDCP 710, RLC 712, MAC 714, and PHY 716 transport user and control traffic between the UE and the appropriate control and user planes in the network. The PDCP acts as the transport layer, taking user and control messages, and creating a common transport channel. The radio link control layer packetizes user and control information into packets.

The PHY 716 carries information from the MAC transport channels over the air interface, and takes care of the link adaptation AMC, power control, cell search for initial synchronization and hand over purposes and other measurements inside the LTE system and between systems for the RRC layer.

The MAC 714 layer is responsible for mapping between logical channels and transport channels, multiplexing of MAC SDUs from one or different logical channels onto transport blocks TB to be delivered to the physical layer on transport channels, demultiplexing of MAC SDUs from one or different logical channels from transport blocks TB delivered from the physical layer on transport channels, scheduling information reporting, error correction through HARQ, priority handling between UEs by means of dynamic scheduling, priority handling between logical channels of one UE, and logical channel prioritization.

The RLC 712 operates in three modes of operation: Transparent Mode TM, Unacknowledged Mode UM, and Acknowledged Mode AM. The RLC Layer is responsible for transfer of upper layer PDUs, error correction through ARQ (only for AM data transfer), concatenation, segmentation and reassembly of RLC SDUs (only for UM and AM data transfer). RLC is also responsible for re-segmentation of RLC data PDUs (only for AM data transfer), reordering of RLC data PDUs (only for UM and AM data transfer), duplicate detection (only for UM and AM data transfer), RLC SDU discard (only for UM and AM data transfer), RLC re-establishment, and protocol error detection (only for AM data transfer).

The PDCP 710 Layer is responsible for header compression and decompression of IP data, transfer of data (user plane or control plane), maintenance of PDCP Sequence Numbers SNs, in-sequence delivery of upper layer PDUs at re-establishment of lower layers, duplicate elimination of lower layer SDUs at re-establishment of lower layers for radio bearers mapped on RLC AM, ciphering and deciphering of user plane data and control plane data, integrity protection and integrity verification of control plane data and timer-based discard, duplicate discarding. PDCP is used for SRBs and DRBs mapped on DCCH and DTCH type of logical channels.

The services and functions of the radio resource control function (RRC) 708 sublayer include broadcast of System Information related to the non-access stratum NAS, broadcast of System Information related to the access stratum AS, Paging, establishment, maintenance and release of an RRC connection between the UE and E-UTRAN, security functions including key management, establishment, configuration, maintenance and release of point to point radio bearers.

The non-access stratum NAS protocols used by the MME 704 and the UE form a stratum of the control plane between the user equipment UE and MME. NAS protocols support the mobility of the UE and the session management procedures to establish and maintain IP connectivity between the UE and a P-GW.

D.1 User Plane

The protocol stack between the base station and the UE comprises PDCP, RLC, MAC, and PHY layers. Within the user plane, packets are packaged within the core network in a specific EPC protocol and tunneled between the P-GW and the UE through the S-GW and the base station. This protocol may be an IP protocol, as an example.

D.2 Control Plane

The control plane includes each of the layers in the user plane with the addition of the radio resource control, or RRC, layer. The RRC layer is responsible for configuring and controlling the lower layers of the protocol (the PDCP, RLC, and MAC layers). The control plane, unlike the user plane, handles air interface specific functionality between the UE and the RAN in the cellular network. The base station usually employs a scheduler algorithm which drives the RRC and how it assigns RBs, time slots, MCS, etc. for each UE under its control. Typically, these scheduler algorithms are informed solely from control traffic feedback to the RRC from the PDCP layer. These algorithms usually try to optimize for throughput across a given base station cell.

Depending on the state of certain UEs, the cellular network may interact with the UEs in a particular mode: idle mode or connected mode.

Idle mode is when a UE is said to "camp" on a cell. A UE can camp on a cell after it has "selected" it. A UE selects a cell based on a number of factors including, radio link quality, cell status, and radio access technology. While in idle mode camping on a cell, the UE might monitor a paging channel, or control channel, to detect incoming calls and acquire important system information. In this mode, the control plane protocols include cell selection and reselection procedures.

Connected mode is when the UE is actively moving traffic between itself and the cellular network (e.g., on a phone call, or conducting an Internet connection session, etc.). During this mode, the UE may report the downlink channel quality to the RAN (e.g., E-UTRAN) for the currently selected cell as well as the neighbor cell information. This enables the RAN to select the most suitable cell for the UE to utilize and in this case, the control protocol includes the RLC protocol, which ultimately conducts handovers and mobile cell selectivity management on the mobile network side.

FIG. 8 illustrates the typical cell search procedure that a mobile device may use when operating on and between networks.

D.3 Cell Synchronization and Selection Procedure

Cell synchronization is the very first step when UE wants to camp on any cell. From this, UE acquires physical cell ID (PCI), time slot and frame synchronization, which may enable the UE to read system information blocks from a particular network.

The UE might tune its radio by tuning to different frequency channels depending upon which bands it is supporting. Assuming that it is currently tuned to a specific band/channel, the UE first finds the primary synchronization signal (PSS), which is located in the last OFDM symbol of first time slot of the first subframe (subframe 0) of radio frame. This enables the UE to be synchronized on a sub-frame level. The PSS is repeated in subframe 5, which means the UE is synchronized on a 5 ms basis since each subframe is 1 ms. From the PSS, the UE is also able to obtain a physical layer identity (0 to 2).

In the next step, the UE finds the secondary synchronization signal (SSS). SSS symbols are also located in the same subframe of PSS but in the symbol before the PSS. From the SSS, the UE is able to obtain a physical layer cell identity group number (0 to 167).

Using the physical layer identity and the cell identity group number, the UE knows the PCI for its cell. In LTE 504, physical layer cell identities (PCI) are allowed and are divided into unique 168 cell layer identity groups where each group comprises three physical layer identities. As mentioned earlier, the UE detects the physical layer identity from the PSS and the physical layer cell identity group from SSS. Assuming a physical layer identity=1 and cell identity group=2, then the PCI for given cell is PCI=3*(physical layer cell identity group)+physical layer identity=3*2+1=7.

Once the UE knows the PCI for a given cell, it also knows the location of cell reference signals. Reference signals are used in channel estimation, cell selection/reselection and handover procedures.

As a result of the PCI, the UE can discern the target base station from other base stations using the same spectrum block deployment, allowing for a network frequency reuse scheme of one, in most cases. After the cell synchronization procedure, the UE can proceed to read the Master Information Block (MIB) and the System Information Blocks (SIB). The MIB and the SIB are information blocks that are transmitted on downlink control channels, which contain required information in order for the UE to appropriately access the network over the air interface.

E. Cellular Network Radio Access Technologies PHY

As has been described, the cellular network uses a RAN to implement an air, or RF, interface to connect the UEs on the network to the Internet or other networks. The protocols for communication between UEs and RANs might be such that they are standardized so that any standard UE can communicate with any RAN, assuming air interface link requirements are met and membership requirements are met, e.g., that the UE has identified itself to the network in such a manner that the network, or a service that the network uses, determines that the UE is a member of an authorized group or otherwise authorized to use the services provided by the network. The air interface usually implements a particular protocol, which is often referred to as a specific Radio Access Technology (RAT).

Some example RAT protocols include the GSM protocols, sometimes referred to as 2G, or "second generation", network protocols. Other examples include GPRS (General Packet Radio Services), EDGE (Enhanced Data rates for GSM Evolution, or EGPRS), 3G (third-generation 3G UMTS standards developed by the 3GPP body), or fourth-generation (4G) LTE Advanced protocols.

In these protocols, there are rules for spectrum band use, timing, encoding and conflict resolution. As a base station is likely to have to communicate with many UEs at the same time, the available wireless communication pathway is divided up according to the protocol. A given protocol might have the available wireless communication pathway divided up by frequency, time, code or more than one of those. This allows multiple users to share the same wireless communication pathway.

F. RF Air Interface Link Budget

The RF air interface between the UE and the RAN is what can drive the quality of the connection between the UE and the mobile network. As the signal quality of the RF air interface connection goes up, so does the data rate at which this link can be maintained at a sufficient bit error rate. The UE and the base station might exchange information about the quality of the link connection with each other using the control plane of the LTE protocol. Using this information, the base station can manage link conditions such as modulation and coding scheme (MCS) and device transmit power to ensure that the bit error rate does not exceed a certain threshold. Depending on the type of service that is desired, the bit error rate threshold may vary anywhere between 10^-2 and 10^-8 or better. Applications such as SMS messaging, SMS broadcast, or control channel signaling may operate on the highest bit error threshold and applications such high definition video streaming may operate on the lowest bit error threshold. To maintain a certain bit error rate (BER), the base station might manage which modulation and coding scheme (MCS) is used with each UE that it communicates with over the air interface.

Each MCS provides a certain data rate over the air interface, but the MCS that enable higher data rates have different requirements for the quality of the RF signal being received over the air interface. Waveforms that are articulated over an air interface with a given modulation scheme and coding scheme, may have a different bit error rate as a function of the signal-to-noise ratio plus interference ratio of the signal of interest, or SINR. The SINR is a measure, in dBs, of the difference between the energy of the signal of interest and the energy of the noise and interference combined. Certain modulation schemes, such as QPSK, offer good bit error rates at low SINR levels, however QPSK modulation uses only two bits per modulated symbol and lower data rates than higher order modulation schemes. Higher order modulation schemes, such as 64QAM, offer good bit error rates only at very high SINR levels, however 64QAM offers six bits per modulated symbol and higher data rates compared to the lower order modulation schemes.

Higher order modulation schemes leverage amplitude modulation in addition to phase modulation to increase bits per symbol, however, this is what drives the requirement for more precise signal demodulation, which in turn increases the required signal energy for sufficient demodulation at a certain bit error rate.

Table 4 describes signal energy to noise requirements can vary with modulation scheme and coding rate.

TABLE 4

Required Base Band SNR for Coding Rate and Modulation Scheme

| Modulation | Code Rate | SNR (dB) |
|---|---|---|
| QPSK | 0.13 | −5.1 |
| | 0.20 | −2.9 |
| | 0.25 | −1.7 |
| | 0.33 | −1.0 |
| | 0.50 | 2.0 |
| | 0.67 | 4.3 |
| | 0.75 | 5.5 |
| | 0.80 | 6.2 |
| 16 QAM | 0.50 | 7.9 |
| | 0.67 | 11.3 |
| | 0.75 | 12.2 |
| | 0.80 | 12.8 |
| 64 QAM | 0.67 | 15.3 |
| | 0.75 | 17.5 |
| | 0.80 | 18.6 |

G. Other Considerations

In terrestrial mobile communications networks, base station deployments drive the coverage geography of the network. In most cases, base station radio equipment is placed on towers to coverage geographic areas with high population densities, where revenue can be generated. A typical tower hosting base station equipment may cost a certain amount of money to install and operate as a function of each square mile that it covers. Costs can include power, utilities, backhaul, maintenance, security, etc. and can vary as a function of site, region, etc. In order for a base station to make sense to deploy, it would need to generate at least more revenue per square mile than it costs per square mile of coverage to operate.

In rural and remote geographies of the world, where population density is reduced, and thus potential revenue density for mobile network operators, base stations are often not deployed. In order to profitably provide service to these remote and rural geographies, the spectrum needs to be spread over enough people. Base stations could be deployed on high altitude platforms that operate while aloft. However, these solutions have technical challenges and often are subjected to tough atmospheric conditions that make the platforms difficult to control making operations inefficient and inconsistent. Additionally, high altitude platforms, still cannot themselves provide a truly global coverage solution, as they would also be too cost prohibitive for that amount of coverage.

SUMMARY

Methods for operating a mobile network with orbital base stations are described that can be deployed for use in a terrestrial fashion as a mobile, or cellular, network. A typical terrestrial RAN and core network might comprise software, radios, modems, computers, racks, cables, servers, etc. deployed on or inside of terrestrial infrastructure such as buildings and towers. In a variation of a mobile network, RAN and core network equipment/software are deployed on satellites in orbit, supported by ground equipment to interface to existing terrestrial RAN and core network counterparts, as well as the Internet. Particular network elements may be placed in LEO, MEO, or GEO orbits to facilitate appropriate networking links and positioning over strategic locations on the Earth, where certain ground infrastructure may operate such as UEs, G-MSCs, P-GWs, either home to the space network or to other, classic, terrestrial networks.

A space network might implement a series of enhancements to a typical LTE architecture, wherein the EPC and E-UTRAN are both enhanced, such as the functions employed by the base station, MME, P-GW, and HSS stacks. The enhancements to the LTE EPC and E-UTRAN can enable continued functionality of the standard LTE-Uu interface so that standard UE handsets would be compatible with both the terrestrial and the space network.

Embodiments may also implement enhancements to UE stacks to facilitate more optimal use of the space-based cellular network, particularly in phases where coverage is intermittent and not continuous. These UE enhancements may take hold in the application layer of the user plane on the UE stack or at the Non-Access Stratum layer of the control plane on the UE stack.

In addition to enhancements to the EPC and E-UTRAN, additional databases can be included to support the enhancements in the core network. These databases can be stored once, or multiple times, either on the ground or in orbit, or both, and can support the MME enhancements that enable the prediction of a future state of a network (in terms of position, velocity, attitude, IP connections, coverage areas, etc.). This future state space prediction function could be a function of known physics and characteristics of network hardware, and its operational constraints, to determine future inertial state vectors for orbiting network infrastructure. Inertial state vectors might be position, velocity, acceleration, attitude, and attitude rates. Other state vectors, or matrices/tensors, might be included, such as thermal, power, inertia, or mass. Computation of such vectors can be performed by a network management computer system and results distributed to base stations and UEs.

The network management computer system might, using an assumption for attitude and orbit control laws for orbiting infrastructure, compute future state space predictions for the network. This information could be stored in a database and be spacecraft-specific depending on capability of each orbiting satellite, the actuators it hosts on board, and its intended orbital operations. Thus different spacecraft may exist in the same network with different actuators, capabilities, designs, etc. With gravitational models, atmospheric models, and numerical integration schemes, the network management computer system might make predictions of satellite trajectories in LEO quite accurately many hours, days, or even weeks, into the future. The orbiting network infrastructure can use that data about future inertial state vectors for obtaining insight into future network connectivity states, predict optimal network operations in the future, and coordinate with terrestrial network deployments in advance. This may include, radio resource control (RRC) functionality, non-access stratum (NAS) layer functionality, network IP routing tables, mobility management functions and signaling triggers/timers for things like handovers, etc.

Based on inertial state vectors for the entire orbiting network, a variety of network node connections may be possible. Each orbiting satellite may have a finite number of beams to allocate to communications with UEs on the ground, other satellites in the network, or ground station gateways on the ground. Depending on the number of available beams and the relative position, velocity, and attitude of nodes in the network, a series of connectivity scenarios for each discrete moment in time can be created. A set of operational rules, constraints, and/or service requirements, may be imposed as a filter to evaluate the series of connectivity scenarios to derive the most ideal one, or ones, thus generating an ideal concept of operations for network connections. This concept of operations might include an itinerary of orbital maneuvers/maintenance, as well as a timeline of network maps, which indicate nodal connections that are predicted to exist at some time, for some amount of time, into the future, and what the characteristics of those connections might be (e.g., latency, data rate, frequency, modulation scheme, encoding, etc.). A network processor might generate predictive routing tables based on a network map prediction and network node connections, and distribute those predictive routing tables as data structures to some or all of the nodes in the network. Operations at the MAC layer or PHY layer could be predicted based on expected overpass times with UEs, given a saved database of their positions and velocities.

The described service from the orbiting mobile infrastructure can be deployed in cells around the planet that are either dynamic (e.g., move with respect to the Earth's surface) or static (e.g., do not move). Techniques can be implemented to manage a database of points that describe positions of various points of interest in the network. As an example, positions for each satellite base station, terrestrial base stations, satellite ground stations, or gateways, UEs, a database of some mesh of points on the ground, and a database of points representing either edges, centers, or both, of geospatial polygons on the Earth, may be among the lists of points of interest that are maintained in a central database. Link budgets can be modeled for links between satellites and these points of interest over time to facilitate optimal future use of spectrum, optimal coverage statistics, control transmissions from satellites, and coordinate spectrum sharing between the orbiting infrastructure and terrestrial infrastructure that are using similar, or the same, frequencies.

Since future link budget characteristics can be predicted at these various points, optimal network routes and paths may also be predicted for servicing these points, and specifically which satellite may conduct service at what time, and when, if any, handovers would be planned between two satellites that exchange control of servicing a particular location on the ground. This would allow for anticipated core network signaling requirements and routing to optimize traffic flow.

A state space prediction function can be embedded into space or ground hardware/software as an extension of classical functions taken on by typical terrestrial cellular infrastructure, such as the MME, S-GW, P-GW, HSS, PCRF, etc. The results of the state space prediction function can be used to generate intelligence about the future state of the network. This intelligence can be distributed to each node in the network to inform future requirements for radio-resource management, mobility management, tracking area management, load balancing between S-GWs, etc. which can be used to optimize use of the user and control planes used in the mobile network.

The space network might implement an RF interface similar to the ones specified by the 3GPP standards for mobile protocols such as GSM, LTE, EDGE, CDMA, etc. as described in Speidel I. Speidel I details a method for handling the Doppler shift and propagation delay associated with orbital links between satellites and devices, such as UEs, on the Earth's surface. By implementing this method, various types of space networks might solve connectivity challenges around the planet in remote and rural areas of the world where it is too costly to build infrastructure for mobile communications networks, or there is simply no profitable incentive to build such infrastructure.

The following detailed description together with the accompanying drawings will provide a better understanding of the nature and advantages of the present invention.

BRIEF DESCRIPTION OF THE FIGURES

Various embodiments in accordance with the present disclosure may be described with reference to the figures, in which:

FIG. 8 illustrates a Process that a UE uses when searching for, and selecting, a cell to camp on.

DETAILED DESCRIPTION

Figure 1:
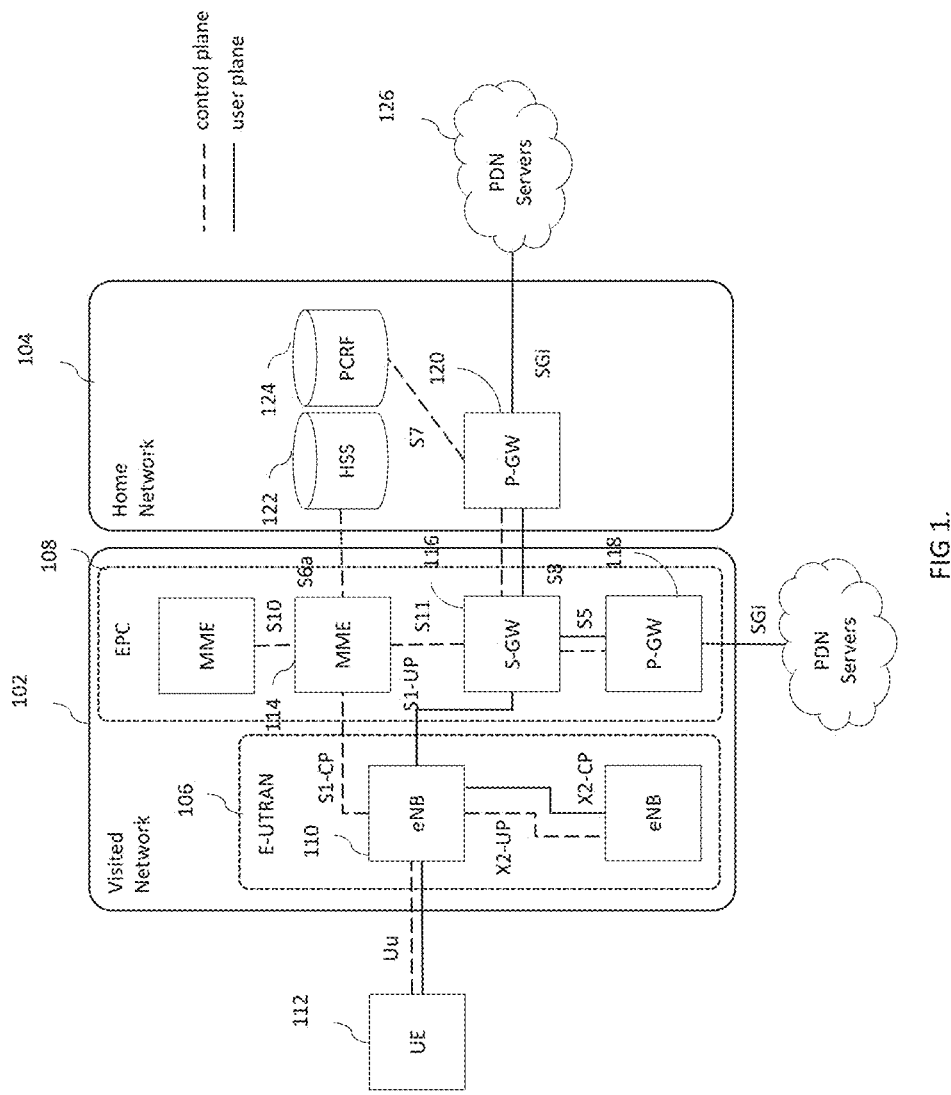
FIG. 1 is an illustration of conventional LTE architecture.
Figure 2:
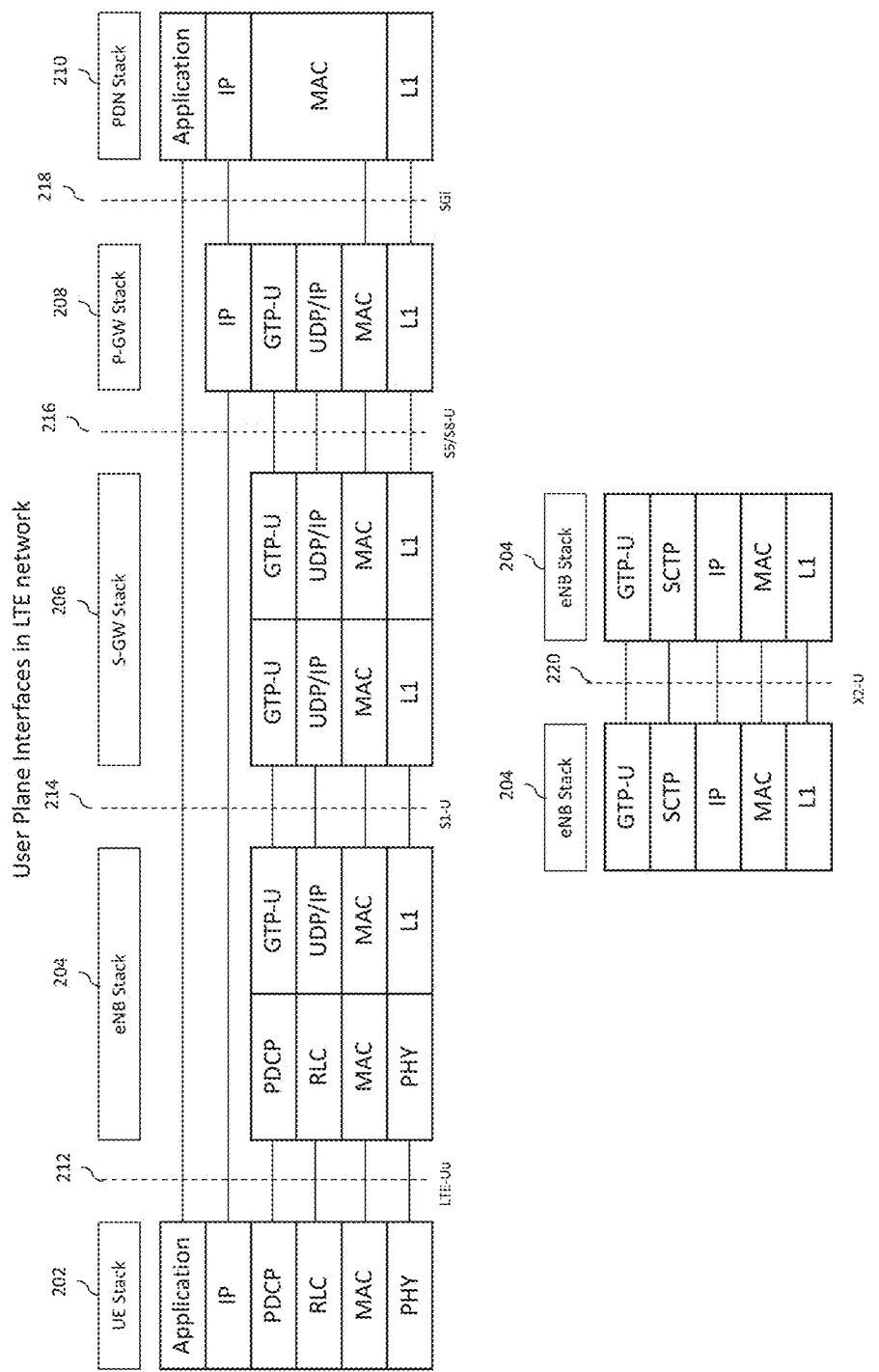
FIG. 2 illustrates a user plane interface between the network elements of an LTE architecture.
Figure 3:
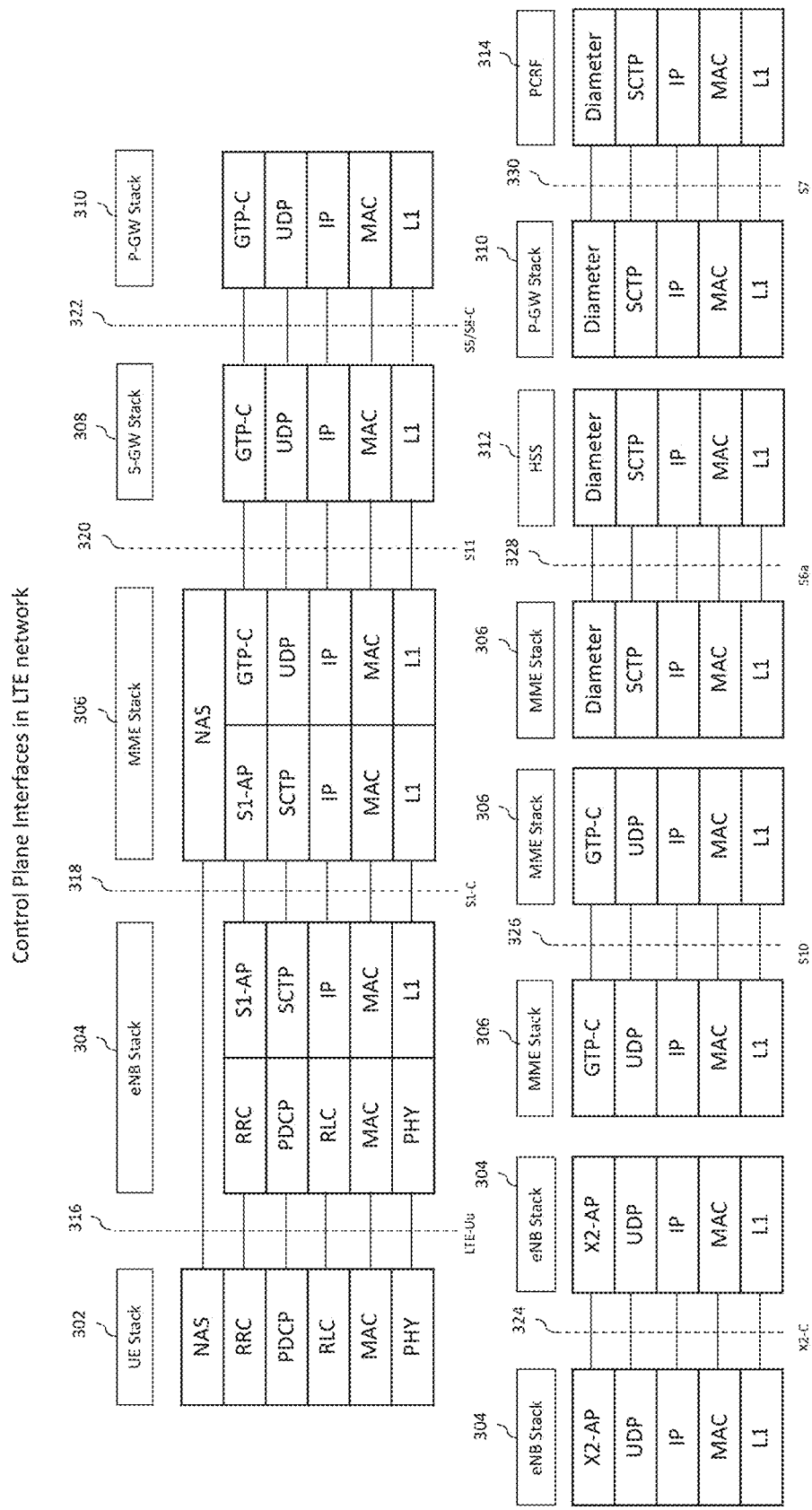
FIG. 3 illustrates control plane interfaces between the network elements of an LTE architecture.
Figure 4:
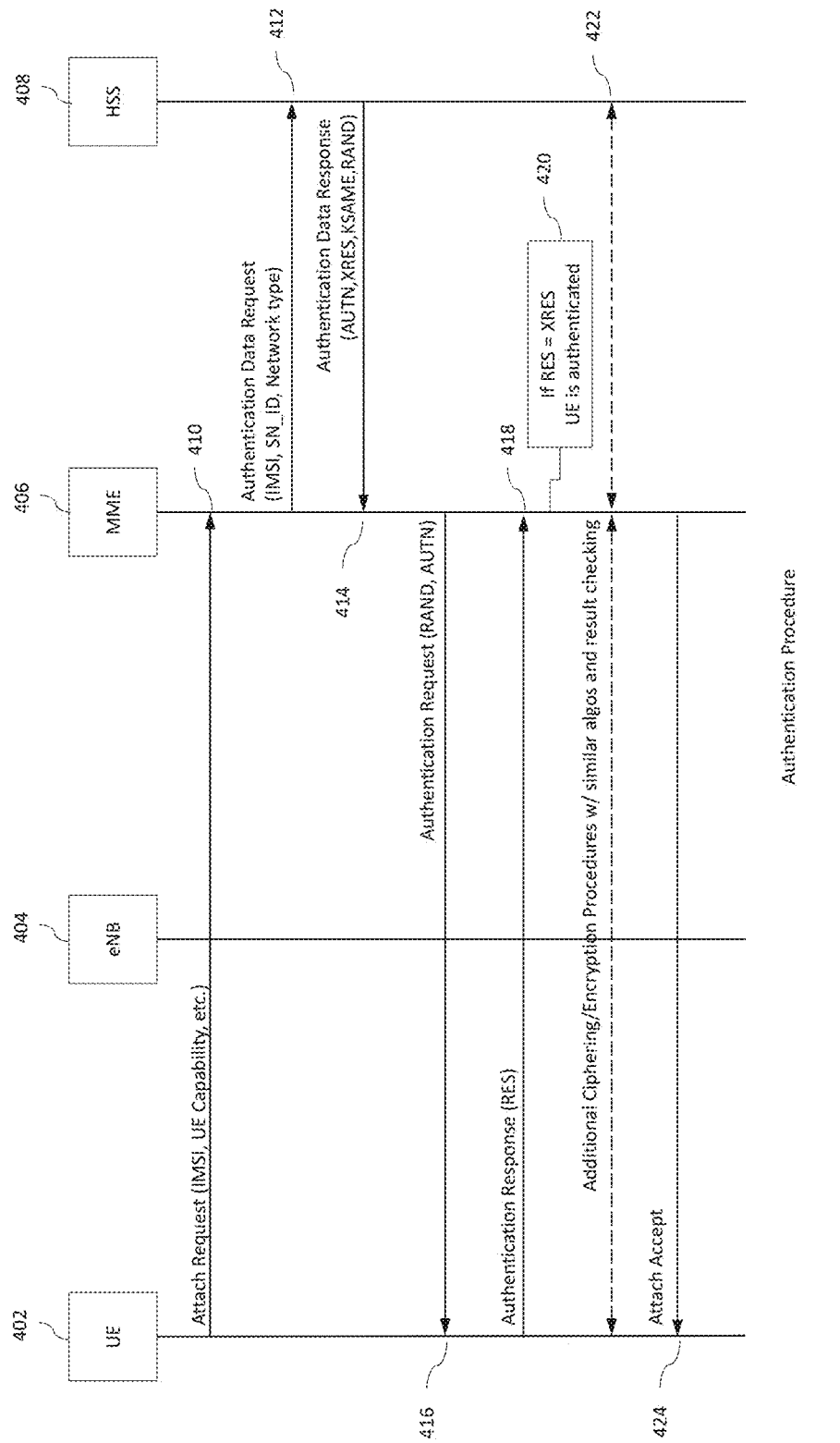
FIG. 4 describes an authentication procedure for a UE on an LTE network.
Figure 5:
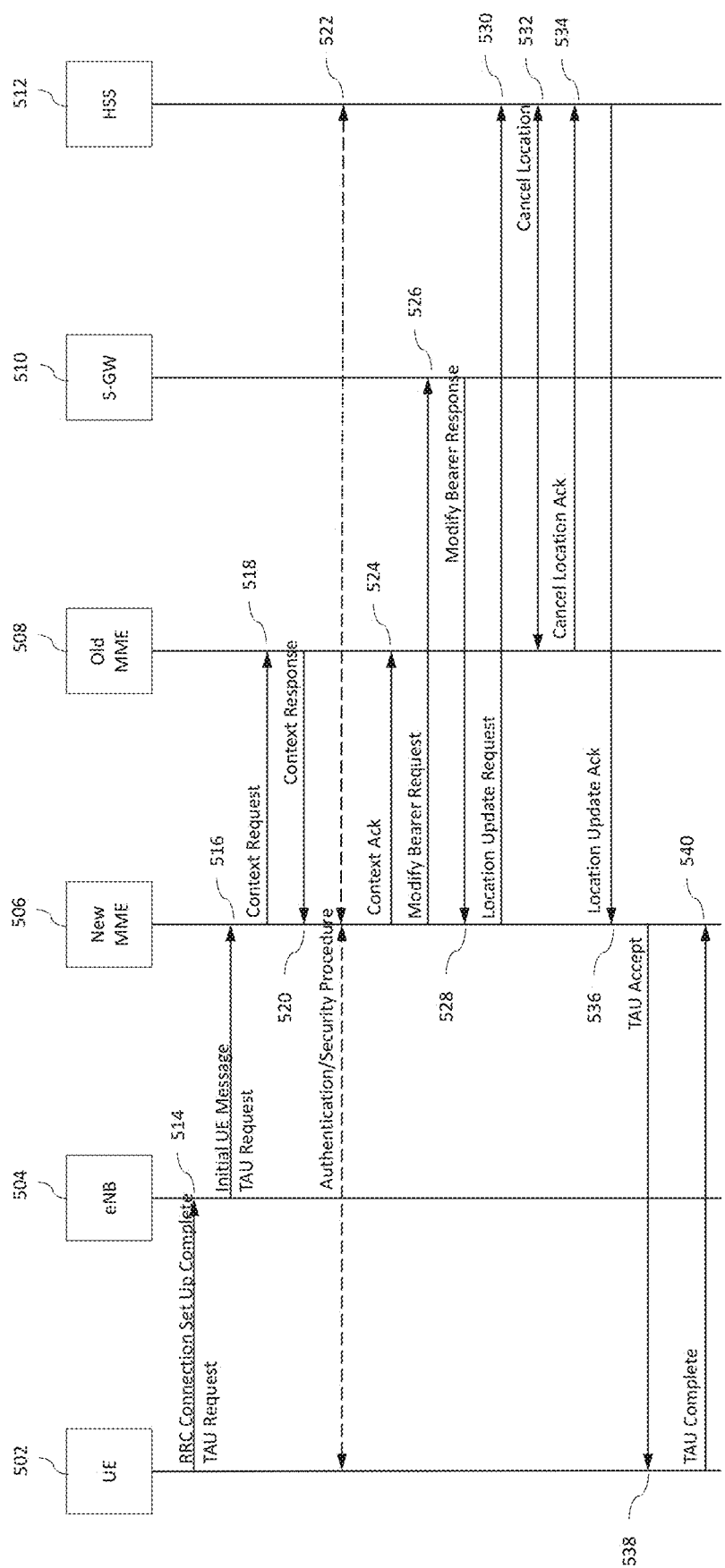
FIG. 5 describes a tracking area update (TAU) procedure for a UE on an LTE network.
Figure 6:
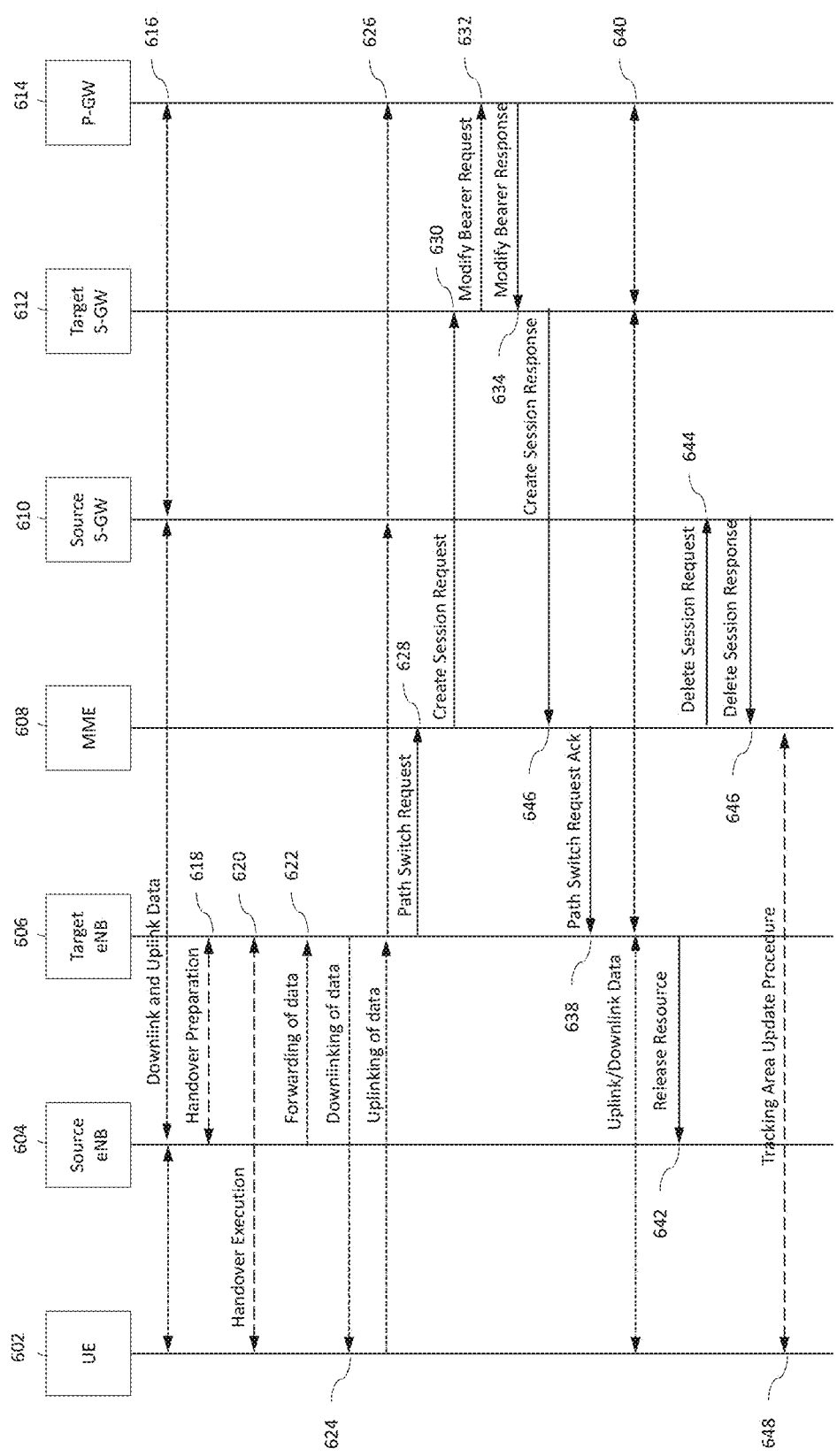
FIG. 6 describes a handover procedure for a UE on an LTE network when a base station handover is needed and when an S-GW handover is needed.
Figure 7:
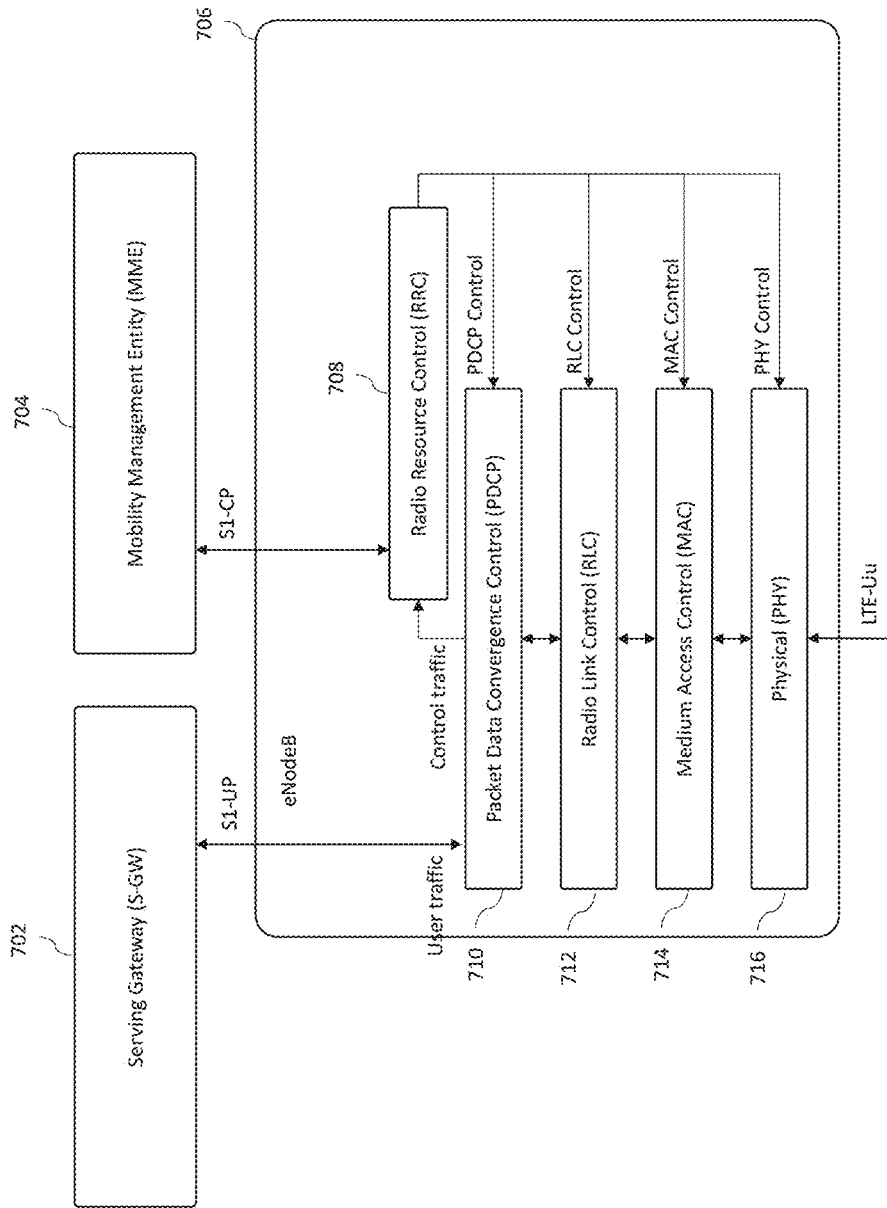
FIG. 7 illustrates a base station protocol stack architecture for existing base stations.
Figure 8:
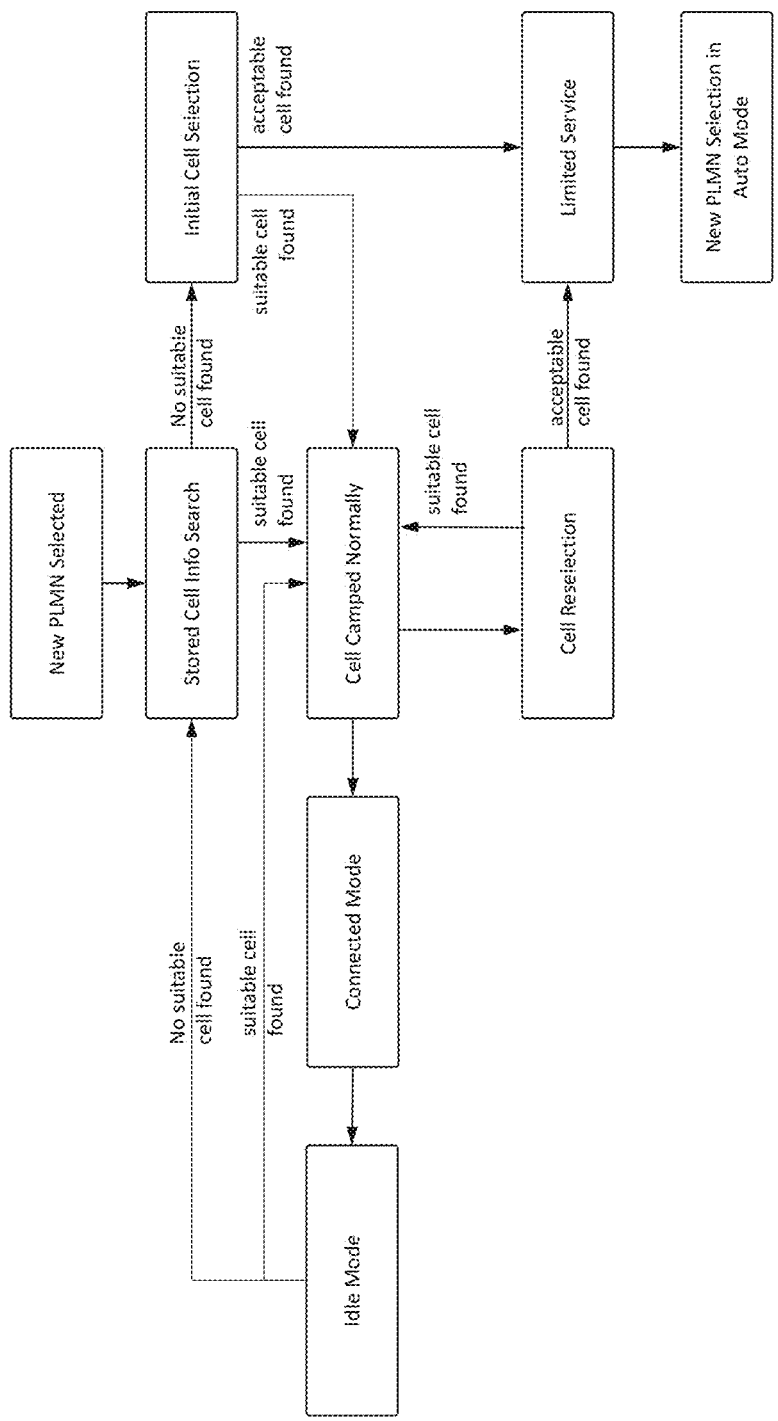

In embodiments described herein, a space communications network operates to provide communications alongside terrestrial mobile cellular networks. Like the terrestrial mobile cellular network, the space network operates a RAN and core network functionality as a complementary space component to the terrestrial network. As an extension, or complement, to the terrestrial network, the space component employs core network functionalities and RAN functionalities that enable proper authentication and handoff of mobile devices to and from the space and terrestrial mobile RAN.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In rural and remote geographies of the world, where population density is reduced, and thus potential revenue density for mobile network operators, base stations are often not deployed. A space-based mobile communications platform can be a solution for closing links to standard UE devices across a large swath of land, obviating the need for specialized client equipment. The standard Uu interface for a space-based LTE network can be used with the disclosure described in Speidel I. Speidel I describes methods for manipulating a base station, specifically the eNB, so that it can be enhanced to accommodate the Doppler shift and propagation delay of orbital links between the base station and the UE on the LTE-Uu interface. In doing this, space-based infrastructure can be used for a telecommunications network that supports the existing UEs using the terrestrial mobile network.

There are some challenges with operating a space based mobile network of base stations and other classically terrestrial mobile network infrastructure, which derive mostly from the required use of low Earth orbits for the base station radio interface links in the network. One challenge is to close a link between a transmitter and a receiver, wherein closing the link involves transmitting a signal from the transmitter with enough power such that the propagated signal crosses the distance between the transmitter and receiver and arrives at the receiver some distance away with sufficient signal energy level above a noise floor such that the signal can be demodulated successfully at a sufficient bit error rate at the receiver.

Depending on the desired data rate for the service connection between the orbiting base station and the UE, there may be a certain signal to noise ratio requirement. The uplink budget might be driven mostly by the transmit power of the UE on the ground. In LTE protocols, this may be 200 mW (23 dBm) and in GSM protocols, this may be 2 W (33 dBm).

For link budget closure with 200 mW devices on the Earth's surface and to avoid an influx of too much traffic for one satellite cell/beam, the satellites with base station transmitters/receivers might operate in low Earth orbit with directive antenna technologies. With large antenna technologies, altitudes might go as high as 1000 km, or so, for orbital base stations. Use of sub-1 GHz cellular spectrum could be favorable for propagation characteristics and might be used in a more favorable embodiment. However, less bulky antenna arrays may reduce network cost, putting some satellites as low as 300 km (if orbit can be maintained by thrusters systems onboard the spacecraft hosting the base station).

Because of the need for low Earth orbits, achieving ubiquitous coverage of the planet with orbital base stations can involve thousands of satellites, but that is still fewer than the number of terrestrial base stations needed for similar coverage. Nevertheless, thousands of satellites may take a while to fully deploy, and in some embodiments contemplated herein, a satellite constellation operator might employ a network design in early phases that can begin to generate revenue and provide meaningful service on the ground, comprising a smaller fleet of satellites, that might not provide continuous coverage of the entire planet but may provide intermittent base station overpasses across the planet. It might be favorable to be able to make a first fleet of satellites using simpler designs so they could be developed inexpensively and deployed more quickly. For example, the antenna selection might be a driving design consideration for the satellites. One consideration could be a single antenna that has limited range and can only be pointed based on the attitude of the spacecraft. This option may be simpler to design, develop, built, and test than an alternate embodiment such as a phased array antenna with beamforming capability so that beams can be pointed in any direction independently of spacecraft attitude. If simpler antenna technologies are utilized, each base station may have quick overpasses/session opportunities (e.g., two minutes of connectivity every 30-60 minutes), depending on link budget elevation angles.

In addition to antenna considerations, there may be mass and power considerations as well. Initial use cases and markets may be selected intentionally to reduce the power requirements on the initial fleet of satellites. As an example, intermittent cellular service for simple SMS messaging application among remote IoT/M2M devices and mobile phones, in a select number of countries around the globe, may offer relaxation of spacecraft technical requirements. As an example, if an initial intermittent service is offered in the countries of Australia, New Zealand, and the Philippines, this may only require a satellite to be transmitting a beam for a 5-10% of its time in orbit. As a result, the highest power mode for spacecraft operations may be duty cycled at 5-10%. By servicing low data rate applications (e.g., SMS) for relatively sparse users (compared to dense urban areas for telecommunications services), an orbiting base station may only need to transmit across a single LTE resource block for data traffic, or even a single 200 kHz wide GSM carrier. The transmit power for each carrier may need to only be 20 to 30 W. The power amplifier for the payload might drive the spacecraft power budget, and using readily available class A or AB power amplifiers may allow 40-50% efficiency at P1 dB (the power output where amplifier linearity degrades by 1 dB). As a result, the power draw from the amplifier might be no more than 75 W peak power. The spacecraft "payload" therefore might have a peak power draw of 100-125 W (after power is included for radios, computer processing, etc.) and no more than 10-12.5 W on-orbit average power. This range of on orbit average power is well sized for nanosatellite class buses, which might be of a form factor of tens of centimeters in length, width, and depth (e.g., a 6 U nanosatellite would be about 20 cm×30 cm×10 cm). A satellite this size is capable enough of generating 50-60 W of on orbit average power from deployed solar arrays, and storing that energy in batteries that can be discharged during times when high power mode is needed.

As additional use cases and service areas are added to the service set/product line for the orbiting constellation of base stations, enhanced spacecraft with more size, power, and capability to service more spectrum, more users, higher data rates, and more applications, etc., might be put into place. These enhanced spacecraft can coexist with an initial fleet of more limited spacecraft that may remain commercially viable. In some embodiments, a constellation of base stations may comprise different spacecraft, with different capabilities and services that they can accommodate (and perhaps what amount of time, or what specific countries) may simply be sized for providing coverage for a limited amount of time, taking into account operational constraints.

Another result of operating in low Earth orbit is that while cells are small with respect to the Earth (and thus require many satellites), they are quite large with respect to the terrestrial cellular network. A typical terrestrial cell may have a radius of no more than 20-30 km, while an orbiting satellite may have a beam radius of over 300 km. As a result, there could be hundreds of base station cells on the ground that could be operating simultaneously with the orbiting base station. In scenarios where spectrum is allocated to the space network alone, this might not present any challenges, as different frequency bands between the space and terrestrial networks prevents interference. However, there may be some embodiments where the space network acts as an extension of an existing terrestrial network and uses similar, or the same, spectrum. This may be preferred in some instances where there are financial and business difficulties to acquiring dedicated spectrum for a telecommunications service. Using a sublicense for spectrum owned and operated by an existing terrestrial network operator might be simpler. This embodiment might use some spectrum management techniques above and beyond what is used by the existing cellular networks to deconflict potential intercell interference.

There may be alternate embodiments however, where sharing spectrum between space and terrestrial base stations does not include dynamic modification of existing terrestrial networks, and embodiments that do not use enhancements to an existing MNO network infrastructure. Since the satellites are moving with respect to the terrestrial network, this management technique may involve temporal features, where spectrum deployment is managed dynamically with time.

With the satellites providing coverage to UEs while moving in low Earth orbit, they move significantly faster than the UEs on the ground (~7-7.8 km/s). As a result, the network infrastructure is effectively mobile and the UEs on the ground can be considered to be static (even if they are moving slowly). From the perspective of the space network, motion of a UE over a given minute, hour, or even day is relatively inconsequential in terms of when and what satellite may be providing it coverage at a given time, if it does not already have coverage from the terrestrial cells. This a feature can be used advantageously in some networking solutions.

The present disclosure describes embodiments for managing an orbiting set of infrastructure hosting base station, S-GW, MME, and/or P-GW functionality. While dynamic motion of an orbiting constellation makes mobility management more complicated, with more unique requirements, the predictability of orbital dynamics can be leveraged to inform future state spaces of the network, which in turn can inform/anticipate control plane operations for many functions. At a network level, understanding latency, routing, and ideal coverage patterns/operations is a much more complex computation, as these things are typically static, or constant, in the terrestrial mobile network deployments. Network IP traffic routes may be dynamic and as orbiting infrastructure and ground infrastructure moving relative to each other intermittently connects and disconnects.

In addition to mobility management challenges, there are RAN deployment challenges with the base station as well. Aside from the typical challenges faced by terrestrial RAN deployments, each satellite's motion inherently means that it could be covering every point on the Earth at any point in time. As a result, the base station may be operating as an extension of different, terrestrial networks at different points in orbit. Specific frequencies may be licensed differently around the Earth, MCC, MNC, Master Information Blocks, and System Information Blocks might change. Certain technologies used (2G, 4G, etc.) might change. As a result, there might also be a record of these requirements and a controller to dynamically reconfigure base station settings to accommodate the specific location to which it is providing service.

The fact that any given satellite, or available radio interface might become available to a user for as little as a few minutes before it goes away and another, different air interface becomes available, creates other networking signaling latency challenges for a space-based telecommunications network as well.

A good example is an authentication challenge. Any device trying to connect to the network might ideally want to authenticate to the network in a time frame that is shorter than a satellite overpass time, otherwise, it might never be able to authenticate to the network. Typically, authentication on roaming networks, or networks that operate far away from the home network authentication data bases (such as a network in space) can take an amount of time that may eclipse that of a satellite overpass. The network can be designed to increase overpass times, but enabling rapid authentication procedure, or dealing with laggard authentication becomes important when considering a network of orbiting telecommunications infrastructure.

Another example might be interaction between the space network (as a roaming provider) and the ground network (as the home network). With satellites flying by every several minutes, the network may need to manage how it transmits Tracking Area Codes for each of the satellites because every time a UE experiences a change in TAC, or is being served by a different VLR/MME, it may automatically update its location. That may require an HSS update on the home network and could result in substantial network overhead if every user needs to update their location every several minutes and the number of users on the global network is representative of typical telecommunications subscriber counts across large geographies of the world (hundreds of millions or possibly billions of subscribers).

Finally, handovers of telecommunications traffic may be complicated in a space-based telecommunications network. Since each satellite may only have an overpass over a given area for a few minutes to ten minutes, depending on orbits and antennas deployed, there might need to be perpetual handover signaling in the satellite network to accommodate the changing coverage by each satellite. In addition to handovers between UEs, there may be challenges with handovers in intersatellite links based on changing states of satellite positions, and thus variable states in network latency, and routes from orbiting infrastructure and infrastructure on the ground that acts as a gateway to terrestrial mobile networks, the Internet, etc. These can be addressed using the methods and apparatus described herein.

A. Network Design Considerations/Concepts

Depending on the level of service that a spacecraft cellular network seeks to enable, and for how many users, the RF front end of the space network RANs may be designed in a different configuration. For service applications that are relevant to devices such as IoT or M2M devices, where data rate requirements are low and devices may be scattered sparsely in remote areas, there may be a reduced requirement for EIRP over a desired amount of service spectrum. The amount of service spectrum might be driven by how many users the satellite network is required to service, specifically, the spectrum needs to be sized for the number of simultaneous users in a single spotbeam that need to use the satellite network.

The satellite based mobile network may be configured/designed to operate in concert with the terrestrial mobile networks below, and therefore only deploy enough spectrum to fill in the gaps of the terrestrial mobile network as described herein. In this configuration, a small sliver of spectrum may be allocated to the space network for coverage of low population density areas still without coverage while the majority could be allocated to the terrestrial network (where terrestrial cells are smaller and can re-use spectrum more densely) for coverage in high population density regions. Such a configuration might be adopted for a service intended for remote cellular-based IoT devices (e.g., GSM based, or LTE based) that can be purchased inexpensively. With IoT use cases, the lower signal level requirements allow for lower EIRP on the satellite end of the link to close the downlink at a desired data rate. A lower EIRP allows a reduced trade-off between satellite Tx power requirements and the size of the antenna to some degree. The size of the antenna might drive other design factors in the network such as antenna directivity and beam-width, and thus spotbeam size, which also drives how often spectrum can be re-used by the space-network. This comes at the trade of more satellites, or more spotbeams per satellite providing coverage from orbit in order to achieve ubiquitous, continuous coverage of the planet. Each satellite, equipped with some number of spotbeams, provides coverage to an aggregate area of the Earth defined by the spotbeams, referred to as the coverage area, or coverage footprint.

A.1 Determining Optimal Number of Satellites

A satellite network might be designed with some number of satellites, each with some coverage footprint, and some number of potential spotbeams for each satellite. With a limited number of satellites, where coverage footprints do not overlap, service on the ground might become intermittent, which might be useful for certain use cases in remote areas of the world where no terrestrial coverage exists. Depending on the satellite orbit and the footprint size (and how the beams within that footprint are operated), there might be anywhere from one minute to fifteen minutes of coverage time from a given satellite in the network. Depending on the number of satellites and the orbits that satellites are in, there may be this level of connectivity once every twelve hours, six hours, one hours, thirty minutes, ten minutes, one minute, etc. As more satellites are added to the network, there might be less intermittency in connectivity.

As an example, Table 5 below might describe how the number of overpasses, minutes of connectivity, and time between overpasses might scale as a function of number of satellites. This particular example analyses satellites that are in a 503 km circular orbit around the Earth, inclined by 51.6 degrees to the equator. The satellites would be equally spaced around the Earth within three unique repeating ground tracks. The satellite base stations are assumed, in this analysis to have approximately 45-degree minimum elevation angle describing the satellite footprint. The range of values in each row and column in Table 5 may correspond to the variation in service at the equator and high (or low latitudes). Specifically, in this case, the better service numbers (more overpasses, longer connectivity times, and shorter intermittency intervals) correspond to all longitudes at latitudes of around 51.6 degrees N or 51.6 degrees S. The worse of the two numbers corresponds to all longitudes to the equator.

TABLE 5

| Sats | Overpasses | Minutes of Connectivity | Longest time between overpasses |
| --- | --- | --- | --- |
| 3 | 2-10 per day | 4 to 20 min | 2 hr 22 min to 11 hr 58 min |
| 6 | 4-20 per day | 8 to 40 min | 1 hr 10 min to 5 hr 58 min |
| 12 | 8-40 per day | 16 to 80 min | 34 min to 2 hr 58 min |
| 24 | 16-80 per day | 32 to 160 min | 16 min to 1 hr 28 min |
| 48 | 32-160 per day | 1 hr 4 min to 5 hr 20 min | 7 min to 43 min |
| 96 | 64-320 per day | 2 hr 8 min to 10 hr 40 min | 2.5 min to 20.5 min |
| 192 | 128-640 per day | 4 hr 16 min to 21 hr 20 min | 15 seconds to 9.25 min |
| 384 | 256-1280 per day | 8 hr 32 min to 24 hr | continuous to 3.625 min |
| 768 | 512-2560 per day | 17 hr 4 min to 24 hr | continuous to 49 seconds |
| 1536 | 1024-5120 per day | continuous | continuous |

A.2 Orbit Configuration

Space based infrastructure might be located in a variety of different orbits, perhaps, GEO, MEO, or LEO orbits. GEO orbits might be circular in shape and operate at about 35,786 km altitude from the surface of the Earth. GEO orbits could be equatorial or inclined, depending on desired coverage dynamics of the Earth, or other orbiting spacecraft, below it. MEO orbits might also be circular and inclined by some angle to the equator at altitudes between the upper edge of LEO (about 2,000 km altitude) and GEO (about 35,000 km altitude). LEO orbits may also be inclined, depending on coverage requirements and operate at an altitude between about 250 km to 2000 km. At altitudes below 450 km, atmospheric drag is a significant driver for spacecraft propulsion requirements.

Generally, inclination angles correspond to desired latitude coverage. Polar (90-degree inclination) orbits can provide coverage to all longitudes between 90 degrees north-south latitude (e.g., the whole planet). Mid-inclination orbits, 51.6 degree inclination (the International Space Station inclination) as an example, provide coverage to all longitudes between 51.6 degrees (plus the angular radius, or "half Earth angle", of its coverage footprint) north-south latitude. Equatorial orbits provide coverage to all longitudes between one-half Earth angle of the overage footprint, in degrees, north-south latitude.

Highly eccentric orbits may be used to provide repetitious, but extended, coverage of certain geographies or lower orbits in the network. Highly eccentric orbits offer slow moving velocities at higher altitude portions of the orbit (providing extended, or more drawn out, coverage) and faster moving velocities at lower altitude portions of the orbit. The position of the higher altitude portions of the Earth in eccentric orbits can move with respect to the Earth, or desired coverage area. Highly eccentric orbits are affected by precession of the argument of perigee, however if inclined by 63.4 degrees to the equator, this secular precession is eliminated. Such orbits could be known as Molniya orbits and could be used to fix orbital dwell times over particular regions on the Earth or in lower orbits (such as LEO).

A variety of orbits might be used in the constellation, where GEOs, MEOs, and LEOs, or some combination thereof, host various network elements and through ISL and ground stations for a space network that communicates with the terrestrial network while servicing, and providing mobility management for, the same UE subscriber pools.

A.3 Space Network Deployment Phases/Styles

The space-based RAN may be deployed as its own network with its own spectrum assets, which makes the deployment of its RAN frequency licenses relatively simple—particularly when using small numbers of satellites.

Alternately, the space-based RAN may be deployed as a global shared roaming network, where a sublicense exists for use of existing terrestrial MNO spectrum—in agreement with the MNO. In this case, deployment of spectrum may require dynamic coordination with the terrestrial MNO network, if spectrum is not allocated strictly to the space component. This might not be desirable in the case of an intermittent constellation, where coverage from the space component can only be made available by LEO base stations for some number of minutes every, say, 15, 30, 60, 120, or 360 minutes.

During the times that the space network is not operating, the ground network might be able to make use of the spectrum it would otherwise operate on while above in orbit. As a result, it may be desirable to know when a certain satellite is above and able to provide coverage that overlaps with existing ground cells in the network below.

Further to the point of phasing development of the constellation of base stations, as described herein, novel methods can be used to compute ideal operational procedures/itineraries for satellite networks that may comprise satellite base stations without beamforming antennas and those with beamforming antennas. The satellites are typically constrained to comply with requirements imposed by regulation on the ground and also avoid interference with each other and other terrestrial cells. Further, each satellite in the constellation (or perhaps even select "fleets", or "production runs" of satellites), may have different technical capabilities. Examples may include maximum power draw requirements, on orbit average power intake, battery capacity, spectrum bandwidth it can deploy, payload/base station duty cycle requirements, thrust, attitude control, memory, processing power, etc.

Variability in technical capability among spacecraft in a shared communications network can be handled using these techniques. This can be useful when constellations are built in phases. It may take years for a constellation of thousands of satellites to be launched, and in the meantime, developing a small fleet of satellites to provide initial services for specific use cases might be a revenue bearing venture. A particular example might be IoT/M2M use cases that can benefit from connectivity in remote areas in an intermittent and inconsistent fashion. There may be other use cases for intermittent service as well, such as store-and-forward SMS messaging from handsets.

For early use cases, both fewer and less capable satellites may be desirable as that can reduce capital investment costs. Such an example might be beamforming arrays, which can take time and money to develop well. As a result, an initial constellation of a dozen or two dozen non-beamforming satellites may be deployed into LEO for initial services. Over time, new satellites may be developed and launched while the older designs may continue to operate. Design considerations can be taken to ensure software compatibility (or upgradability) of the initial and new satellites so that they can operate symbiotically together.

Over time, as new satellites phase in and out, their capabilities can be individually recorded in the data bases leveraged by, and described later in, the disclosure. As this information is added and updated, the computations performed as described herein can accommodate operational changes.

A.4 Network Architecture Examples

The space network may employ an architecture with similar structure to a terrestrial LTE network, but with several enhanced, and additional elements predominantly inside of the EPC and E-UTRAN. While the enhancements allow for optimal functionality of the space-based cellular network, they maintain the capability to communicate with standard terrestrial networks on the Earth without necessarily requiring any modification. However, there could be embodiments where the terrestrial mobile networks are enhanced as well, similarly to the space-based network, to be compatible with more sophisticated spectrum sharing techniques, as an example. Furthermore, enhanced UEs might exist in another embodiment where the end user handsets are modified with the enhancements of the space-based cellular network in mind. As an example, they may be offered, through the EPC (either on the ground or in space), predictable overpass opportunities by the space network, using the control plane, or the user plane (e.g., handset applications). This might be advantageous toward optimizing network scanning procedures to facilitate connection to the space network when the UE knows that it might become available.

Enhancements to the network architecture, in one embodiment, can involve the MME, the base station, the HSS, and possibly the UE. Additional elements can be added to the space network architecture in this embodiment that directly influence, or are influenced by, the operations of the network nodes in space-based infrastructure. These additional elements may include a Network Database (Net DB), a Network telemetry, tracking, control, command & data handling (TTCC&DH) function, and a spacecraft flight software system. The additional elements in the space network may be interfaced to the enhanced MME. This interface may occur in software.

The space network may operate as a set of distributed infrastructure components on satellites and ground stations around the Earth. Each spacecraft may host a flight computer, or set of computers, which might interface to a network switch that can access the intersatellite link radios and ground station radios on the satellites, if they are available. Each flight computer might be allocated for a specific network node function (e.g., Enhanced MME, S-GW, P-GW, etc.), or a single flight computer might employ those functions in one package, as a "network-in-a-box". A single computer might be able to run a virtual instance of a base station (maybe multiple base stations), enhanced MME, enhanced HSS, S-GW, P-GW, etc. Another computer might host the TTCC&DH software and the flight software for functions like guidance, navigation, and control (GNC), etc.

The enhancements to the LTE architecture described herein might be implemented as software executing on some nodes of the network, and specifically as an API or software library. This may involve the use of existing production/commercial quality LTE stack software. In lieu of direct modification of well-tested, existing production code, the enhancements might operate in separate software applications, software libraries, or code repositories that can be used to implement the desired enhancements by configuring, controlling, or communicating with existing interfaces to production LTE stack implementations. So, while the present disclosure describes enhancements to LTE stack nodes, it should be understood that this can be done using some existing components or entirely new components. Some implementations might not require literally modifying each software node, or function, in an existing LTE stack. This is also relevant for any 3GPP stack (e.g., 2G GSM/GPRS, 3G CDMA/UMTS, etc.)

The network might operate as an IPv6 network, enabling static IP addresses for each computer, on each satellite and ground station in the network. The intersatellite links (ISL) and ground station links (GSL) might operate as constantly linked IP tunnels between physical infrastructure on orbit and on the ground. At the ground, the instance of the telecommunications network-in-a-box, would interface over IPv4/IPv6 with the internet and other telecommunications networks.

Each ISL and GSL tunnel may actually comprise multiple bearers. One, or some, may be dedicated for network control plane traffic, network user plane traffic, flight computer telemetry, tracking, commands, etc. The bearers may be established in a weighted fashion based on priority and given the available bandwidth for whatever data rate link can be established for the air interface. As satellite orbit around the Earth, moving relative to the ground stations and the other satellites in the network, tunnels may be handed over between nodes and bearers re-established. Each spacecraft may have some amount of memory buffer to accommodate imperfect handovers with a gap in full tunnel connection to a serving access point name (APN) to the internet, as an example.

Figure 9:
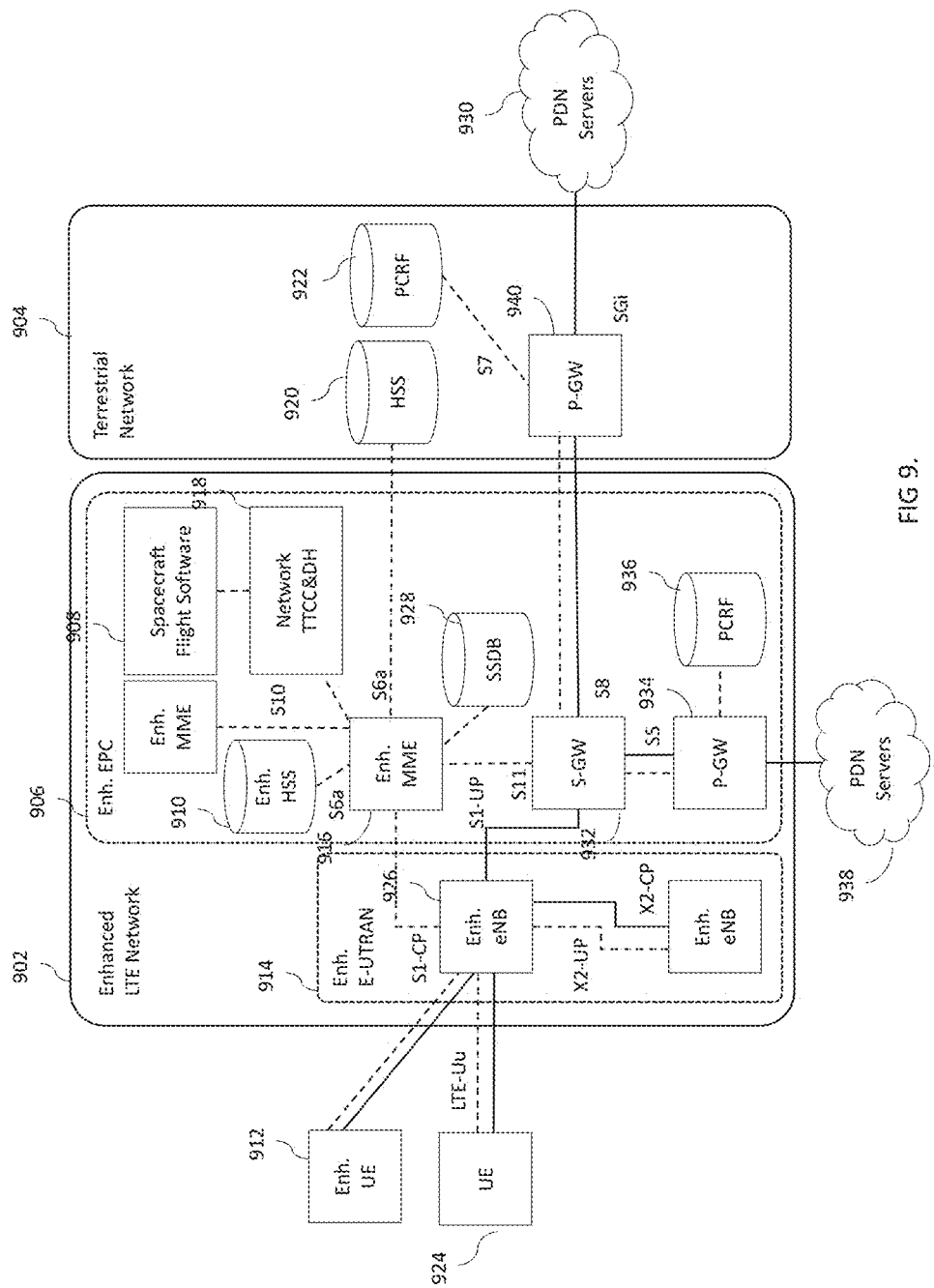
FIG. 9 illustrates an enhanced LTE network architecture as might be used with embodiments of the present disclosure.

FIG. 9 illustrates an example network architecture. An enhanced LTE network 902 may operate a set of functional nodes that are able to maintain compatibility with the standard terrestrial network 904 and standard terrestrial network UEs 924. The enhanced network may operate an enhanced E-UTRAN 914 comprising enhanced base stations 926. The enhanced EPC 906 may host similar elements to a terrestrial EPC, but use an enhanced MME 916, and enhanced HSS 910, a state space database (SSDB) 928, an enhanced S-GW 932, an enhanced P-GW 934, a PCRF 936, a TTCC&DH system 918, and spacecraft flight software 908. The enhanced EPC might maintain its own connection with PDN servers 938 which may be different from the connection that the standard EPC has to PDN servers 930. The enhanced MME might maintain an S6a connection to a standard HSS 920 in a home terrestrial network. The enhanced S-GW would maintain a standard S8 interface with a standard P-GW 940, which might manage a standard interface with the home network PCRF database 922. Enhanced UEs 912 may also be used in the network.

Figure 10:
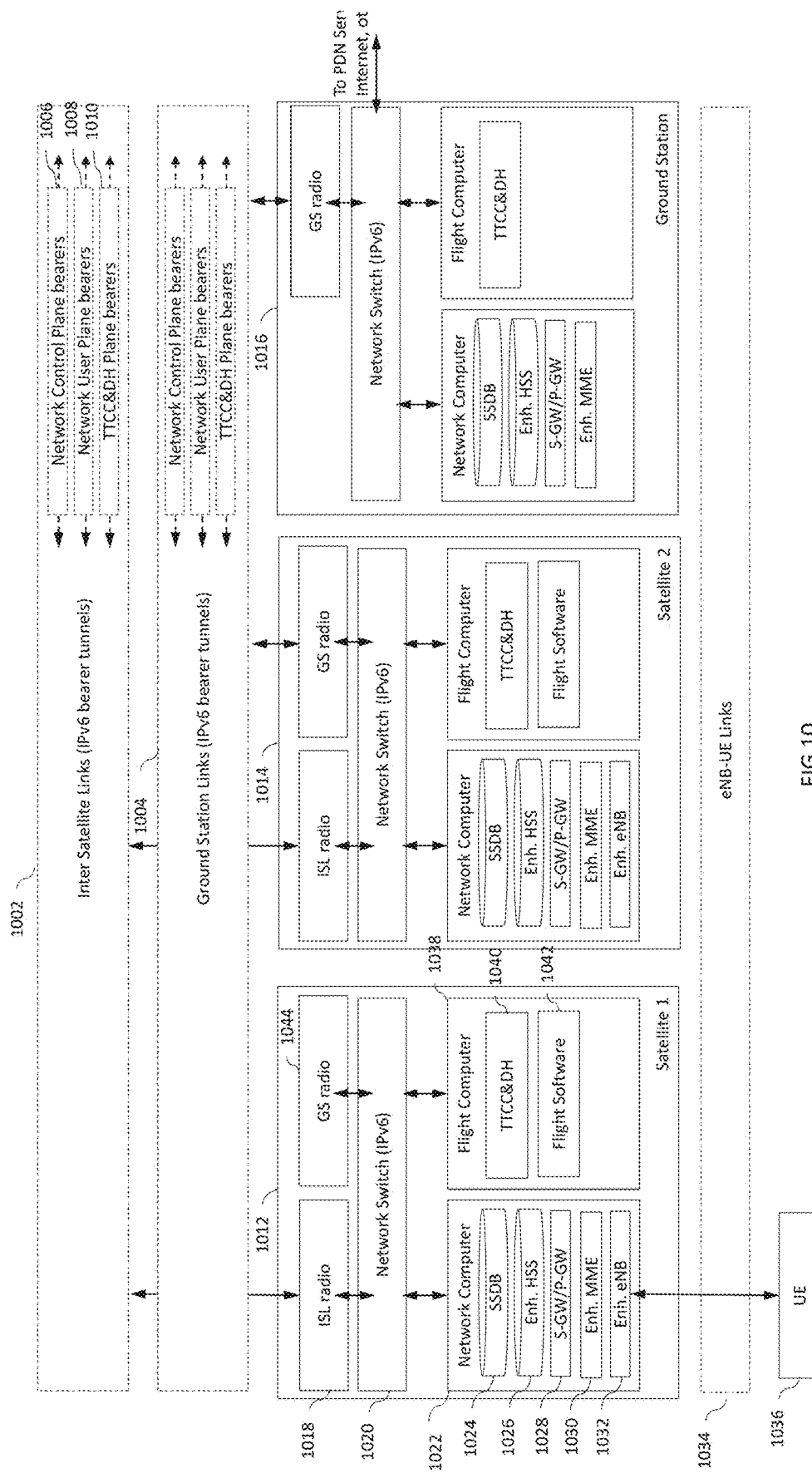
FIG. 10 illustrates how the space based LTE network architecture nodes may manifest themselves on satellites and ground stations and interconnect through intersatellite links (ISLs) and ground station links (GSLs) acting as IP tunnels.

FIG. 10 illustrates a space network architecture with respect to hardware that might be hosting it. There may be satellites 1012 and 1014 in the network and ground stations 1016 in the network. The satellites may be connected to each other through ISL 1002, that in one embodiment might be IPv6 bearer tunnels. These tunnels may be allocated a certain bandwidth that is split across bearers intended for different functions. There may be bearers in each intersatellite link tunnel for each interface that may otherwise be handled in a terrestrial network in the prior art. Specifically, there may be bearers for the network control plane 1006 (comprising X2-CP, S11, S10, S6a, S5, additional control interfaces, etc.), the network user plane 1008 (comprising X2-UP, S1-UP, S5, additional control interfaces, etc.), and the TTCC&DH plane 1010 (comprising one or more network interfaces). The satellites may be connected to ground stations through GSL 1004.

These GSL might be IPv6 bearer tunnels and split out by bearers for specific network planes as well. To create connections to establish these tunnels, each satellite is equipped with radios and other equipment. The ISL radio 1018 and the GSL radio 1044 are used to communicate with other satellites and ground stations, respectively, and implement the PHY, or L1, protocol for ISL and GSL. Each satellite may contain other computers, such as network computers 1022 or flight computers 1038 that run software that implements certain functions. For instance, the network computer might implement a state space database 1024, an enhanced HSS database 1026, an enhanced S-GW and P-GW 1028, an enhanced MME 1030, and an enhanced base station 1032. The enhanced base station 1032 would control a radio that implements the PHY for the LTE-Uu interface links 1034 and is compatible with existing, standard UEs 1036. The flight computer might implement the TTCC&DH functions 1040 as well as the flight software 1042 to control the various subsystems that are hosted on the spacecraft (e.g., attitude control, thruster control, actuator controls, electrical power system control, thermal control, etc.). Each computer in the space segment satellites may interface with a network switch 1020, which in one embodiment might be an IPv6 switch. The ground station may implement network computers and flight computers that do not natively provide base station functionality and possibly do not host an entire flight software package hosted on spacecraft. In some embodiments, a ground station may implement flight software.

A.5 Satellite Platform Hosting the Mobile Network Infrastructure

A spacecraft in orbit that provides infrastructure for the mobile network described may comprise some structure housing electronics such as computers, radios, processors, memory, wires, cables, actuators, etc. The spacecraft may use on board computers for processing and memory, running an operating system. The operating system may host software programs that are intended to run various functions on the satellite. One of these software programs may be a virtualized telecommunications software stack (to implement a RAN and/or core network) that controls radio interfaces connected to the computer. The operating system may also host software that simultaneously controls the command and data handling system on the spacecraft that collects telemetry and data from sensors, or computed in software, and handles commands either executed autonomously based on internal feedback control loops (or external feedback control loops that may be run on the ground), or manually from a ground control center. The spacecraft software may be used to control actuators that manage its attitude (reaction wheels, magnetic torquers, etc.) as well as its velocity/trajectory in orbit (e.g., thrusters). Actuators may also be used to extend, or retract, deployable structures on the spacecraft.

The spacecraft may have solar panels to collect solar power to charge batteries and distribute needed energy to various components in the spacecraft that the spacecraft needs to operate. The spacecraft may have processors that run software to monitor and track various telemetry readings and store them in memory, including position, velocity, acceleration, orientation, battery capacity, power in from arrays, mass, mass of fuel, inertial matrix, component health/telemetry readings, etc.

The spacecraft may host an on-board GPS receiver to track and compute its velocity, position, and acceleration. Other techniques may be implemented to provide position and velocity data of the spacecraft to its internal computers—such as signal ranging and Doppler measurement with known ground stations at specific positions—if GPS is not available (e.g., if the satellite is in GEO, or possibly too high in MEO). On-board sensors, such as star trackers, IMUs, cameras, horizon sensors, gyroscopes, etc. can be used to compute an orientation of the spacecraft in a certain coordinate frame, such as Earth-centered inertial. Additionally, these on-board sensors may be capable of computing the angular rates of the spacecraft as it rotates in inertial space.

The spacecraft may be equipped with a control system that can be programmed to execute certain tasks related to pointing, such as slewing, inertial holds (e.g., maintaining constant orientation in inertial space), nadir/zenith pointing holds, etc. Additionally, this control system may implement control of orbit position and maintenance, perhaps based on outputs of a state space prediction engine to determine an optimal maneuver in flight. This control system may implement a Kalman filter for refined state measurement and, based on control laws—such as those implemented by a PID controller, conduct a particular maneuver over a certain period of time.

The spacecraft may be equipped with an antenna that is oriented on the spacecraft in a mechanical fashion, such that its pointing vector in the body frame of the spacecraft, $\hat{n}$, is known. The spacecraft may implement a phased array capable of beamforming, in which case it may track, monitor, and change the, $\hat{n}_i$, for some beam, i, in the phased array coverage footprint. These antenna technologies may be used for LTE-Uu links with UEs. ISL can serve as a connection between important network nodes (e.g., base stations, MMEs, S-GWs, P-GWs, PDNs, etc.) that may be hosted on different spacecraft, feeder links can serve as a connection between the space network and the existing ground networks (e.g., terrestrial mobile networks, Internet, etc.).

The spacecraft platform may have a multitude of systems, for which the operator may desire to store telemetry, or health data. The telemetry of the spacecraft may be stored as exact measurements for the spacecraft, such as voltage measurements, current measurements, temperature readings, power indicators, battery charge, solar power intake, power draw, operating mode, status of software applications, etc. Telemetry from spacecraft may be processed to determine functionality of the satellite and any operational constraints as a result of failure. In particular, the satellite or ground systems might use telemetry intelligence to eliminate, or hinder, the spacecraft's ability to create connections with other satellites, ground gateways, or UEs. This can be used to create logic that automatically, based on telemetry downlink from satellites, toggles on and off node connection opportunities in the network state predictor engine.

B. Enhanced Mobility Management Entity (MME)

In a cellular network, a coverage area within which UEs might expect to connect to cellular network infrastructure might be a coverage area that is divided into cells, with some cells overlapping other cells and the coverage area possibly enclosing some areas not having any cell coverage. Typically, the cells in the coverage area can be considered static, such as where a cell's coverage derives from the presence of a fixed tower or transceiver having a fixed location and fixed capabilities. Such transceivers are typically placed where coverage is expected and/or where it is cost-effective given the number of UEs expected in those cells.

In a wireless network with service provided by orbital stations, the coverage area might be expected to change over short time periods, as satellites closer to the surface of the Earth than GEO will be moving relative to the surface of the Earth. The different characteristics of terrestrial-based cellular network nodes and of orbital-based cellular network nodes need not be a concern if they are using separate protocols and communication standards in that the two networks could coexist using different frequency bands, different encodings, etc. to avoid interfering overlap. However, when terrestrial network nodes and orbital network nodes use the same protocols and communication standards so as to allow a UE to seamlessly close a link with an orbital network nodes using the same protocols and communication standards the UE uses to close a link with a terrestrial network node, coordination and coexistence becomes more complex, in part due to the orbital movements of the orbital network nodes. As explained herein, this can be solved with coordination among network nodes.

A coverage area for an air network that provides wireless coverage for UEs present in that coverage area might be logically represented by a plurality of polygons. While reference is made to polygons, it should be understood that the methods and apparatus described herein would work equally well with closed shapes that are not strictly polygonal, such as ovals, circles, and irregular shapes having some curved boundaries and some straight boundaries. In some instances, some polygons of a coverage area correspond to terrestrial cellular network cells. Covering a coverage area, or at least some of the coverage area, with polygons might be a function of predicted use, legal jurisdictions applicable to particular polygons (e.g., polygons covering a portion of a particular country, polygons covering open ocean not having a jurisdictional control per se, etc.), and/or feasibility of coverage.

In some embodiments, the coverage area is first characterized by a set of mesh points and those mesh points are aggregated into polygons, whereas in other embodiments, polygons are defined without necessarily referencing mesh points. In a database representing a set of polygons, records on a per polygon basis might include details as to boundaries of the polygon, the legal jurisdiction applicable in that polygon, the protocols and standards to be used when establishing a wireless link in that polygon, and other information about that polygon. A mesh might comprise a grid or some other manner of virtually representing a finite element model or the like, of the Earth or a set of polygons. A coverage database might comprise mesh points and polygon coverage areas, wherein polygon coverage areas are referenced in the coverage database for respective base stations, and wherein the respective base stations comprise at least some static-coverage terrestrial base stations, at least some static-coverage orbital base stations using beamforming, and at least some dynamic-coverage orbital base stations using dynamic beams that move over the coverage area as the at least some dynamic-coverage orbital base stations move in respective orbits.

Where the coverage area is supported by both terrestrial network nodes and orbital network nodes, the nodes may coordinate. In an example, a terrestrial network node is a transceiver that is part of a cellular network broadcast tower and an orbital network node is a transceiver that is part of a satellite. A tower might support multiple nodes and a satellite might support multiple nodes. Coordination might be done by a mobility management entity, which can be in the form of a computer system executing software and having communications channels that allow the mobility management entity to get information from the nodes and to send information to the nodes. In one approach, the mobility management entity (MME) computes a set of polygons for the coverage area for a specific time period and can do this in advance of that time period, allowing sufficient time for details of the set of polygons to be propagated to nodes that would use that information in advance of needing that information.

The set of polygons can be computed according to processes described herein elsewhere, but may take into account predicted states of nodes on satellites (e.g., position, power, orientation, whether the node is capable of maintaining a steady beam in the coverage area as the node itself moves through space, etc.). As explained herein, as nodes move, the set of polygons can change and the nodes assigned to cover link needs in particular polygons can also change. Where a first node is assigned to cover link needs in a polygon and a second node is not so assigned, but the second node is capable of transmitting using the same protocols, channels, and standards as the first node, the second node might be programmed to defer and not use those protocols, channels, and standards during the time period in which the first node is assigned to cover those link needs.

A node might be scheduled, considering the set of polygons and other data available to the MME, to not operate for some time period, some frequency channel, some time slot within a time-division multiplexed frame, etc. Where a node is an orbital node (and perhaps this can also apply to terrestrial nodes), the node might be scheduled to be inactive for a particular time based on power available to the node, or lack thereof, heat buildup at the node, and other considerations that account for operational states of the nodes available for the coverage area.

Some orbital nodes might have beamforming antennas that allow for a beam to remain over an area of the surface of the Earth for some period, whereas other orbital nodes might be limited to beams that are steady relative to the satellite and so the beams move over the surface of the Earth rather than remain over an area of the surface of the Earth. Where a beam of an orbital node is covering or approaching coverage of a particular polygon, the orbital node might be assigned to handle link needs for UEs in that particular polygon while a terrestrial node that can reach that particular polygon is instructed to defer and not use air resources used by the orbital node. In addition to complete deferral, some coordination might be done among the nodes so that adjacent nodes with overlapping coverage simultaneously operate, but operate on distinct frequencies, codes, time slots, etc. so that they do not completely destructively interfere.

By the MME obtaining state information and computing assignments, and communicating those assignments in advance, a cellular network can operate efficiently even when some of the nodes of the network are in orbit moving quickly relative to, and overlapping, terrestrial nodes, some of which might be much closer to UEs than the orbital nodes. In some cases, some moving terrestrial nodes might be present, such as on drones, balloons, etc. but those might be treated as stationary relative to orbital nodes.

More specific enhancements to an MME will now be described.

Enhancements to an MME include a state space prediction engine that uses a series of databases to inform virtual simulations of orbital dynamics; satellite navigation, guidance, and control; payload operations; RF link budgets between separate network nodes; etc. in order to generate actionable intelligence regarding a future state of the network. This actionable intelligence may be inferred from the simulations and packaged into something like time-based stored commands that invoke, or trigger, network signaling events in the MME, base station, or even the UE, that might optimize network routing, connectivity of network nodes, power consumption of network infrastructure, spectrum resource allocation, base station operations, spacecraft operations, etc. The desired optimization algorithm might be stored as a database that can vary by time and be readable and writeable such that it can be accessed and re-configured (e.g., by the NOC) depending on external changes/influences, such as emergencies/disasters.

The MME enhancement might take the form of a peripheral application running on the same computer as the MME, or perhaps on a separate processor. The enhancement makes use of four possibly distinct databases that might be informed by the NOC or the TTCC&DH system in the space network.

A Historic Network State Space (HNSS) database might comprise historic data including satellite positions, velocities, attitudes, attitude rates, network operations/states, and network log files. The HNSS database is informed by the TTCC&DH system when satellites downlink their telemetry data, or satellite telemetry data is collected.

A Network Model (NM) database might comprise data that characterizes the environments that need to be simulated, as well as operational capabilities/characteristics for each of the satellites in the network. As satellites are added to the network, and satellites malfunction, or die, the NOC, or anomaly telemetry from the TTCC&DH system could change the status each spacecraft's operational characteristics.

A Constellation Location Register (CLR) database is a space-based correspondence to the HLR feature, and stores positioning information about UEs and network relevant points of interest. UE positioning information may be updated by the recorded tracking data for each UE, which is stored to be sent to both the CLR and the HSS. The NOC may update, delete, or add relevant points of interest for network operations.

A Constellation Policy and Rules (CPR) database stores information about flight operations rules for network space hardware, as well as policy and QoS requirements for relevant virtual points of interest for the network. The CPR might be updated by the NOC.

These four databases contain information used by a network state space prediction engine. The network state space prediction engine uses orbital dynamics processes, spacecraft attitude dynamics/control processes, and link budget/RF systems processes to accurately simulate, and predict, the state of the space-based network in time in the future. The network state space prediction engine might leverage some optimization processes that optimize network operations based on policies, rules, etc. in the databases.

The network state space prediction engine might generate a series of itineraries for various elements in the space network. In one embodiment, there might be three separate sets of itineraries. One might be the spacecraft Itinerary, which may be intended for use by the flight software in the space network. Another might be the core network itinerary, which might be intended for delivery to the enhanced MME function in each satellite. Finally, there might be an RAN itinerary, which would be intended for use by the base stations in the satellite network. Since each spacecraft is a host of an EPC and/or base stations, then these itineraries might be packaged into a common database called the state space (SS) database. This database might be distributed throughout the network for use by each of the spacecraft.

Figure 11:
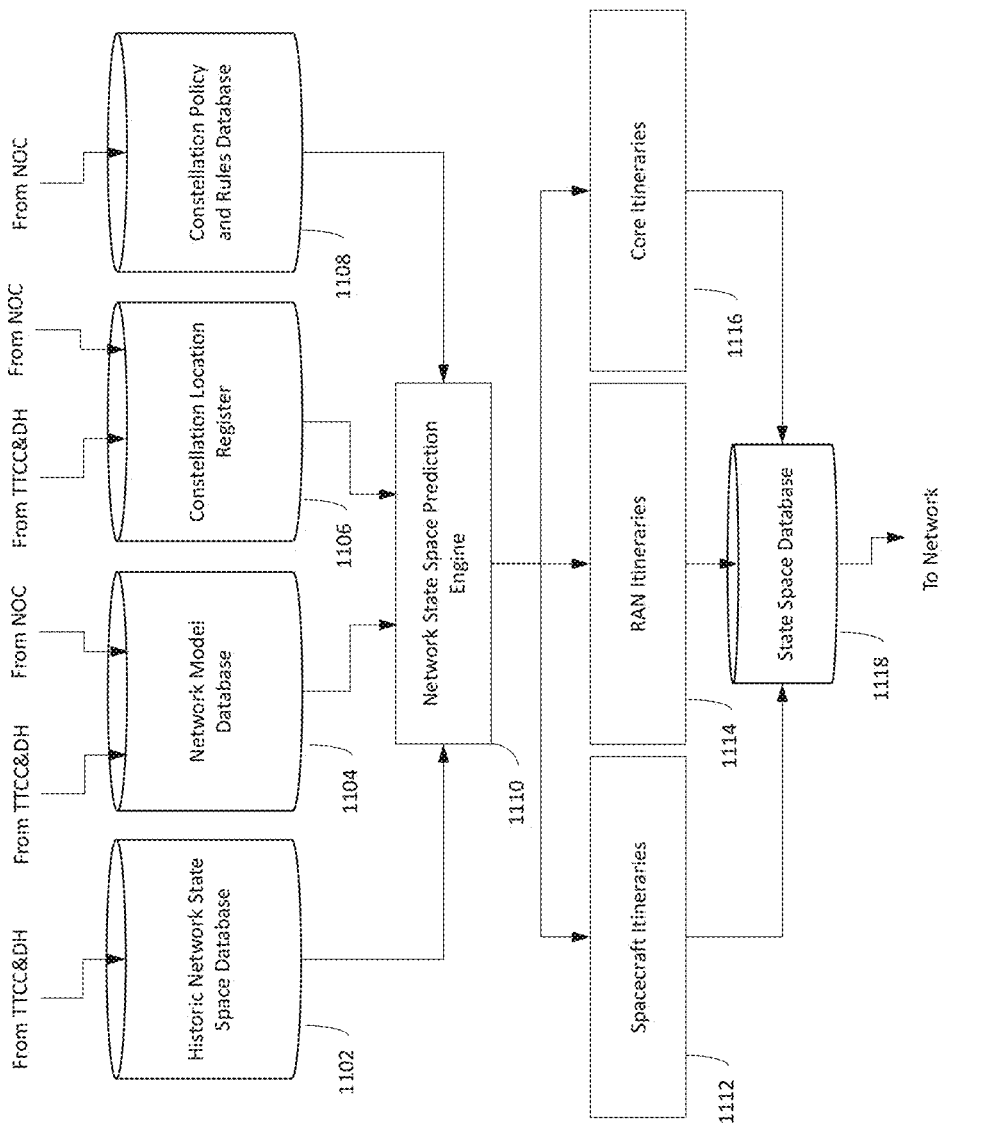
FIG. 11 illustrates components that are added to an MME to enhance the MME and enable it to manage mobility between the coverage areas described on the Earth (and the corresponding UE subscribers on the ground).

FIG. 11 illustrates a flow diagram that describes the procedure that can be implemented as an additional feature to be used by the enhanced MME. The enhanced MME may manage mobility with a process that predicts the future state space of the network. To do this it might leverage four databases namely a historic network state space database 1102, the network model database 1104, the constellation location register 1106, and the constellation policy and rules database 1108. These MME might receive information from either the TTCC&DH system, or the NOC, and store that information in those databases. These MME might feed information into a network state space prediction engine 1110 that would use orbital mechanics and attitude dynamics and link budget prediction software to analyze possible network connection scenarios (for base stations, ISLs, GSL, etc.). From this analysis, the network state space prediction engine would generate itineraries, namely, a spacecraft itinerary 1112, a E-UTRAN itinerary 1114, and an EPC itinerary 1116. These itineraries may contain relevant information for how to manage/operate (e.g., time-based control plane signaling commands) in the TTCC&DH control plane, the EPC control plane, and the E-UTRAN control plane. These itineraries may be combined into one common state space database 1118 that is built to support the enhanced MME as it comprises network operations info for space-based infrastructure for some amount of time into the future.

B.1 Historic Network State Space (HNSS) Database

Figure 12:
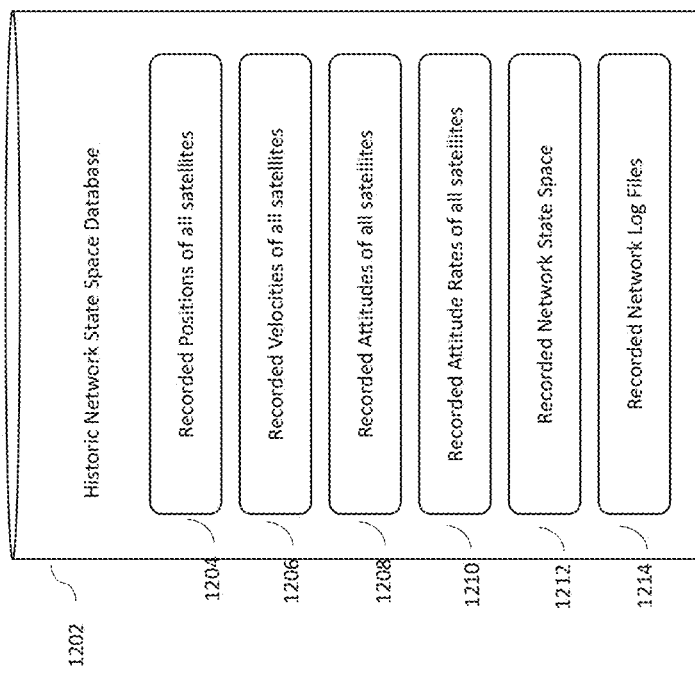
FIG. 12 illustrates a Historic Network State Space Database.

FIG. 12 is an illustration of a historic network state space database 1202. The database 1202 may include recorded positions of network satellites 1204, recorded velocities of network satellites 1206, recorded attitudes/orientations of network satellites 1208, recorded attitude rates of network satellites 1210, recorded network state space data 1212, and recorded network log files 1214.

B.2 Database of Base Stations, UEs, and GS Positions and Velocities

Figure 13:
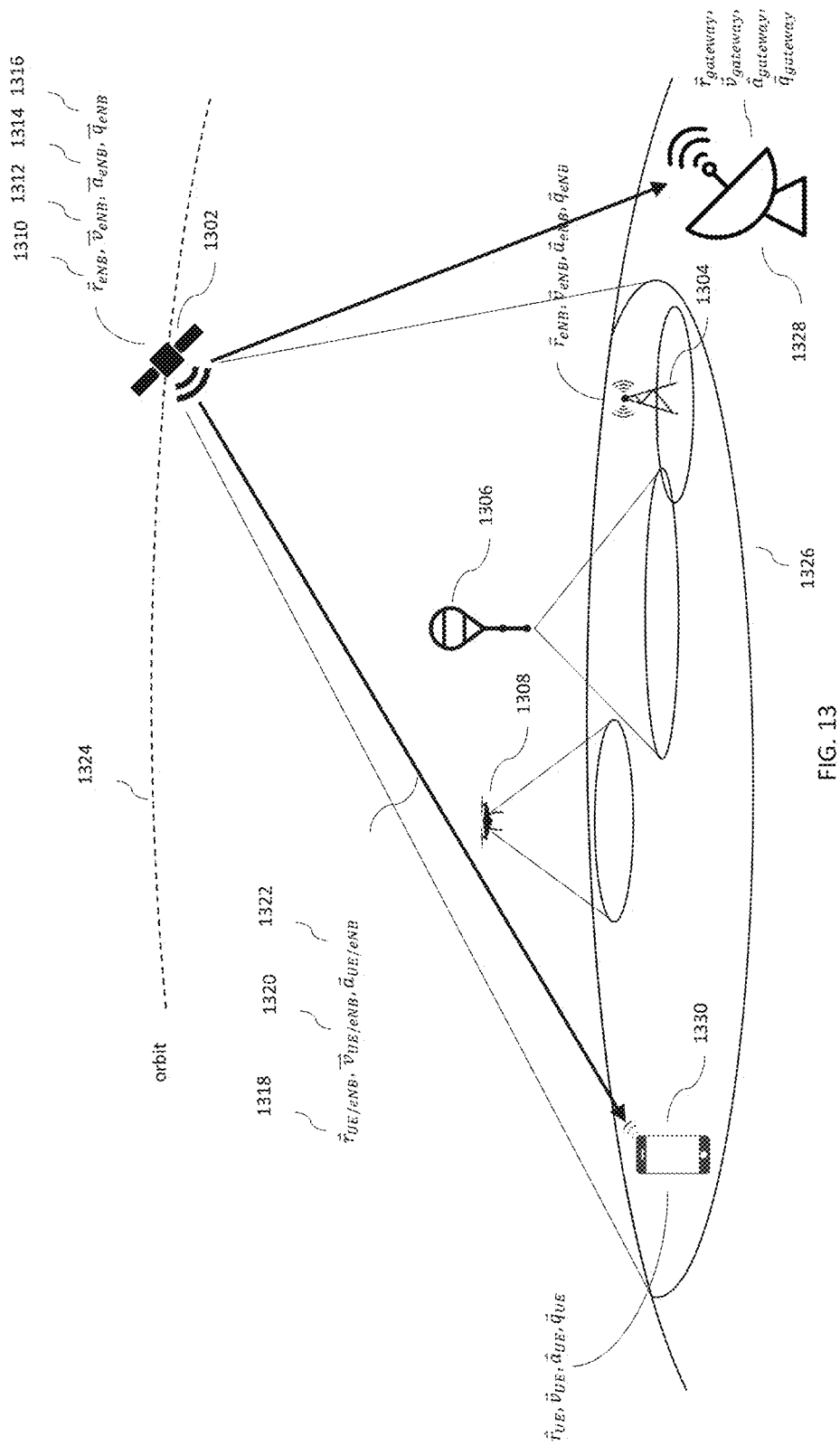
FIG. 13 illustrates how a network of nodes may manage infrastructure in a variety of state space configurations, resulting in unique position, velocity, acceleration, and orientation state vectors.

FIG. 13 illustrates a scenario of various platforms in a network which might be tracked and their state space stored. An orbiting base station 1302 may orbit the Earth at some orbital altitude 1324 utilizing a communications system (e.g., antenna and RF front end) that might close a communication link to a standard UE 1330 utilizing some 3GPP protocol such as GSM, EDGE, CDMA, LTE, etc. The orbiting base station may maintain connection to the ground via a ground station IP switch 1328 for access to the Internet and other MNO provider networks. The orbiting base station might have a position, velocity, acceleration, and orientation (or attitude) that are best described by a series of state space vectors: position $\vec{r}_{eNB}^{ECEF}$ 1310, velocity $\vec{v}_{eNB}^{ECEF}$ 1312, acceleration $\vec{a}_{eNB}^{ECEF}$ 1314, and orientation $\vec{q}_{eNB}^{ECEF}$ 1316. These state space vectors can be represented in any coordinate frame. Often satellite state vectors are tracked in Earth centered, Earth fixed (ECEF), which rotates with the Earth's body, or Earth centered inertial (ECI), which remains fixed in inertial space coordinate frames.

A network computer or orbiting base station might maintain a representation of an orbiting object's position in inertial space, perhaps expressed as a vector of size 3×1, to represent the satellite position in a three-dimensional coordinate frame, as shown in Equation 1.

$$\vec{r}_{eNB}^{ECEF} = \begin{bmatrix} x_{eNB} \\ y_{eNB} \\ z_{eNB} \end{bmatrix}^{ECEF} \quad \text{(Eqn. 1)}$$

A network computer or orbiting base station might maintain a representation of the orbiting object's velocity and acceleration may be stored in a similar manner, as shown in Equation 2 and Equation 3.

$$\vec{v}_{eNB}^{ECEF} = \dot{\vec{x}}_{eNB}^{ECEF} = \begin{bmatrix} \dot{x}_{eNB} \\ \dot{y}_{eNB} \\ \dot{z}_{eNB} \end{bmatrix}^{ECEF} \quad \text{(Eqn. 2)}$$

$$\vec{a}_{eNB}^{ECEF} = \dot{\vec{v}}_{eNB}^{ECEF} = \ddot{\vec{x}}_{eNB}^{ECEF} = \begin{bmatrix} \ddot{x}_{eNB} \\ \ddot{y}_{eNB} \\ \ddot{z}_{eNB} \end{bmatrix}^{ECEF} \quad \text{(Eqn. 3)}$$

Various components can store representations of position, velocity, acceleration, etc. One storage method is to store an orientation of a rigid body in a three-dimensional coordinate system. One representation uses Euler angles, where three angles, stored in a 3×1 vector representing rotations in degrees about three axes, represented in a rotating, or fixed, coordinate frame of reference. One representation uses roll, pitch, and yaw, which represent axial rotations about the z-axis in the body frame of the rotating object, then the y-axis of the body frame, and finally the x-axis of the body frame (often denoted as a z-y'-x" rotation). Another representation uses nutation, precession, and spin, which represent axial rotations about a fixed coordinate frame z-axis, then the x-axis, and then again about the z-axis (z-x-z). Yet another representation stores orientation information, or attitude information, as a quaternion, which is a 4×1 vector representing an axis of rotation and an angle. The orientation vector of an orbiting object stored as an Euler angle may take the form shown in Equation 4.

$$\vec{q}_{eNB}^{ECEF} = \begin{bmatrix} \theta_{eNB} \\ \varphi_{eNB} \\ \gamma_{eNB} \end{bmatrix}^{ECEF} \quad \text{(Eqn. 4)}$$

An orbiting object might typically host an attitude determination and control system (ADCS), which may determine and then control (using actuators to provide torque to the spacecraft rigid body) its orientation in three-dimensional space. With this system, attitude re-orientation maneuvers can be planned and the angular velocity of the base station, $\vec{\omega}_{eNB}^{ECEF}$, can be tracked and even predicted into the future.

The orbiting base station may provide coverage to UEs within range of some coverage footprint 1326 on the ground. This coverage footprint may comprise single, or multiple spotbeams, utilizing multiple apertures, phased arrays, etc. technologies to provide sufficient RF coverage.

Below the orbiting base station, there may be other base stations operating on drones 1308, balloons 1306, or towers 1304, that also have some position, velocity, acceleration, and orientation in inertial space, or perhaps an Earth fixed coordinate frame. Similar to the orbiting base station, they too would have coverage footprints, perhaps comprising coverage areas generated by multiple antennas, or an array. In addition to base stations, there may be UEs 1330 as well, which also have a position, velocity, acceleration, and orientation in a coordinate frame.

With positions and velocities of each base station known, a calculation can be done for the vector defining the positions and velocities of each base station with respect to each other in the network. Similarly, known positions and velocities of each UE allow a calculation for vectors describing the relative position and velocity of UEs to an orbiting base station. For instance, the vectors describing the relationship between an orbiting eNB and a UE might be relative position 1318, relative velocity 1320, and relative acceleration 1322.

In current cellular architectures, GPS locations of transmitter towers are often recorded and stored so that relative positioning via triangulation can generate a specific position result based on known coordinate frames. UE positions are tracked at a network level, but are not more exact than network location codes and IDs that identify a particular serving tower, or transmitter, or base station. Sometimes tracking is limited to just serving MME, which may only specify a certain geography, or region, covered by any of the base stations under control by that MME. As a result, the typical terrestrial network has no knowledge of UE position and velocity via the RF air interface and control plane. Some applications may log GPS position and enable back end tracking via a server. However, in these scenarios, the user can only be tracked as long as they have a connection to the appropriate IP server that is tracking the GPS reading on the device.

As described in Speidel I, the proposed orbiting mobile network can implement an air interface measurement based on RF signals (e.g., handset GPS is not required) from the UE on the RACH to measure position and velocity accurately enough to store, and maintain a database of these state vectors that can be used for mobility management, which is explained in more detail herein.

The proposed architecture of using orbiting base stations presents the challenge of needing to manage network communications and traffic routing using network infrastructure that is constantly moving, and moving very quickly. However, orbital mechanics and sufficient modeling combined with telemetry measurement can allow for accurate prediction of the future state vectors for an entire fleet of orbiting base stations.

The database of network element positions and velocities may also include locations and addresses of many ground stations serving the satellite network. The database may even store an orientation of the gateway in some coordinate frame, that relates the antennas' pointing direction to the coordinate frame in which the satellites are being tracked.

C. Description of Network Model (NM) Database

Figure 14:
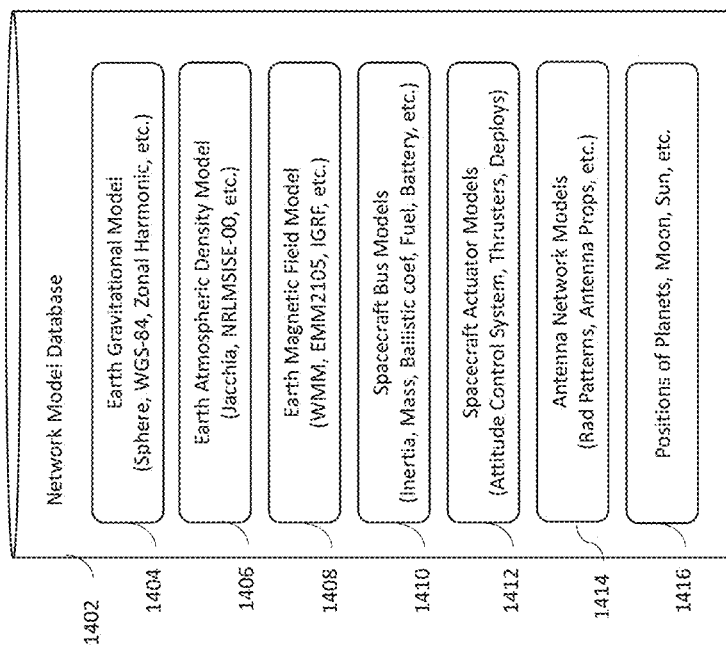
FIG. 14 illustrates a Network Model database.

FIG. 14 illustrates a network model database 1402. The database might comprise a gravitational model for the Earth 1404, a model for Earth's atmospheric density 1406, a model for the Earth's magnetic field 1408; a model of a spacecraft bus system 1410, a model of spacecraft actuators 1412 such as thrusters, attitude controls, etc., models of each antenna in the network on each spacecraft, predominantly antenna radiation patterns for link budgets 1414, and a model of the Solar System including the positions of the Sun, Moon, planets, etc. 1416.

C.1 Earth's Gravitational Model

A database of the Earth's gravitational field model may be utilized such that forces from the Earth's gravitation on the satellite can be based on present and future positions of the satellite. The gravitational model of the Earth may take a variety of forms—some offering a tradeoff between accuracy and timeliness of computation. For instance, a simple spherical gravity model of the Earth may be implemented, a WGS-84 ellipsoid gravity model of the Earth may be implemented, or an n-order summation of terms using coefficients that describe the zonal harmonic gravitational field of the Earth may be implemented (e.g., harmonics through J4 may be sufficiently accurate). Various options provide varying fidelity and timeliness of computation of acceleration. Many models can be stored such that a function can be called to compute the acceleration as a function of the satellite's position with respect to an ECEF frame.

The torque resulting from gravity gradient forces on the satellite may be equivalent to the cross product of the force of gravity acting on the satellite and the vector describing the position of the satellite center of mass relative to the satellite center of gravity. Gravity acts through the center of gravity of the satellite, and the satellite rotates about its center of mass as in Equation 5.

$$\vec{T}_{gravgrad}^{ECEF} = \vec{F}_{grav}^{ECEF} \times (\vec{r}_{eNB,COM}^{ECEF} - \vec{r}_{eNB,COG}^{ECEF}) \qquad \text{(Eqn. 5)}$$

C.2 Earth's Atmospheric Model

An atmospheric model of the Earth may also be stored to support computation of orbital and attitude perturbations due to drag. The atmospheric model implemented may be one or many, such as NRLMSISE-00, Jacchia, JB2008, etc. The output of these models to support state space prediction might be density and temperature, which are the atmospheric characteristics that drive atmospheric drag forces on satellites. In addition to atmospheric density, the ballistic coefficient of the satellite also drives the atmospheric drag calculation.

The force of drag on a satellite may be computed as a function of the satellite's position in orbit, velocity in orbit, the date/time (depending on the model), the atmospheric model to be used, and the orientation of the satellite as in Equation 6.

$$\vec{F}_{drag}^{ECEF} = \text{dragModel}(\vec{r}_{eNB}^{ECEF}, \vec{v}_{eNB}^{ECEF}, t, \text{model}, \vec{q}_{eNB}^{ECEF}) \qquad \text{(Eqn. 6)}$$

The torque resulting from atmospheric drag forces on the satellite may be equivalent to the cross product of the force of drag acting on the satellite and the vector describing the position of the satellite center of mass relative to the satellite center of pressure. Drag force acts through the center of pressure of the satellite, and the satellite rotates about its center of mass as in Equation 7.

$$\vec{T}_{drag}^{ECEF} = \vec{F}_{drag}^{ECEF} \times (\vec{r}_{eNB,COM}^{ECEF} - \vec{r}_{eNB,COP}^{ECEF}) \qquad \text{(Eqn. 7)}$$

C.3 Earth's Magnetic Field Model

Earth's magnetic field may be modeled as well. This model could be useful when magnetics is used on the spacecraft for attitude determination and control. This is particularly useful in LEO orbits where the magnetic field of the Earth is of an absolute value that is both easy to measure and or push against using on board magnetic torquers. The magnetic field model may take various forms, similar to the gravitational model of the Earth. The model may allow for the computation, or look up, of the $\overline{B}$ field at the position of the satellite as a function of the position of the satellite and the date and time of the desired measurement. An example of a magnetic field model is the International Geomagnetic Reference Field (IGRF), World Magnetic Model (WMM), or the Enhanced Magnetic Model (EMM2105), etc. as in Equation 8.

$$\overline{B}_{eNB}^{ECEF} = \text{magneticModel}(\vec{r}_{eNB}^{ECEF}, t) \qquad \text{(Eqn. 8)}$$

The torque resulting from magnetic forces on the satellite may be equivalent to the cross product of the magnetic dipole of the spacecraft (induced intentionally by magnetic actuators, but also unintentionally by electronic equipment on board the satellite, etc.) by the magnetic field around the satellite at that moment in time as in Equation 9.

$$\overline{T}_{mag}^{ECEF} = \overline{m}_{eNB}^{ECEF} \times \overline{B}_{eNB}^{ECEF} \qquad \text{(Eqn. 9)}$$

C.4 Spacecraft Bus Models

The spacecraft bus models might include data on the specifications of subsystems on the spacecraft. The amount of data that could be stored about a spacecraft's technical characterization and performance is immense, but the following describes a list of some data that might be useful in an applicable embodiment. The spacecraft bus models would be informed by the TTCC&DH system as telemetry is taken from spacecraft during operations. However, at the beginning of life, the models may be established based on initial performance after ground testing, as an example.

There may be structural/mass information about the spacecraft in the database. The spacecraft bus model may store the spacecraft dry mass, wet mass, current mass, and moment of inertia matrix, etc. This may also include the current mass of fuel available on the spacecraft. This data may be from telemetry readings on the spacecraft and get updated over time. The inertial state matrix may be refined by on-board measurements at the spacecraft as it measures attitude rate results from known torques applied to the bus. As maneuvers are made, error can be measured in the modeled change in angular rotation rates, which can be used to measure disturbance torques, and/or changes in the inertial state matrix of the satellite. In addition to mass values, the spacecraft inertial tensors might be stored as well. This might be a 3×3 array describing the moment of inertia of the spacecraft. There may be further structural information about the thickness and structural size of the spacecraft and its appendages. A Parasolid model of each spacecraft could even be stored, if power and thermal simulations in the Enhanced MME were to leverage a Parasolid in a finite element analysis simulation.

Related to mass information, the drag characteristics, such as the ballistic coefficient, of the satellite may also be stored. The drag coefficient of the satellite may vary as a function of its angle of attack, or orientation, with respect to the satellite velocity vector. A database of the drag coefficient may be stored as a matrix where rows and columns indicate angle offset (elevation and azimuth) from velocity. The solar reflectivity of the satellite may vary as a function of orientation as well—except in this case, orientation relative to the position of the sun with respect to the satellite. The ballistic coefficient may be calibrated, and/or refined, on orbit over time based on measured errors in modeled trajectories from the state space prediction function as in Equation 10.

$$C_b = \text{ballisticCoef}(\vec{q}_{eNB}^{ECEF}, \vec{v}_{eNB}^{ECEF}) \qquad \text{(Eqn. 10)}$$

In a similar manner, the database may also store how the satellite center of pressure and center of gravity vary as a function of orientation of the spacecraft (with respect to the Earth and its velocity vector).

The database may also store thermal information about the spacecraft. This may be as simple as a vector for each side of the spacecraft holding the absorptivity and emissivity values of each side. There may be other vectors too, describing the thermal conductivity paths throughout the spacecraft.

The power system may be modeled as well, where power draw from the spacecraft is quantified when operating in certain modes, or as a function of what components are receiving power distribution. The battery may also be modeled, where charge and discharge rates and curves are recorded from testing (and also updated from telemetry after operating on orbit). This information can be used in power simulations to ensure that the network state space predictor does not command satellites to operate outside of their limits with respect to power consumption and storage.

C.5 Spacecraft Actuator Models

The database storing actuator models can quantify performance of thrusters, attitude control actuators, etc. There may also be data stored about actuators for deployment of other systems like antennas and solar arrays.

For a propulsion system, the database may include mechanical information about actuating vectors provided by the thrusters. This may be a vector in the body frame of the spacecraft. The propulsion system may also have performance such as thrust, Isp, mass flow rate, etc. possibly as a function of operating regime (e.g., pressure, temperature, power input, etc.). The amount of fuel would be monitored during flight and inform/update the model based on measured changed in thrust, power, etc. from the performance at launch.

For an attitude control system, the database might be a series of vectors indicating the mechanical layout of the attitude control system. For reaction wheels, these vectors might be the normal vectors to the wheels in the body frame of the spacecraft. For torque coils, this might be the plane of the coil. Other information about the system might be stored, such as torque that can be applied as a function of operating regime (e.g., current applied to actuator, etc.).

C.6 Database of Network Antenna Orientations

A spacecraft used for the space network might host a series of antennas for communication between the base station and UEs on the ground, communication between the base station and other base stations in orbit (or perhaps MMEs in orbit) via ISL (ISLs), and/or communication between orbital base station/MMEs and ground gateway antennas serving as an additional MME, a P-GW, or an S-GW. When a spacecraft is designed, the selection of location of these antennas is usually known, documented, and can be saved into a database where individual spacecraft design characteristics would be saved.

The antennas on the spacecraft may be of a variety of types, or one single type. Analog antenna technologies allow for an antenna physically oriented in a particular direction to generate a radiation pattern of RF describing its directivity or gain, as a function of orientation/angle relative to the boresight of the antenna (typically its direction of orientation). Antennas that behave like this may be parabolic dishes, horn antennas, helical, quadrifilar, or patch antennas. Digitally steered antenna arrays might also be used. A digitally steered antenna, or phased array, may comprise multiple analog elements, like helical, patch, dipole, etc. arranged in an array allowing for spacing to accommodate particular gain requirements over a certain bandwidth for use. A phased array may have a mechanically fixed orientation, defining a boresight, but a beam can be digitally steered off of that boresight vector by offsetting the phase of the transmitted signals through each element in the phased array. Thus, a phased array may have one $\hat{n}_{ant}^{ECEF}$ and may have multiple beams $\hat{b}_{beam,i}^{ECEF}$. The vector described by $\hat{b}_{beam,1}^{ECEF}$ therefore can be a function of the articulated phase difference, and its implementation could be saved as two angles, or a vector of phase offsets representing phase offsets at each mechanical element in the phased array.

The performance characteristics of the antennas on board a spacecraft may be measured and calibrated on the ground before flight. A data set describing the antenna gain, directivity, VSWR, etc. as a function of both frequency and orientation relative to $\hat{b}_{beam,1}^{ECEF}$ and/or $\hat{n}_{ant}^{ECEF}$ may be saved and stored for each spacecraft base station and its transmitting apertures/elements.

In a particular embodiment, the payload antenna may communicate with UEs on cellular bands in the sub 1 GHz range. A single antenna and RF front end filter/LNA bank might be designed to accommodate many cellular bands between 600 MHz and 960 MHz. Intersatellite link antennas and ground station link antennas may utilize a higher frequency, such as S, X, Ku, Ka, V, or W band. Abundant proliferation of hardware, RF components, and ground stations that are compatible with S, X, Ku, and Ka band may drive design decisions for these transmitting links.

Figure 15:
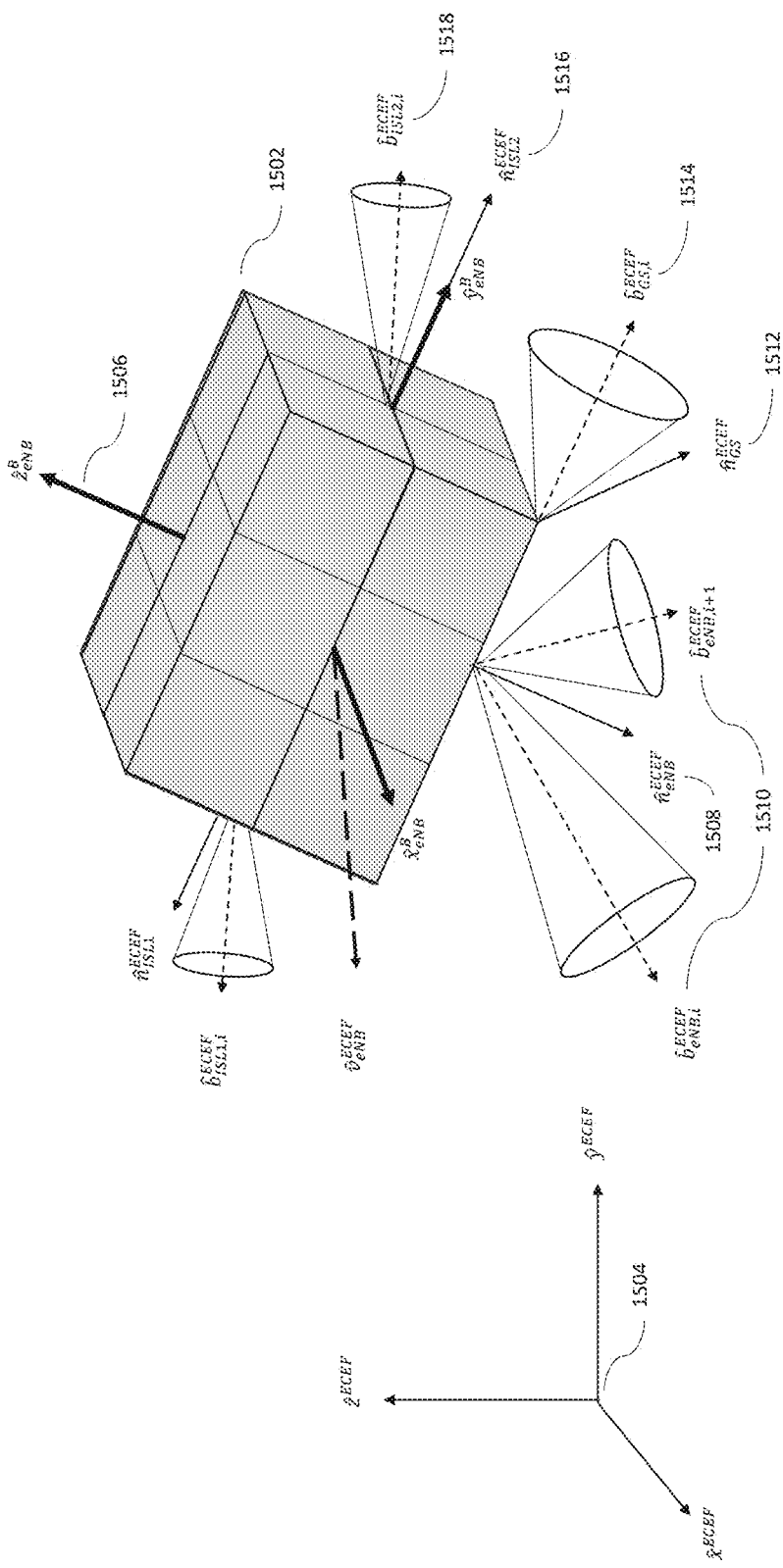
FIG. 15 illustrates how a body frame of a spacecraft with beams for intersatellite, ground station, and base station links may be managed and stored.

FIG. 15 illustrates how a spacecraft 1502 may host a variety of antenna beams for use to create ISL connections, GSL connections, or connections to UEs. The spacecraft body frame of reference 1506 may be oriented with respect to some other frame of reference 1504 such as the Earth-centered, Earth-fixed (ECEF) coordinate frame. The antennas supporting the various communication pathways may have a physical orientation on the body of the spacecraft, that in a particular orientation, give them pointing vector of, as an example, $\hat{n}_{eNB}^{ECEF}$ 1508, $\hat{n}_{ISL}^{ECEF}$ 1516, and $\hat{n}_{GS}^{ECEF}$ 1512. Many vectors can have some orientation in the ECEF coordinate frame. Each antenna may be able to accommodate some number of beams, which may be articulated based on some phase shifting network that allows them to be directed toward some vector, $\hat{b}_{eNB,i}^{ECEF}$ 1510, $\hat{b}_{ISL,i}^{ECEF}$ 1518, and $\hat{b}_{GS}^{ECEF}$ 1514, many also with some orientation in the ECEF coordinate frame.

A relationship of the beam vector with respect to the antenna pointing vector may be defined as some rotation matrix that corresponds to some axis and angle relative to the body frame of the spacecraft. It would also correspond to some phase shifting of the RF network behind the antenna, allowing for beamforming. A relationship between phase shifting and beam offset from the antenna aperture vector may be saved in some database.

Each beam and antenna may have a unique directivity, gain, VSWR, etc. as a function of orientation (e.g., a three-dimensional mesh describing these variables with angle offset from $\hat{b}$ and/or $\hat{n}$) relative to link budget geometry.

This information may be saved numerically in a database as the gain radiation pattern of the antenna flying on the spacecraft. This may be a matrix of dB in rows and columns where rows indicate an angle offset in the E and H field. The database may also include information about the position and orientation of the antenna in the body frame of the spacecraft, such that the orientation of the antenna can be computed in inertial space given any attitude.

In the case of a phased array antenna, the radiation pattern may be saved as a three-dimensional matrix of dB values in rows, columns, and lanes, where rows and columns indicate angle offset in the E and H field relative to the direction of the beam being formed by the array and lanes indicate the radiation pattern at given phase-offsets for beam-forming at certain angles from boresight.

The gain provided by a beam in a particular direction—e.g., toward a UE—might be modeled by the previously described three-dimensional matrix, such that a function can be called using the satellite orientation, the antenna orientation, the beam orientation, and the vector describing the location of the UE relative to the antenna as in Equation 11.

$$G_i = \text{antennaPatternModel}(\vec{q}_{enB}^{ECEF}, \hat{n}_{ant}^{ECEF}, \hat{b}_{beam,i}^{ECEF}, \vec{r}_{UE/enB}^{ECEF}) \quad \text{(Eqn. 11)}$$

C.7 Database of Positions of Planets, Moon, and Sun

Additional databases may be stored to support computation of orbital perturbations that do not necessarily drive the orbital dynamics of a satellite but can create measurable trajectory deflections that should be modeled for accuracy of state space predictions. An example of this type of database may be a map of the planet positions in the solar system (including the Sun and Earth's Moon). The positions of the planets in their orbits around the sun can be modelled with simple polynomials that can compute positions of the planets in the future based on a desired date and time as in Equation 12.

$$\vec{r}_{planet}^{ECEF} = \text{planetModel}(t) \quad \text{(Eqn. 12)}$$

D. Constellation Location Register (CLR)

The Constellation Location Register is the database that holds much of the information needed for the state space prediction engine to analyze the coverage dynamics of the network base station transmitters. The database can be implemented as a list of positions with respect to the Earth's surface that are of interest to the network.

Figure 16:
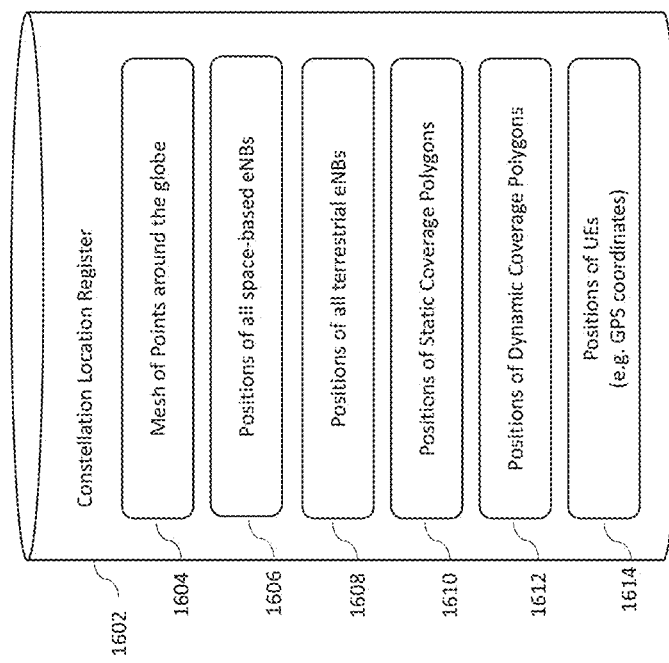
FIG. 16 illustrates a Constellation Location Register.

FIG. 16 illustrates the Constellation Location Register 1602. The database may include a mesh of points around the Earth 1604, positions of space-based base stations 1606, positions and coverage polygons of terrestrial base stations 1608, positions of "static" coverage polygons for the space network base stations 1610, positions of Dynamic Coverage Polygons from the space network 1612, and positions of UEs (e.g., GPS coordinates) 1614.

D.1 Database of Mesh Points

As components of the space-based network develop a model of the Earth, which can be done as a mesh of points, they can store this in a database. This mesh of points might be randomly generated, perhaps once, or repeatedly so. Alternately, this mesh might represent a structured grid around the Earth. For example, a mesh of one million points evenly spaced around the Earth could provide geospatial fidelity of about 500 sq. km. grids (about 22 km×22 km squares).

In a particular embodiment, a mesh might be weighted based on population density, where cells are smaller and more tightly packed. The mesh may also be made for particular refinement of network performance analysis in a specific geographic location, and thus the mesh is densified in certain geographies.

In another embodiment, many meshes may be made, and filtered based on type (e.g., only water, only certain countries, only certain states, etc.)

For each mesh point in the database at any given time, there may be a list of rules or policies for that point in the mesh. Each specific point in the mesh may have no rules, or many rules, such as what frequencies can be used there, or how much signal energy can be radiated on that point in the mesh on a given frequency and across a certain bandwidth. Each of these rules might be defined by polygons, and each point in the mesh may have multiple rules as a result of being covered by multiple polygons. This data may be stored in a separate database with other policies/operational requirements, or constraints, called the Constellation Policy and Rules (CPR) database.

D.2 Database of Base Station Polygons

In one embodiment, there may be a database of polygons, which are to represent terrestrial cells, that are described by center points, and points representing a terrestrial base station cell edge. Additional information about the polygon may be stored as well, such as a cell ID, MCC, MNC, S-GW, P-GW, and perhaps coverage information, such as, protocol of coverage (e.g., GSM, LTE), frequency, antenna gain, RSSI from the cell and neighbor cells at each point in/on the polygon, etc.

Additional polygons may be stored in this database that represent target coverage cells for the space network (e.g., specific geographic regions which a network provider has agreed can be deployed in that area since no other towers are deploying spectrum there). These coverage cells may be static on the Earth's surface and of a diameter corresponding to a size that a set of antennas on orbiting base stations can cover (e.g., orbit height, gain, and beam width) at that frequency. These polygons may be stored with a center and edge points with specific latitude, longitude, altitude coordinates, as well as a series of additional data points. For each of these data points might be what frequencies are licensed for use by the space network at that location, bandwidth requirements for the location (e.g., MCS, bandwidth, data rate, etc.), approximate subscriber density, minimum RSSI from space network, maximum RSSI from space network, neighbor cells, neighbor cell RSSI, MCC, MNC, LAC, etc. Specific polygons may be created in the database to indicate coverage areas, which might be geographic areas that have common coverage requirements (e.g., frequencies, etc.) Each polygon may be described by a center point and edge points to define what points in the mesh it covers, or includes. The data stored about the center point may be different than the data stored for the points at the edge of the polygon (e.g., RSSI at center might differ from RSSI at edge).

Figure 17:
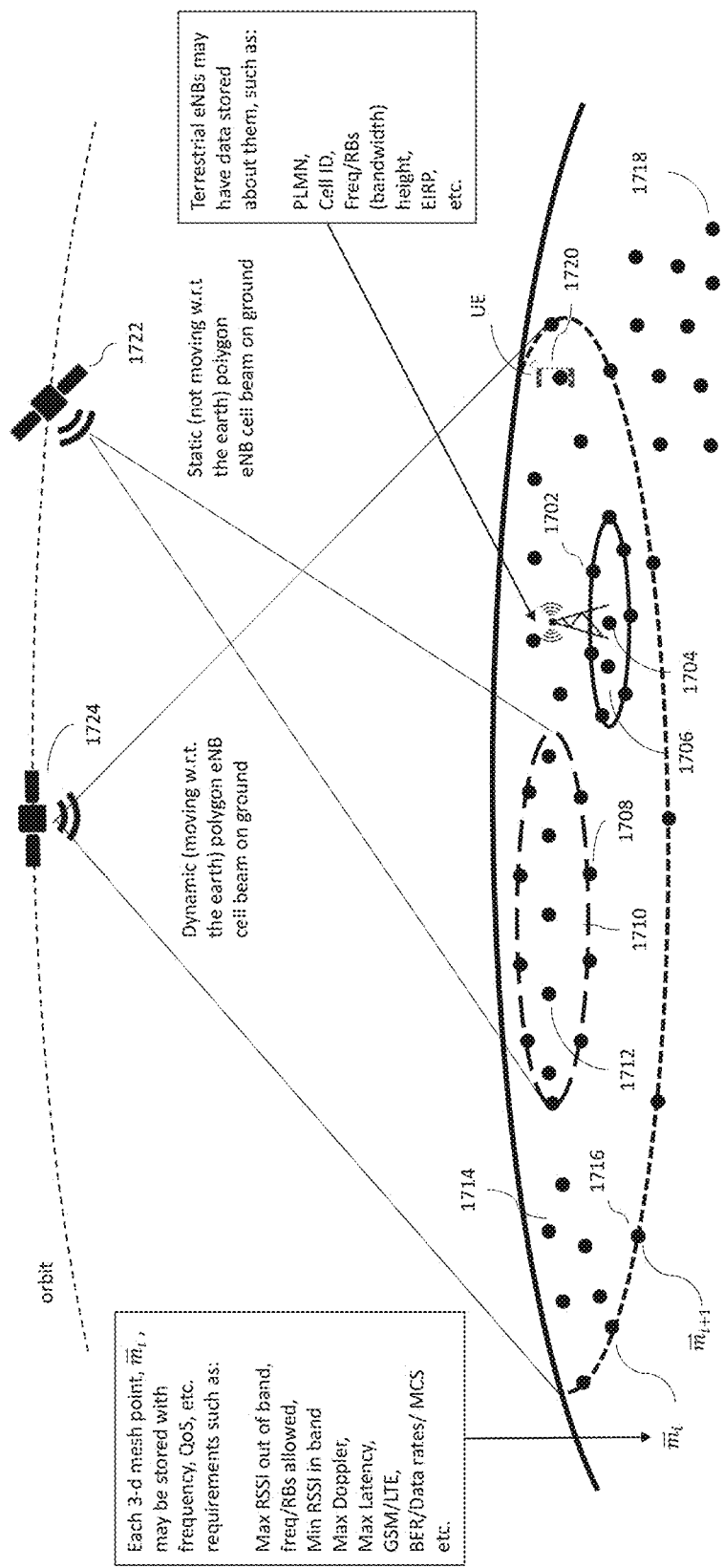
FIG. 17 illustrates mesh points and polygons that might be used by a network state space predictor.

FIG. 17 illustrates how a mesh database of points might be implemented. Shown is a series of points, which might be points in the mesh. Each point might be stored as a vector with three values indicating a position vector in the ECEF coordinate frame. There may be some satellites 1722 in orbit with beam steering capability and there may be other satellites 1724 without beam steering capability. The beam steering arrays can point at a static polygon base station cell 1710 on the ground, which might be described as a series of points of the mesh that falls inside 1712 and on the edge 1708 of the polygon. Arrays without beam steering might employ a spotbeam on the Earth that moves. These might be described in the database as dynamic polygon base station cells. Similarly, to the static cells, there may be points of the mesh that fall inside of the dynamic cell 1714 and some that fall on the edge of the cell 1716. Terrestrial base station polygons may be saved 1706 and they too may have mesh points inside of them 1704 and on the edge 1702. UE positions may also be included in the mesh, in some embodiments 1720. The mesh might cover the entire surface of the planet, and it is possible that some mesh points 1718 fall outside of existing polygons (terrestrial or otherwise).

D.3 Database of Polygon Positions and Velocities

The orbiting mobile network may make use of a database that contains information about specific polygons, or service areas, on the Earth's surface that are of some importance. As an example, a static polygon on the surface of the Earth may represent a license region for a particular frequency to be used by the orbiting satellite network. Alternately, there may be polygons that define specific service area that requires a certain level of service (e.g., data rates, data rates per sq. km., etc.) in order to meaningfully serve that geography from an orbiting transmitter. Some polygons in the database may be moving, and therefore the position and velocity is changing with time. This might be another satellite coverage footprint, as an example.

D.4 Static Cell Coverage Zones

Coverage areas for the satellite may be predefined as specific latitude longitude polygons on the surface of the Earth. These polygons may be large or small based on some requirement based on available spectrum from the satellite and the population density of the desired coverage area. The polygons would, ideally, be shaped based on some known radiation pattern of the aperture at various attitudes while in orbit so that the beams may fit nicely to the polygons defined on the ground. The polygons may or may not overlap, and with sufficient adjacent cell interference mitigation control, a little bit of error in signal energy radiation on the Earth's surface, on the order of a dB or two, should present no network issues. Alternately, the aperture may utilize a phased-array which would enable articulated spotbeams at some angle off of boresight with respect to the normal vector of the antenna. These polygons may also be driven by regulatory requirements, radio transmission license borders, service area requirements, and/or satellite constellation design. Polygons may be as small as an individual spotbeam of some characterization (e.g., some peak signal and then fall off to cell edge), or the country borders for a country, or large regions/swaths of the entire planet, where the signal requirements from the space network are constant (wide spread) and minimal (low signal energy).

The static cell coverage zones may each be defined as a polygon in a database with some amount of information such as location center, location shape (e.g., circle of some radius, rectangle of some length, or width, etc.), and/or vectors describing the border of the polygon in some coordinate system such as geodetic latitude, longitude, and altitude. The polygon information might also be stored with specifications for services in that cell. This may include peak power, minimum power, or some other signal energy or quality of service characteristic to inform the target coverage statistics for the cell and how the satellite might behave during the overpass (either from an attitude perspective, or a Tx power perspective and beamforming perspective). With static cells predefined for the network, they can be stored in a database either in the satellite network, or in a ground network, which can be accessed by the satellite network. Individual static cell coverage zones may be assigned specific satellites in the network for coverage. The satellite covering the static coverage zone may be stored in a timeline, where a certain satellite number is stored for a given time stamp when it may provide coverage to the static cell. A given static cell may be able to be provided with coverage by two satellites at once. Software might be executed to compute, on the ground network or in the space network, which satellite to transmit and cover the static cellular zone during the overpass with which it can provide coverage, resolving a possible contention. This software may use the predicted link budget conditions at each center of each polygon on the planet for each satellite. Whichever satellite has the best link budget with the cell at that time might maintain coverage for that cell. The software might also provide data about which satellite provides coverage based on power usage—perhaps certain battery capacity is desired for each satellite and the one with more battery capacity takes the lead.

Since the coverage zones are defined in a database as a certain shape with a certain center point, this might be used on the satellite end of the link to inform how to optimize coverage. Each coverage zone may have with it a defined level of service (e.g., what signal level is desired at a minimum at that cell for service by the satellite). Because of the defined service level and coverage area defined by the polygon, each satellite in the network may not be equipped to provide it coverage, and would ignore it, providing coverage to other areas where it is intended to provide coverage (and is designed to provide coverage). Satellites that can provide it coverage may be documented in the database, and perhaps even a configuration (e.g., number of beams needed for coverage) required by that satellite to provide the minimum desired coverage requirements. Specifically, the exact locations of where spotbeams would need to be centered may be specified in the database (e.g., to cover polygon Y, a first spotbeam might be directed at particular coordinates and a second spotbeam might be directed at other coordinates).

If the attitude determination system were used to slew and point an antenna at a certain location on the ground, the angle of rotation for cell coverage would create an elongation of the area of coverage for the satellite footprint or coverage area. Depending on the coverage polygon defined on the Earth, coverage may accommodate this elongation, and thus take the form of an oval, perhaps on the surface of the Earth.

D.5 Dynamic Cell Coverage Zones

Satellites without beamforming capabilities may not be able to easily point a beam toward a static polygon on the surface of the Earth. Instead, it may transmit from an aperture with a beam that is always oriented in the same direction with respect to the body frame of the spacecraft. In a scenario where the satellite is controlled to point the antenna nadir, this would result in a spotbeam that traverses over the surface of the Earth in a sweeping motion. Therefore, over time, the position of the polygon being covered by the satellite transmitter is dynamic with respect to the mesh describing the Earth, and the edge and center of the polygon may be a different mesh location in the database, at a different point in time.

Since the dynamic cells move with respect to the Earth, a dynamic polygon will be moving over mesh points on the Earth's surface with variable policy requirements, etc. As an example, there may be a large swath of mesh that defines all area between the middle of the Atlantic Ocean and the middle of the Pacific Ocean and the mesh points in those polygons might has the same policy requirements for one sliver of spectrum, which the dynamic cells can use as they sweep across large swaths of the Earth. In other words, network spectrum allocation may be distributed with more lenient rules across wide swaths to accommodate dynamic cells sweeping across the Earth, and allocate more spectrum, more strictly to the static polygons. If a static polygon cannot be serviced, the mesh comprising it can still be serviced using a dynamic cell that happens to be sweeping over it at a particular time.

An orbiting base station may be configured as a spacecraft with a software defined radio capability such that it can transmit at any LTE band within some range that can be sufficiently accommodated by the antenna selected for the link budget conditions defined by the satellite coverage area. In this manner, the orbiting base station may be treated by an UE as being a functional equivalent of a terrestrial base station.

When a coverage cell may be sweeping across the Earth, the database containing propagation data may be used to predict when cellular coverage from satellite might be available at a given location. As such, location of network neighbor cells on the ground that need to coordinate spectrum use in cooperation with the space network may be stored in a database similarly to the static cell coverage zones.

With the locations of tower, the incident signal energy on that tower's cell can be computed. A specific time can be computed to determined when, if the towers are sharing the same spectrum channel for communications with UEs, the tower signals between the terrestrial cell and the satellite may conflict and create interference. At this time, the networks could be programmed to automatically release control of the specific frequency bands, channels, etc. being used by the satellite in the space network overhead that happens to be overflying at that time. In doing so the spectrum can be shared temporally and used more effectively given an optimized coverage condition state. Thus, control or priority over a given channel can change over time based on where an orbital base station is.

Some polygons can be added to the database with service indicators such as which ones are priorities, and these may be added dynamically, with emergencies when communications are most needed by those geographic areas. Priorities may even be set as a function of time. So, the network may prepare in advance for an oncoming emergency. If a priority exists in the future, then the network may be able to preserve power to allocate more spectrum use to polygons in need/affected by weather or other emergencies likely to result in increased network usage. In some embodiments, polygons are not strictly polygonal and might have some curved boundaries, but generally can be treated as closed shapes having some finite area.

Figure 18:
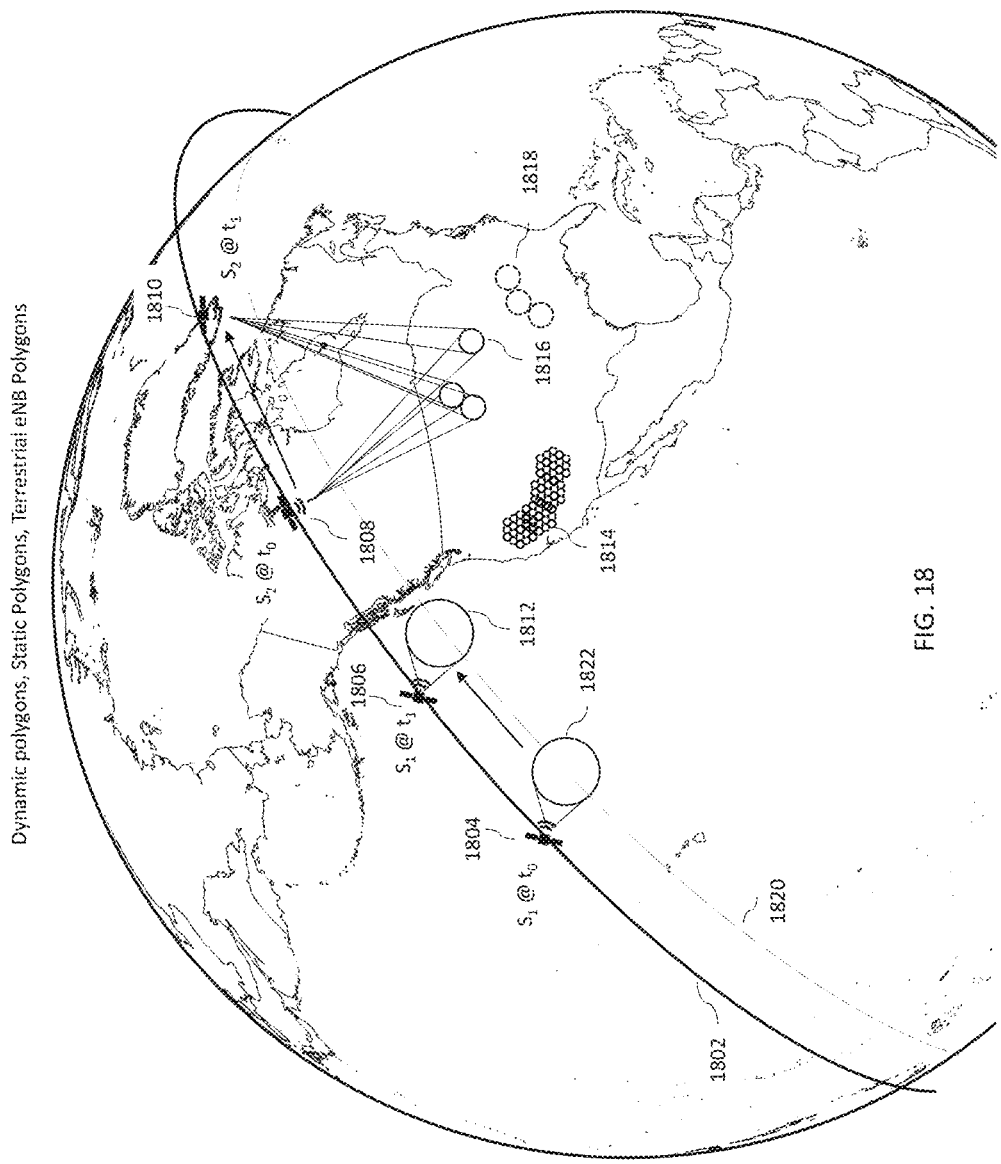
FIG. 18 illustrates satellites in orbit providing coverage to static base station polygons and dynamic base station polygons, separate from terrestrial base station polygons.

FIG. 18 illustrates what a dynamic and static polygon scheme may look like. Satellites operate in orbits 1802 that have some ground track 1820. A satellite without a beamforming antenna, $S_1$, is shown in FIG. 18 as of some initial time, $t_0$ 1804, and as of a later time, $t_1$ 1806. $S_1$ may provide coverage over dynamic polygon 1822 at the initial time, $t_0$. After moving in orbit, $S_1$ may continue to provide coverage on the earth at time $t_1$ providing coverage over dynamic polygon 1812.

Another satellite with a beamforming antenna, $S_2$, is shown in the figure at some initial time, $t_0$, 1808, and at a later time, $t_1$, 1810. $S_2$ may provide coverage over static polygon 1816 at the initial time, $t_0$, after moving in orbit, $S_2$ may continue to provide coverage on the earth at time $t_1$ providing coverage over the same static polygon 1816. As shown, a beamforming satellite may provide coverage to multiple static polygons.

Other static polygons 1818 may exist in the database and not get coverage at times. This may depend on timing and results of the state space predictor engine in the enhanced MME. Not shown in this figure, to maintain viewability, is the fine mesh that might be shown across the surface of the Earth. Each polygon may cover some mesh points, with some specific mesh points being the centers and edges of the drawn polygons. There may be other polygons 1814, which are also static, but are coverage polygons from existing terrestrial base stations.

E. Constellation Policy and Rules (CPR) Database

As mentioned above, the CPR may contain a set of data that states rules, regulations, policies, etc. for operating the space-based cellular network transmitters over the locations, or polygons for which these rules are mapped out. The rules for the mesh describing locations of interest to the network might be regulatory (e.g., frequencies, power levels, etc.) and quality of service (e.g., data rates, technology requirements, etc.) in nature.

Additionally, the CPR may hold a database of information for what orbit, attitude, thermal, and power constraints there are for operating each individual spacecraft in orbit.

Figure 19:
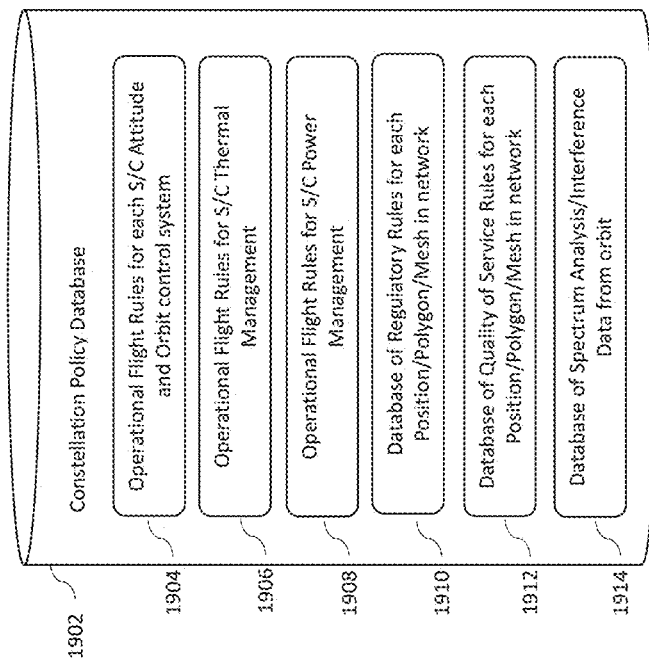
FIG. 19 illustrates a Constellation Policy Database.

FIG. 19 illustrates the constellation policy database 1902 and its contents. The database may include an database of operational flight rules for spacecraft attitude and orbit control systems 1904, a database of operational flight rules for spacecraft thermal requirements/constraints 1906, a database of operational flight rules for spacecraft power/battery requirements/constraints 1908, a database of regulatory rules for position/polygon/mesh points in the network 1910, a database of quality of service rules for position/polygon/mesh points in the network 1912, and a database of spectrum analysis/interference data taken from orbit 1914.

E.1 Database of Attitude and Orbit Control Flight Rules

Attitude and orbit control flight rules may be stored in a database in a variety of forms, which will be described here.

To support the prediction engine that uses force models and spacecraft characteristics, there may be a database that stores planned future thruster maneuvers, either as an itinerary of thrusts or delta-Vs. These planned maneuvers may be stored as vectors where each vector element represents a thrusting state in time. The vector may even be of voltage or current values, indicative of what control levels are to be used for a possible actuator of the thruster. The thrusts and delta-V computations for the future may be predicted based on satellite trajectories and corrections required to keep the satellite operating within a certain orbit, or control box in orbit. This control box may be dynamic, and change based on command by the network controlling NOC, as an example. This might result in a recalculation of delta-V maneuvers to achieve the correct orbital position per the NOC command. At that time, the database for flight maneuvers would be updated.

Similarly, to delta-V maneuvers, there may be a CONOP requirement for utilizing the spacecraft attitude control system. The spacecraft may store in a database, the vector that describes the torque vector that needs to be executed, or a pointing vector to align with in inertial space over the trajectory of the satellite into the future. An example may be that the satellite seeks to point a certain face of its body toward the Earth, another toward a satellite in front of it, and another in the direction perpendicular to those two vectors. In the same way that delta-V requirements can be predicted in the future, attitude control laws can as well. This can be done using rigid body dynamics simulations, and these can be conducted iteratively to correct the results as telemetry is reported on spacecraft attitude and control systems.

Attitude dynamics simulations are typically much more difficult to simulate on long time scales than orbit mechanics, as a result, it may bottle neck the state space predictor. Techniques can be implemented to simply assume an attitude based on a qualifiable "attitude mode" (e.g., nadir pointed, zenith pointed, etc.). In this way, the future attitude can be inferred without requiring calculation (or numerical integration techniques) and state space positions (e.g., position, velocity, orbit angular momentum vector, etc.) of the spacecraft from orbital mechanics simulations may be used to infer pointing vectors for the spacecraft body.

E.2 Database of Thermal Requirements

A database of thermal requirements may be maintained simply as a list of thermal operating thresholds for each component in each spacecraft. Based on a set of data describing the mechanical/conductive properties of each spacecraft (in the spacecraft bus database), an orbital mechanics simulation, an attitude simulation, and an operating regime (e.g., what components are powered on at each point in orbit), a component of a space-based network can simulate the thermal properties of the spacecraft over time and ensure that nothing overheats (or gets too cold) on orbit.

There may be additional thermal management requirements that can be stored in this database and used to inform that state space prediction engine.

E.3 Database of Power Management Requirements

Similar to the thermal requirements, the power management requirements may manifest themselves as a list of thresholds for certain battery capacity thresholds. Perhaps, to keep power systems healthy on orbit, these thresholds can be assigned to particular modes (perhaps multiple modes to each) which indicate what operating modes are acceptable for a spacecraft when its battery is operating at a certain capacity.

There may be additional power management requirements that can be stored in this database and used to inform that state space prediction engine.

E.4 Database of Regulatory Rules for Mesh/Polygons

As described previously, there may be a database of a mesh, or polygons, that define virtual locations and geographies on the surface of the Earth to determine coverage statistics for areas, or locations, of interest.

These polygons and positions may naturally exist around the Earth and have different regulatory requirements. As an example, certain polygons may only be able to be serviced using certain bands. This might be stored as a list of Resource Blocks, ARFCNs, etc. which can be allocated to the space network (and perhaps what spectrum is also allocated only for the terrestrial network is stored as well). In addition to frequency requirements, there may be transmit power requirements. Each point in the mesh, may have transmit power requirements (e.g., RSSI, power flux density, power spectral density, etc.) for both Resource Blocks that the space network is allowed to use to provide its service, as well as Resource Blocks on which the space network is not allowed to provide service. In this way, when a spacecraft transmits over a location on a resource block allocated for one polygon, the adjacent polygons (and corresponding mesh locations) can be evaluated to ensure that transmissions into other polygons do not violate regulatory requirements for adjacent polygons/mesh.

In addition to transmit power and frequency requirements, there may be other priority requirements for certain polygons as well. As an example, some polygons stored in the database may be existing terrestrial base station polygons. In the event of a disaster, or a predicted disaster (e.g., in the case of a hurricane), the polygons associated with towers that have gone down, or are expected to go down, can be provided with an indicator that allows the space network to know in advance, or in real time, that it needs to support coverage of these polygons during times of need. Since these coverage areas will likely be small relative to satellite beams, they may be aggregated into a larger polygon, such that when they all go down, the satellite coverages a polygon that defines all of their aggregate coverage areas. The regulatory database may include specific first responder IMSIs that should be provided priority at those times, as well as how much spectrum, the satellite may need to use during its coverage of that cell.

During time of need such as a disaster, power and thermal limits/constraint requirements can be updated, or loosened, to allow for stretching the operations of the satellites for the short time that they need to provide coverage to the area of need.

There may be additional regulatory rules/requirements that can be stored in this database and used to inform that state space prediction engine.

E.5 Database of QoS Rules for Mesh/Polygons

Similar to regulatory requirements for each mesh/polygon, there may also be QoS requirements. These requirements may be driven by market demand in a certain geography, population density in a certain polygon, it may vary by time of day, etc. As a result, each mesh/polygon may contain "census" like data that denotes the population, or subscriber, density in certain regions of the Earth. Based on the country, and perhaps pricing data for that country, a revenue density for each polygon could be computed as well.

Quality of Service requirements may include amount of bandwidth required for deployment, required net throughput (perhaps on uplink and downlink), required minimum MCS in the cell, required latency to the ground PDN or APN, what type of radio access technology can be used to serve the cell (e.g., GSM, LTE, etc.), and if multiple, which is preferred.

From a commercial perspective, each polygon may also have a priority rating. This can be used in the state space prediction engine to reconcile conflicts when beam steering satellites, for instance, can provide coverage sufficiently to more than one polygon, but can only provide coverage to one and might select which one polygon. This may occur in the case when the satellite constellation is partially filled and providing intermittent coverage. In the case of a tie for the priority rating, a tie may be broken by an internal tie breaker in the network, to select the polygon that gets the service on that overpass (e.g., which ever polygon gets the best service). This database may include a value indicating the amount of coverage the polygon has received in the last 24 hours, 48 hours, 72 hours, etc. It may also have a value indicating the time since the last overpass, which could be a useful piece of information for evaluating tie breakers in determining network coverage. Commercial drivers, such as revenue density, may be used in the algorithm to determine coverage.

There may be additional QoS requirements that can be stored in this database and used to inform that state space prediction engine.

E.6 Database of Spectrum Analysis/Interference Data

Enhancements to the base station stack may employ a spectrum analysis function, the implementation of which might be described in more detail elsewhere herein. The output of this spectrum analysis function may be a matrix or vectors of signal analysis processing results from the raw data collected from the enhanced base station stack. The spectrum analyzer may listen to certain RF bands while in orbit and record the raw I and Q data from the receiver. Using fast Fourier transforms (FFTs), and perhaps other digital signal processing techniques, the network can determine what resource blocks, ARFCNs, etc. might be more interference prone as a function of location in orbit. This information may be useful in predicting interference margin requirements in link budgets that are predicted for base stations in the future.

The interference database may vary in complexity from embodiment to embodiment of the disclosure. In some cases, a static, occasionally updated interference level may be stored for each mesh or polygon based on a position in orbit of the servicing satellite. In a more complex embodiment, interference information may be stored as a function of both space, frequency, and time (e.g., so that variations in link budget performance, and interference, can be predicted over the course of the day, and possibly week). The interference environment may be stored as a value of dBs above the expected noise floor.

There may be additional RF signal intelligence, processing, etc. data that can be stored in this database and used to inform that state space prediction engine.

F. Network State Space Prediction Engine

The network state space prediction engine is part of the mobility management entity (MME) enhancement. It performs a series of steps to compute orbital dynamics simulations of satellites into the future. These simulations are reliable, part, because they are predicated quite heavily of position, velocity, and mass (e.g., ballistic coefficient) of spacecraft which are relatively consistent throughout flight. After the orbital dynamics are solved for, this can be complemented with an attitude dynamics and control simulation. Based on some predefined set of constraints for attitude maintenance for each satellite, the orientation over time can be computed.

Based on position, velocity, orientation, and some assumption for transceiver/antenna operations, the link budget between hypothetical links in the network can be computed via the link budget predictor. Based on link budget predictor results, the network state space prediction engine might predict the most optimal network state space. This may involve a check on power and thermal requirements, or constraints in the CPR database for each satellite so that feedback can be provided, and the analysis run again, if a selection is made to use a satellite that exceeds operating temperature or power limits. The output of the network state space prediction engine is a network state space prediction table, which can be represented by a matrix of selected wireless interfaces that might be implemented between satellites, ground stations, and UEs (e.g., what base stations are active, what ISLs are active, and which GSL are active).

Figure 20:
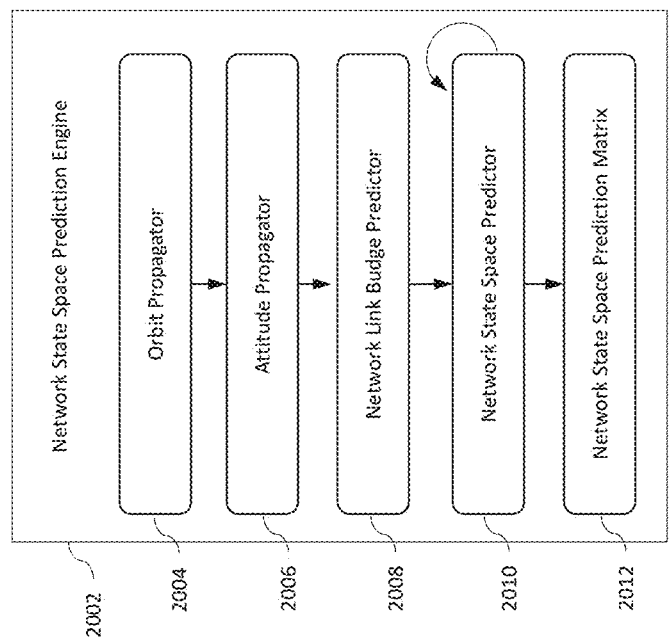
FIG. 20 illustrates a network state space prediction engine.

FIG. 20 illustrates components of the network state space prediction engine 2002 in one embodiment. First the network state space prediction engine might implement an orbit propagator function 2004 that might use information from the databases described above to accurately predict the motions (and relative motions) of satellites in the network. Next, an attitude propagator function 2006 might be executed, which may also use information from the supporting databases described above to compute the attitude, and attitude rates, of each satellite in the constellation over time. This function may be computationally intensive, and simplified in some embodiments with an "assumed" attitude CONOP (based on results from the orbit propagator as an example). This would allow for reduced computational intensity and maintain model accuracy.

After propagating the orbits and attitudes for the space network, a network link budget predictor function 2008 may be implemented. This function may take the results of the orbit and attitude simulation to generate an analysis of possible ISL, GSL, and base station transmission links that could be available to the network at every point in time. The results of the link budget predictor might be passed to a network state space predictor function 2010 which may leverage an algorithm, or algorithms, that select which links should be created in the network (for base stations, ISLs, and GSL). These algorithms may leverage data stored about the rules, policies, constraints, etc. stored about the mesh, polygons, satellites, etc. in the databases described above. The result of these processes may provide for a network state space prediction matrix 2012 that can be used to organize decisions for which links will be made and which links will not. This state space prediction matrix may be used to generate the state space prediction database of itineraries used to inform network operations.

F.1 The Orbit Propagator: Propagating Position and Velocity

Since each spacecraft is equipped to know its own position and velocity, it can use this information on internal computers and/or report this to the ground network for tracking, and historic logging, or use on computers on the ground as well.

Given the position, velocity, and orientation of a spacecraft at a given point in time, this can be used to accurately predict the position of the spacecraft into the future. Orbital mechanics governs the motion of the spacecraft in orbit, and given an initial condition, position and velocity, the acceleration can be computed, and numerical integration techniques may allow for propagating the position and velocity into the future over some time span. In order to generate a more accurate state space prediction of the network, the previously described databases may be used.

The acceleration of an orbiting object in space can be defined as the sum of the forces that act on it, divided by its mass. Equation 13 may accurately describe the acceleration of an orbiting object at a certain position and velocity at a certain time.

$$\vec{a}_{eNB}^{ECEF} = \frac{1}{m}[\vec{F}_{grav}^{ECEF}(\vec{r}_{eNB}^{ECEF}) + \vec{F}_{drag}^{ECEF}(\vec{v}_{eNB}^{ECEF}, C_b, \rho_{atm}(\vec{r}_{eNB}^{ECEF}, t)) +$$
$$\vec{F}_{sun}^{ECEF}(\vec{r}_{eNB}^{ECEF}, \vec{r}_{sun}^{ECEF}(t)) +$$
$$\vec{F}_{moon}^{ECEF}(\vec{r}_{eNB}^{ECEF}, \vec{r}_{moon}^{ECEF}(t)) + \vec{F}_{thrust}^{ECEF}(t)]$$
(Eqn. 13)

With the databases storing information about gravitational models, atmospheric models, planetary models, and spacecraft drag characteristics, Equation 13 can be numerically integrated using techniques such as Runge Kutta, or symplectic integrators, to get a computed position and velocity of the spacecraft over time. This element of the state space predictor may accurately predict the position and the velocity of the spacecraft to a significant level of accuracy over hours, days, or weeks, depending on the fidelity of the utilized models.

When a spacecraft provides thrust, there may be an imparted torque as a result of that thrust as well, which may be valuable to model in the attitude propagator. For a given thrust, the torque imparted on the spacecraft may be the cross product between the force of thrust and the vector representing the position of the spacecraft center of mass relative to the point through which the thrust vector pushes on the spacecraft (e.g., the position of the thrust nozzle itself). This is described in Equation 14.

$$\vec{T}_{thrust}^{ECEF} = \vec{F}_{thrust}^{ECEF} \times (\vec{r}_{eNB,COM}^{ECEF} - \vec{r}_{nozzle}^{ECEF})$$ (Eqn. 14)

It should be noted that as fuel is used from the thruster, this may change the $\vec{F}_{thrust}^{ECEF}$ and the $\vec{r}_{eNB,COM}^{ECEF}$ terms.

F.2 Attitude Propagator: Propagation of Spacecraft Attitude over time

The orientation, or angular position, and angular rates, are measured by the spacecraft and can be used to compute state vectors for the orientation of a spacecraft in the future. With knowledge of the spacecraft inertial state vector and how that might change over time with use of fuel, etc. as well as the planned torqueing maneuvers based on control laws, or desired pointing vectors, the future orientation of the spacecraft can be predicted.

The laws governing the rigid body dynamics can be modeled as shown in Equation 15.

$$\dot{\vec{\omega}}_{eNB}^B = I^{-1}{}_{eNB}^B[T_{laws}^B + T_{mag}^B + T_{gravgrad}^B + T_{drag}^B - \vec{\omega}_{thrust}^B - \vec{\omega}_{eNB}^B \times (I_{eNB}^B \vec{\omega}_{eNB}^B)] \quad \text{(Eqn. 15)}$$

It may be more suitable to compute the desired vector for the torque law term in Equation 15. There may be a desired state for the spacecraft angular rate of rotation, $\vec{\omega}_{eNB}^B$, and rate of the angular rate of rotation, $\dot{\vec{\omega}}_{eNB}^B$. With all other terms known, and a desired $\dot{\vec{\omega}}_{eNB}^B$, the equation can be rearranged to solve for $T_{laws}^B$.

In one embodiment, attitude dynamics could be modeled more rapidly if they are assumed to be orienting the spacecraft body frame in a particular direction with respect to its orbit and the Earth. For example, satellites could be assumed to fly with one body axis pointed toward nadir below, or some known angle offset nadir, another body axis oriented, perhaps in the direction of its velocity (e.g., in plane with a potential neighboring satellite). The third axis, would be perpendicular to the first two, to create the orthogonal body axis frame in inertial space.

F.3 Link Budget Predictor: Link Budget between Spacecraft and Ground Locations

Based on the position, velocity, and orientation of the orbiting base station in inertial space, the link budget (uplink and downlink) between that base station and any location in inertial space (e.g., on the ground, or in orbit) can be computed. Furthermore, the link budget can also be computed for the potential links between satellites and links between ground stations and satellites.

In one embodiment, the link budget predictor could implement the link budget computation for all links using the same format. As an example, Equation 16 and Equation 17 describe link budgets describing a connection between a base station and a UE.

$$\begin{aligned}
\text{SINR}_{UE}^{uplink} = & \text{EIRP}_{UE} + G_{eNB}(f^{uplink}) - L_{path}(f^{uplink}, \\
& \vec{r}_{UE}^{ECEF}, \vec{r}_{eNB}^{ECEF}) - L_{pnt,UE}(\vec{q}_{UE}^{ECEF}, \vec{r}_{UE}^{ECEF}, \\
& \vec{r}_{eNB}^{ECEF}, f^{uplink}) - L_{pnt,eNB}(\vec{q}_{eNB}^{ECEF}, \vec{r}_{UE}^{ECEF}, \\
& \vec{r}_{eNB}^{ECEF}, f^{uplink}, \hat{b}_{eNB}^{ECEF}) - L_{atm}(\vec{r}_{UE}^{ECEF}, \\
& \vec{r}_{eNB}^{ECEF}, f^{uplink},) - L_{scint}(\vec{r}_{UE}^{ECEF}, \vec{r}_{eNB}^{ECEF}, f^{uplink}) - \\
& 10 \log 10(kBT) - NF_{eNB}(f^{uplink}) - I(f^{uplink}, \\
& \vec{r}_{eNB}^{ECEF}, \vec{q}_{eNB}^{ECEF})
\end{aligned} \quad \text{(Eqn. 16)}$$

$$\begin{aligned}
\text{SINR}_{eNB}^{downlink} = & \text{EIRP}_{eNB}(G(f^{downlink}), P^{downlink}) + \\
& G_{UE} - L_{path}(f^{downlink}, \vec{r}_{UE}^{ECEF}, \vec{r}_{eNB}^{ECEF}) - L_{pnt,UE}( \\
& \vec{q}_{UE}^{ECEF}, \vec{r}_{UE}^{ECEF}, \vec{r}_{eNB}^{ECEF}, f^{downlink}) - L_{pnt,eNB}( \\
& \vec{q}_{eNB}^{ECEF}, \vec{r}_{UE}^{ECEF}, \vec{r}_{eNB}^{ECEF}, f^{downlink}, \hat{b}_{eNB}^{ECEF}) - \\
& L_{atm}(\vec{r}_{UE}^{ECEF}, \vec{r}_{UE}^{ECEF}, f^{downlink}) - L_{scint}(\vec{r}_{UE}^{ECEF}, \\
& \vec{r}_{eNB}^{ECEF}, f^{downlink}) - 10 \log 10(kBT) - NF_{UE} - I \\
& (f^{downlink}, \vec{r}_{UE}^{ECEF}, \vec{q}_{UE}^{ECEF})
\end{aligned} \quad \text{(Eqn. 17)}$$

In Equation 16 and Equation 17, EIRP refers to a decibel representation of antenna gain and transmit power of the signal. In the case of the base station, this may be a function of the frequency being used in the link and the transmit power for that particular base station space platform. For an UE this may be true as well, but in one embodiment it might also be modeled accurately enough as an assumed constant for a particular device, for a particular protocol (e.g., GSM limits MS uplink power to 2 W per 200 kHz bandwidth and LTE limits UE uplink power to 200 mW per 180 kHz bandwidth). In Equations 16 and 17, G is the gain of the receiving antenna at the end of the link. This may be a function of frequency, or a constant, as well.

The remaining terms are the losses, noise, and interference in the link. Pointing loss, $L_{path}$, is a function of the frequency and the distance between the receiver and the transmitter.

The $L_{pnt}$ terms are the pointing losses due to link budget pointing offsets between the UE and the base station. Pointing losses (e.g., beam patterns) may be highly dependent on frequency and represent the reduction in gain as a function of the offset from the direction of the antenna receiving or transmitting the signal. This offset can be computed based on the positions of the base station and the UE, $\vec{r}_{eNB}^{ECEF}$ and $\vec{r}_{UE}^{ECEF}$, as well as their orientations, $\vec{q}_{eNB}^{ECEF}$ and $\vec{q}_{UE}^{ECEF}$, relative to the coordinate frame of interest. The pointing loss on the base station side may also be a function of beam direction, $\hat{b}_{eNB}^{ECEF}$, which may be assumed based on spacecraft CONOP.

Atmospheric loss, $L_{atm}$, and scintillation loss, $L_{scint}$, are highly dependent on frequency and link budget geometry (e.g., the length of propagation through the atmosphere, and at what angle). They can therefore be calculated using, $\vec{r}_{UE}^{ECEF}$, $\vec{r}_{eNB}^{ECEF}$ and $f$, and can have a much more significant effect on specific, often higher, frequency signals. For ISL, altitudes may be high enough that no, or very little, signal propagates through atmospherically attenuating medium, resulting to little, or no, atmospheric and scintillation loss.

The remaining terms in Equation 16 and Equation 17 are the thermal noise floor, the noise figure of the receiver, and the interference in the link. The thermal noise floor can be estimated based on the bandwidth of the link and the temperature of what the receiving antenna "sees". In one embodiment, this value may be assumed to be constant somewhere between 290-300K. The noise figure of the receiver may vary by frequency, or may be represented as a constant. Typical specifications for UE devices call for at worst a 7 dB noise figure. A properly designed satellite receiver in the sub 1 GHz bands might have a noise figure of 2 dB. Interference in the link may be a function of link frequency and the receiver position and orientation. This value may be more important in the uplink calculation and may be informed by the spectrum analysis data provided by the Enhanced base station. On the downlink, interference may or may not be informed by measurements in the field, or stored values in a database for signals from known terrestrial eNBs (for cases when satellite and terrestrial coverage cells overlaps). In either case, the interference may be modeled as a constant, or may not be modeled at all. Interference in this equation would be some number of decibels, representing the number of decibels above the thermal noise floor that the interference adds to the link.

Equation 16 and Equation 17 can be used to calculate SINR for a given link. Additional link budget parameters can be calculated as well. Bit rates for LTE and GSM protocols are specified based on the protocol modulation and coding scheme tables, so correspondingly EbN0 and bit predicted bit error rate could be calculated as well. Additional physical layer qualities, such as Doppler shift and propagation delay, can be predicted and leveraged to inform PHY layer control.

With the ability to predict the position, velocity, and orientation of space infrastructure in the future, possible future link budgets between specific nodes in orbit and on the ground can be computed. This presents the opportunity to accurately predict and optimize operations of the entire network based on a set of operating constraints (e.g., max distance for links), rules (e.g., max Doppler shift), etc.

Figure 21:
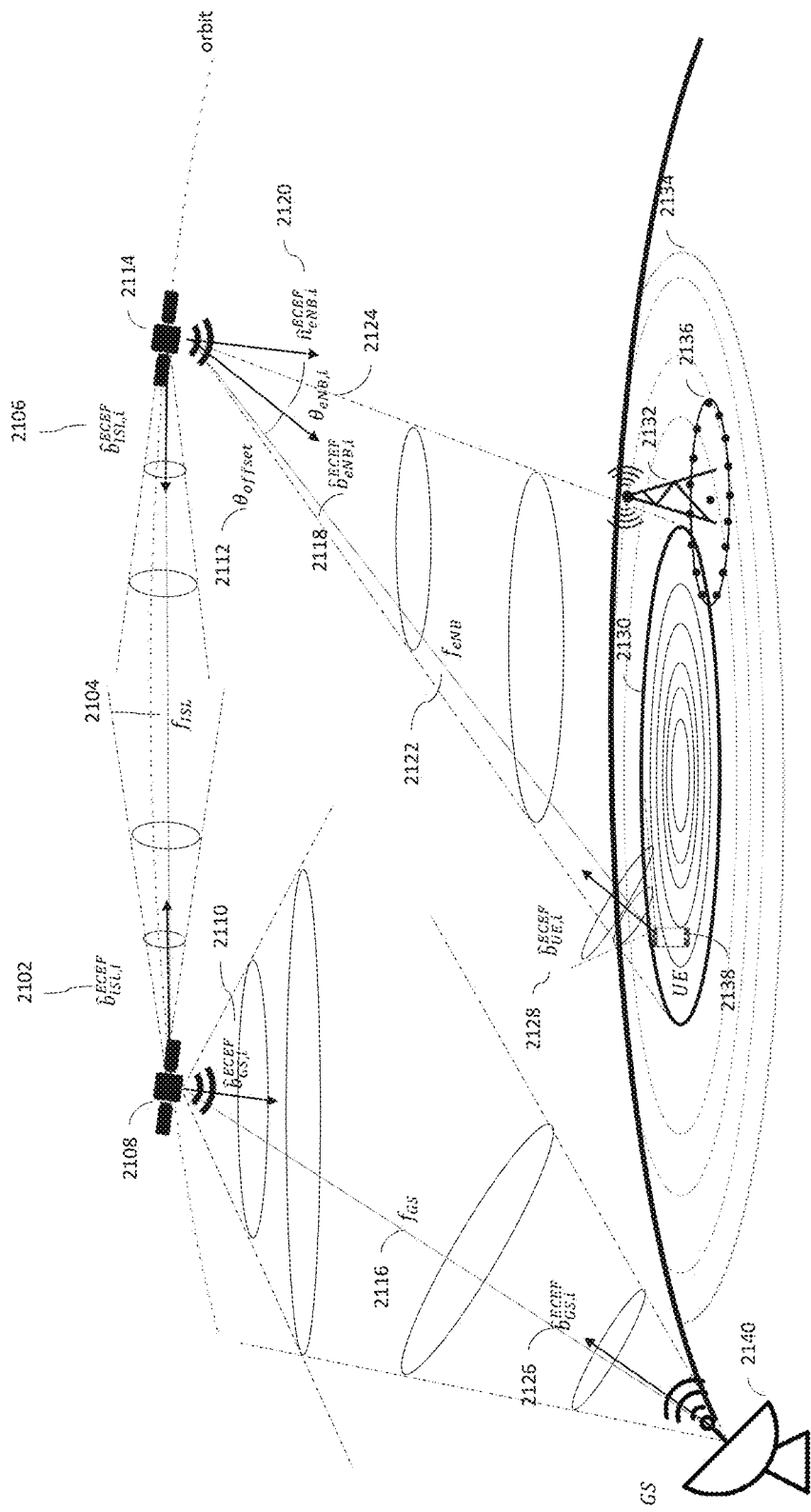
FIG. 21 illustrates how a link budget geometry between ground stations, satellites, other satellites, and UEs might take hold.

FIG. 21 illustrates a link budget geometry for possible base station links 2122, GSL 2116, and ISL 2104. Base station 2122 links are evaluated based on base station satellites 2114 and UEs 2138. A satellite base station antenna boresight 2120 may differ from an antenna beam direction 2118 by some angle 2124 off the boresight. The link geometry might create a pointing offset 2112, which can be used to calculate antenna gain and EIRP for the corresponding point or UE of interest. The UE may also have a beam direction 2128 based on its orientation. The base station link may be evaluated across a mesh on the ground, resulting in contour for a spotbeam 2130 to be calculable, as well as other mesh points outside of that beam 2134. Some terrestrial towers 2132 may be inside the beam energy and the interference can be evaluated at a mesh 2136 describing the terrestrial base station polygon.

Inter-satellite links 2104 may be evaluated between two base station satellites 2114 and 2108. Using the beam directions of ISL antennas 2106 and 2102 (which may also steer off of boresight like base station arrays, but it is not shown here for simplicity), GSL 2116 may be evaluated between base station satellite 2108 and a ground station 2140 with vectors 2126 and 2110 that describe the orientation of their antenna beams for communication on that link.

While not shown in FIG. 21, losses in links can be calculated based on frequency, path loss, pointing offset, polarization offsets, line losses, body losses, etc. based on geometry as described previously in the disclosure.

F.4 Link Budget Predictor and Network State Space Predictor Procedures

The link budget engine is used to predict both RAN (e.g., base station) coverage deployments and core network tunneling connections. To do this, the link budget engine might compute possible (within reason) link budgets for various possible satellite beams, at various points in each polygon of interest, as well as each point in the mesh of the Earth as a whole. In one embodiment, the entire mesh, or multiple meshes may be a polygon of interest (e.g., link budgets are calculated across stored points). Furthermore, beams for ISLs and GS link beams might undergo a similar procedure. The results of this analysis generate a set of link budget scenarios that might be considered a type of Monte Carlo simulation. The Monte Carlo simulation generates a set of scenarios, which can be mutually exclusive (e.g., each beam can only serve one polygon at once) and evaluated by software.

F.5 Network State Space Prediction for Beamforming Satellites and Static Polygons The link budget predictor and the state space predictor may be implemented in series in iterative steps in some embodiments performed by a network component. In the described embodiment, the procedure may have a first stage of iteration that evaluates scenarios for base station coverage of static coverage areas by beamforming satellites. The link budgets might be calculated for each beam, at each time step in the orbit/attitude simulation, for each polygon within distance of the beam transmitter. An assumed beam direction for each beam might be made to provide optimized coverage to static polygons being evaluated. This procedure might be vectorized so that it can be rapidly computed. Once the base station link budgets have been computed for beamforming satellites, at various time steps, for static polygons in range, the specific polygons that each beam in the satellite set might provide coverage to are selected at each point in time.

Figure 22:
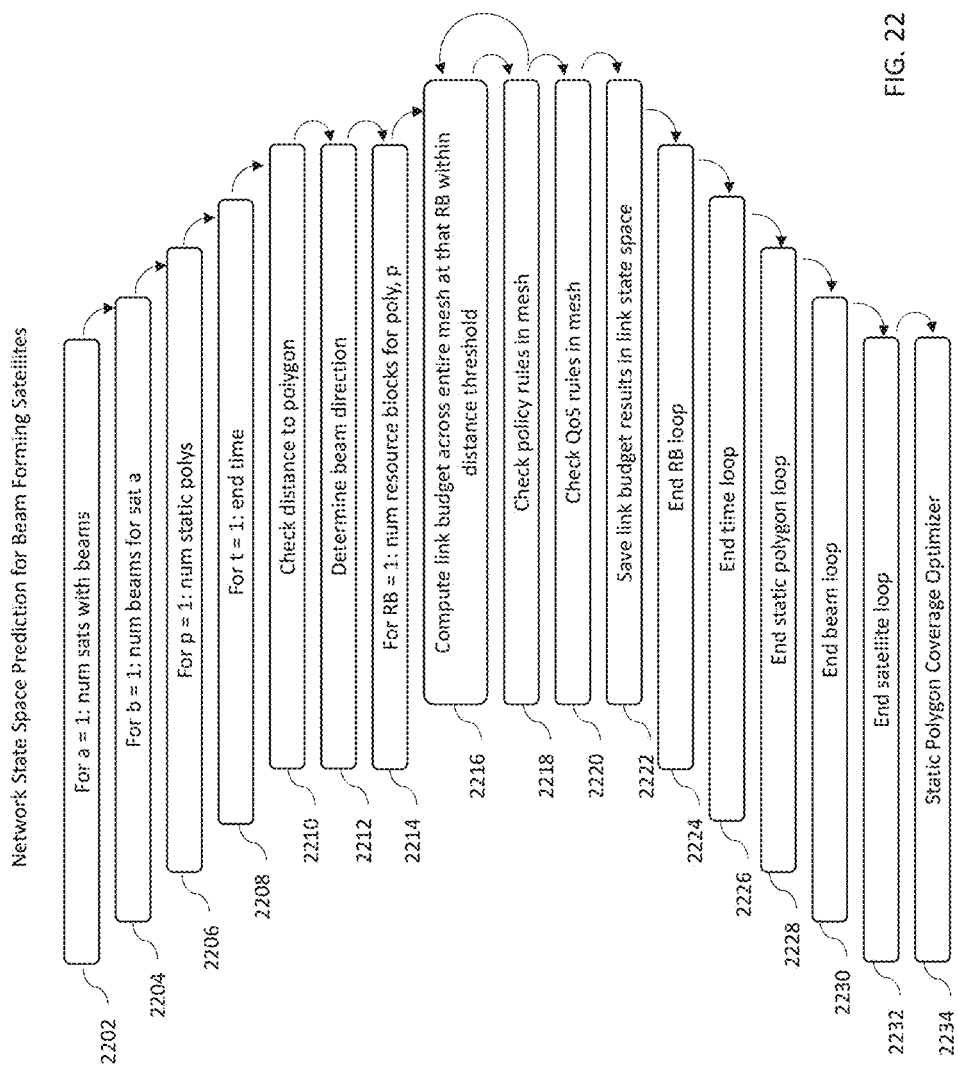
FIG. 22 illustrates a procedure that may be used to determine the coverage provided by beamforming base station satellites in the network.

FIG. 22 illustrates a procedure that might be implemented by the described first state of iteration in the disclosed embodiment. The procedure may be implemented as software; the procedure flow is described in that context. The procedure includes a for loop and computational iterations, however, the software could be compiled into a program that executes the instructions in a vectorized manner to conduct computations rapidly on hardware deployments, for instance.

Step 1 2202 may be the initiation of a for loop for satellites in the network that have a base station and beamforming antenna technologies.

Step 2 2204 may be the initiation of a for loop for available beams on the satellite being looped through.

Step 3 2206 may be the initiation of a for loop for static polygons in the CLR.

Step 4 2208 may be the initiation of a for loop to step through simulation of the orbit and attitude dynamics of satellites.

Step 5 2210 may be a check in the software to ensure that the selected beam and selected static polygon at the selected time are within a distance from each other that allows for a reasonable link budget. This distance threshold may be set dynamically, and may be used to avoid excessive computation. If the distance check is not met, the software may exit the loop and go to the next time step.

Step 6 2212 may be to determine the beam direction for the beam to accommodate the static polygon at that time step. This may be a vector in inertial space, or in the body frame of the spacecraft, to inform the commands for how it might direct the beam.

Step 7 2214 may initiate a for loop to step through resource blocks available to the static polygon being serviced.

Step 8 2216 may compute the link budget in the uplink and downlink direction to determine the signal power across the entire mesh in the CLR database that is within the distance threshold of the satellite at that time step (e.g., after assuming the beam direction, compute the link budget across the whole mesh, not just the polygon). The link budget might calculate a variety of variables, including SINR, SNR, EBN0, Doppler Shift, latency/delay, etc. Many of these variables may be used in evaluating the performance of the base station as well as its potential interference in areas of mesh that should not be interfered with. To compute the link budget, some assumptions may need to be made about satellite transmit powers. Each satellite may have a default transmit power.

Step 9 2218 may take the results of the link budget and check, or analyze them, against the rules in the policy database. If the analysis suggests that a certain policy was violated, the transmission scheme could be corrected, by reevaluating the link budget at a lower EIRP on the downlink channels. This may reduce footprint bleed over and resolve possible regulatory infringements from the previous link transmission scheme. If the regulatory rules cannot be met, the loop may be exited and the next resource block is iterated.

Step 10 2220 may take the link budget results that pass regulatory requirements and check against quality of service requirements for the polygon.

Step 11 2222 if the QoS are met, the transmission is saved. If they are not met and QoS requirements are not firm (e.g., in cases where any coverage is better than nothing) then they may be saved anyways as well. In scenarios where QoS requirements are strict, the link budgets can be discarded if they cannot provide the desired data rates, MCS, etc. (which are functions of SNR, SINR, EBN0, etc.)

Steps 12 through 16 (2224, 2226, 2228, 2230, and 2232) close the loops through each satellite, beam, polygon, and time step.

Step 17 2234 runs the static polygon coverage optimizer. The static polygon coverage optimizer is the state space predictor for static polygons and beamforming base stations and might be a software function that uses the results Steps 1 through 16, to determine what beams from beamforming satellites can provide coverage to which static polygons. This software function may incrementally step through each time step and check if the number of beams available to any static polygon in each time step is greater than one. If it is, it may select one of the beams that may cover the polygon that meets some optimal condition (e.g., each cell uses satellite to provide longest coverage from here on out and provide coverage until it cannot). If there are no beams for a polygon for a given time step, then it receives no coverage. There may be policy considerations that prioritize certain polygons over others and it may fluctuate in time based on traffic estimates for that polygon, or perhaps the polygon was recently added for service by the space network because a terrestrial tower went down on the ground and needs the satellite to backup its service while it tries to come back up. Stepping through time, identify what satellite may provide coverage to what polygon, and indicate some number of back-up satellites (in case satellites fail between now and the future). This may also enable an understanding for handover satellites, who might ultimately take up servicing the static polygon when the other satellite sets beyond its ability to provide sufficient service. In some cases, static polygons and beams may not be allocated to each other during certain time steps. These time steps might be noted for the next iteration of the procedure between the link budget predictor and the state space predictor.

F.6 Network State Space Prediction for Remaining Beamforming Satellites and Remaining Static Polygons, as Well as Non-Beamforming Satellites and Remaining Mesh/Dynamic Polygons In a second stage of iteration, the network state space predictor may evaluate scenarios for the remaining base station coverage, of both remaining static coverage areas (in terms of what static coverage areas where not allocated service at certain times in the iteration described previously), and dynamic coverage areas. Satellite beams that are beamforming and were not previously allocated, as well as the satellite beams that are non-beamforming, are evaluated for coverage in this iteration. The second iteration is similar to the first in that it iterates through satellite beams through time. In this case, however, the beams are not guided by known static polygons (the static polygons that can be covered by beamforming satellites at each time step are accounted for in the previous iteration). As a result, the beam is assumed to have some direction of pointing. This may be driven by satellite attitude, or by some other driver, such as population density in remote areas in the case of a remaining beamforming beam.

After an assumed beam direction is made, the link budget may be computed, with similar checks on policy requirements and QoS requirements before iterating on link configuration (in this case, perhaps beam direction if possible) and then saving the link budget, or not. At the end of the iteration loops, the remaining beams that might transmit are determined for each time step. After beams have been determined to transmit at particular times, there might need to be a reconciliation of the utilized spectrum. A function might be used to determine what frequency bands, or resource blocks within the same frequency band are allocated to each base station. Once this is established, additional base station operation requirements may be determined for each base station at each time step, such as what MIBs, SIBs, TACs, etc. they may need to implement as base station control.

Figure 23:
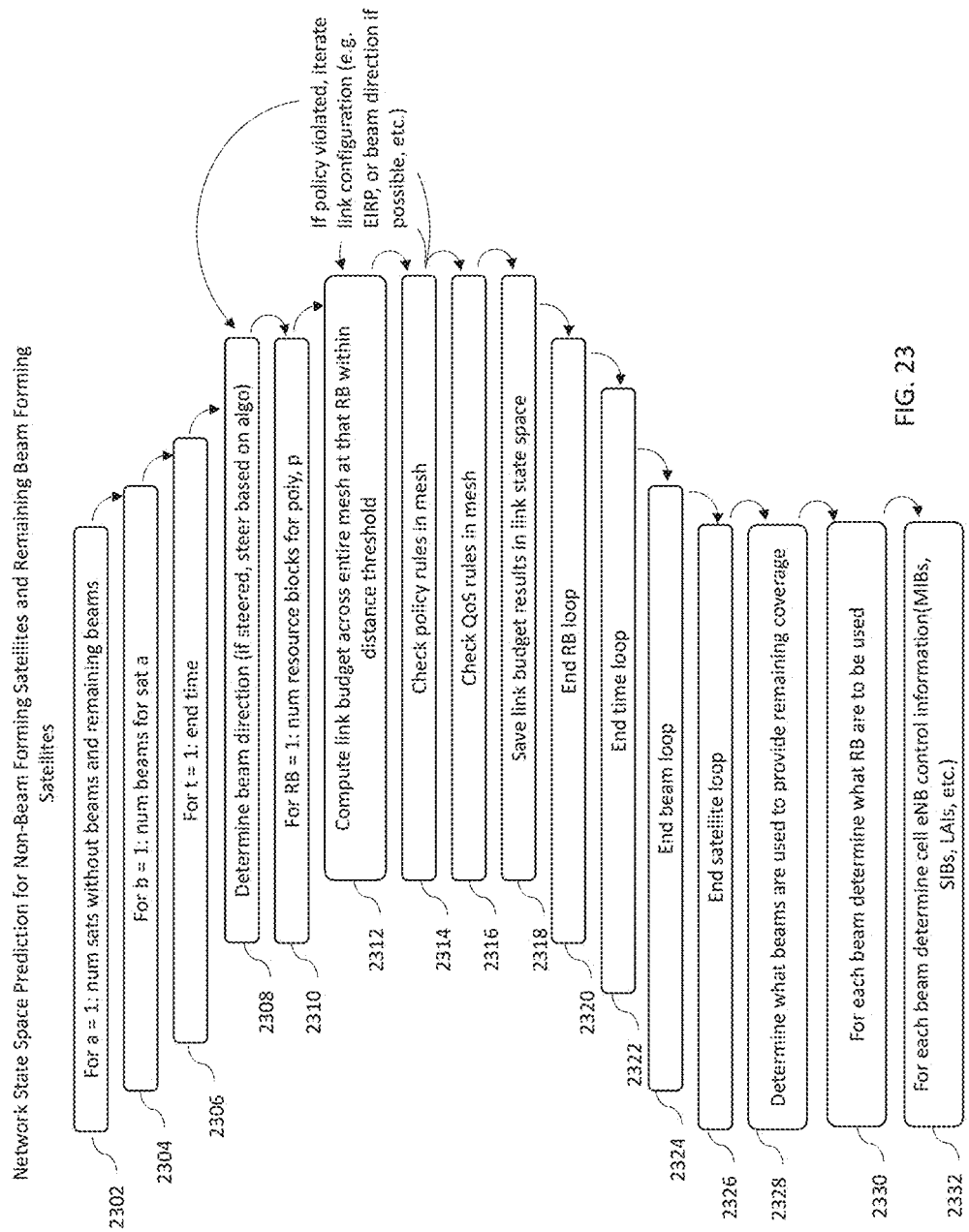
FIG. 23 illustrates a procedure that may be used to determine coverage provided by non-beamforming base station satellites (and remaining beamforming base station satellites) in a space-based network.

FIG. 23 illustrates a procedure that might be implemented by the described second state of iteration in the disclosed embodiment. The procedure may be implemented as software and so the procedure flow is described in that context. The procedure may be implemented as software and includes a for loop and computational iterations, however, the software could be compiled into a program that executes the instructions in a vectorized manner to conduct computations rapidly on hardware deployments.

Step 1 2302 may be the initiation of a for loop for satellites in the network that each have a base station with beamforming beams that have not been allocated or are yet to be allocated, as well as every satellite in the network that has a base station without beamforming beams.

Step 2 2304 may be the initiation of a for loop for beams available on the satellite being looped through.

Step 3 2306 may be the initiation of a for loop to step through time steps in the simulation of the orbit and attitude dynamics of each satellite.

Step 4 2308 may implement a software function that determines the direction of the beam being evaluated. If this is for a beamsteering beam, it may evaluate a direction based on the nearest portion of a static polygon, or perhaps remote mesh points with high population densities of subscribers not connected by terrestrial base stations. If the beam is not steering, the direction may be simply derived from the attitude of the spacecraft at that time.

Step 5 2310 may initiate a for loop to step through resource blocks available to the mesh that are within the field of view of the satellite in that time step.

Step 6 2312 may compute the link budget in the uplink and downlink direction to determine the signal power across the entire mesh in the CLR database that is within the distance threshold of the satellite at that time step (e.g., after assuming the beam direction, compute the link budget across the whole mesh, not just the polygon). Computing a link budget might include calculating a variety of variables, including SINR, SNR, EBN0, Doppler Shift, latency/delay, etc. Many of these variables may be used in evaluating the performance of the base station as well as its potential interference in areas of mesh that should not be interfered with. To compute the link budget, some assumptions may need to be made about satellite transmit powers. Each satellite may have a default transmit power.

Step 7 2314 may take the results of the link budget and check, or analyze them, against the rules in the policy database. If the analysis suggests that a certain policy was violated, the transmission scheme could be corrected, by reevaluating the link budget at a lower EIRP on the downlink channels. This may reduce footprint bleed over and resolve possible regulatory infringements from the previous link transmission scheme. If the regulatory rules cannot be met with reduced transmit power, the software may iterate on the beam direction (if possible) and repeat the process for link budget computation. If this still fails, the loop may be exited, and the next resource block iterated. Iterations on beam direction may be limited to save computation time.

Step 8 2316 may take the link budget results that pass regulatory requirements and check against quality of service requirements for the mesh points on the ground below. This step may be skipped, or QoS requirements for non-beamforming arrays may be reduced.

Step 9 2318 if the QoS are met, the transmission is saved. If they are not met and QoS requirements are not firm (e.g., in cases where any coverage is better than nothing) then they may be saved anyways as well. In scenarios where QoS requirements are strict, the link budgets may be discarded if they cannot provide the desired data rates, MCS, etc. (which are functions of SNR, SINR, EBN0, etc.). If the link budget is saved, the transmission results can be used to determine the edge of the coverage polygon (which may vary by frequency). This can be used to compute the edge of dynamic polygon coverage areas. In one embodiment this might be the signal levels used for cell edge on the ground for respective technologies GSM (e.g., −105 dBm per 200 kHz) and LTE (e.g., −115 dBm per 180 kHz). Points in the mesh that are cell edges or centers might be indicated at each time step.

Steps 10 through 13 (2320, 2322, 2324, and 2326) close the loops through each satellite, beam, time step, and resource block.

Step 11 2328 runs the dynamic polygon coverage optimizer. The dynamic polygon coverage optimizer is a state space predictor for dynamic polygons implemented through the remaining beamforming base stations and the non-beamforming base stations. This function might be software that uses the results from Steps 1 through 10 to determine what beams from the remaining beamforming and non-beamforming satellites can provide coverage on the Earth (over their particular dynamic polygon). This software may implement a global optimization algorithm that includes calculating possible permutations of coverage scenarios at each time step and determine which satellites need to transmit to maximize coverage while minimizing power usage, as an example. Another embodiment might ensure minimization of overlap of cells to avoid interference challenges with spectrum allotment. Different variables may be selected for optimization.

Step 12 2330 may implement a spectrum use predictor, which may be a software function used to determine what resource blocks were allocated to each satellite base station in the network, and possible the terrestrial base stations as well. This software might evaluate the link budget for non-beamforming satellites at each of the static cells (both terrestrial and orbital served static polygon base station locations). It may determine the link budget from the beamforming satellites onto the static cells that are just terrestrial base stations as well. At times when the signal levels from space orbiting radio infrastructure is equal to, or higher than, those use by terrestrial towers, resource blocks, or frequency carriers, sharing may be needed.

Since the time when signal levels from the satellite can be too high is known, and exactly what RB this can happen on, the space network could communicate this to the MMEs in the terrestrial networks using the terrestrial cells that might be affected. Based on this, the terrestrial cells could either increase their transmit power momentarily, or eliminate use of some of their spectrum deployment temporarily. After transmitters have been established for each time step (as well as possibly a set of back-ups for each time step), the network might determine which resource blocks to allocate to which transmitter. Based on allocation tables and RB rules for transmission at each base station beam, an appropriate RB split can be implemented. This may be optimized by population density coverage, known remote UE coverage, expected traffic models, etc. in order to allocate an appropriate ratio of RB to each transmitting base station in the satellite network. Technically, the satellite downlink would be weaker than most terrestrial tower downlinks. Calculations for the link budget at each base station could be calculated to determine if it were suitable to share resource blocks. Technically, the terrestrial base station would need to be able to generate a downlink signal with greater than 0 dB SINR with respect to the satellite downlink within its coverage cell. This would allow for at least the lowest order LTE MCS table setting, MCS-1, using QPSK at 0.33 coding rate.

Step 13 2332 The final step in the procedure may be to finalize base station control requirements for satellites. Once a frequency domain for each transmitter is known, each base station predicted in the future can also be provided with a set of information for how to configure itself (e.g., what MCC, MNC, TAC, etc.) it should be transmitting on its information resource blocks (e.g., MIBs, SIBs, etc.) for regional based network characteristics, if they are required.

Figure 24:
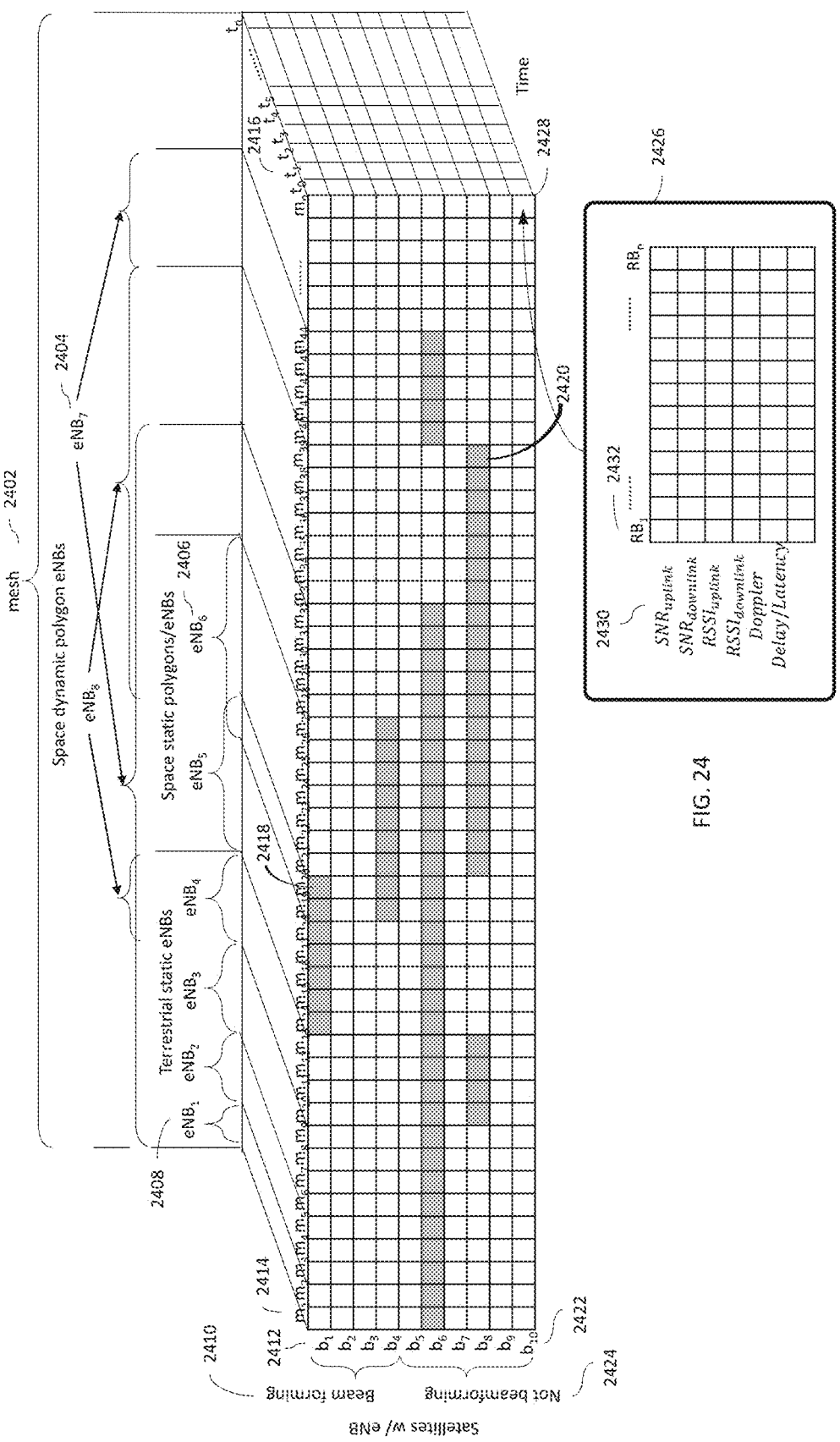
FIG. 24 illustrates a simplified portion of a link state space matrix that may be generated to evaluate a link budget across the entire Earth mesh from transmitting satellites.

FIG. 24 illustrates a data structure 2428, which might be a matrix, cell array of matrices, or matrix of matrices, that describe the link budget predictor and the selection procedure for which satellite base stations are instructed to transmit at each moment in time. The mesh 2402 is broken down into individual mesh points 2414. Each mesh point may represent three axis coordinates on the Earth. Polygons may comprise multiple mesh points, and polygons may represent base station coverage from terrestrial static base stations 2408, space static base stations 2406, or space dynamic base stations 2404. Link budgets are evaluated for mesh points and base station beamforming beams 2410 (as an example, bi, 2412) and base station non beamforming beams 2424 (as an example, bio, 2422). Link budgets may be evaluated at discrete moments in time 2416 for which the position, velocity, and orientation of the base station satellites is known. The link budgets 2426 for each mesh point at each moment in time might be evaluated for a desired list of performance variables 2430 across resource blocks 2432. As a result of these calculations, the network state space predictor may determine what beamforming satellites provide coverage to space static base stations at each time step 2418 as well as what non beamforming satellites provide coverage to space dynamic base stations 2420.

A typical LTE base station might employ 1.4, 5, 10, or 20 MHz blocks. Each of these blocks can comprise some number of Resource Blocks (RBs) that are 180 kHz wide in bandwidth and comprise themselves 12 orthogonal subcarriers of 15 kHz bandwidths. In the downlink portion of the link, a base station may communicate across many RBs at any one point in time. However, each mobile device may only be allocated a single RB for that particular device. As a result, the device only transmits on a single 180 kHz uplink RB to the base station.

When operating a space-based LTE communications system it may be inconvenient to allocate an entire 10, 5, or even 1.4 MHz block to the space network. Most telecommunications traffic might move through the terrestrial base stations on the ground. As a result, the amount of spectrum allocated to the space network should be proportional to the traffic that it expects to move.

The terrestrial network and space network can decide on an implementation in which the space network only utilizes particular resource blocks within an LTE carrier band. For instance, a cellular tower on the ground may employ a 5 MHz LTE carrier band, but knows not to allocate any of its mobile devices an uplink Resource Block on say 1, 2, or 3, of the Resource Blocks (RBs) in its carrier bandwidth because the complementary space network seeks to utilize those resource blocks. These RBs may be dynamically allocated to the space network in frequency, quantity, and time. Over certain areas of the world, there may be more Resource Blocks (RBs) at the disposal of the space network. Also, there may be only particular timeslots across these resource blocks that are reserved for the space network.

This implementation could be done in software, as a "spectrum table", where the terrestrial network is software defined to inhibit allocation of particular resource blocks or timeslots in particular locations based on telecommunications traffic models (or something else, perhaps). The space network, using ephemeris from its orbital trajectory, can reconfigure its software defined radios and flight computers to manage communications traffic across the RBs or time slots that it knows it has access to over any particular part of the world. This might be stored on board the satellites as an internal map in memory. This map would be designed to be updatable and reconfigurable as telecommunications traffic on the ground ebbs and flows either over the course of a day, month, year, or decade, etc.

Figure 25:
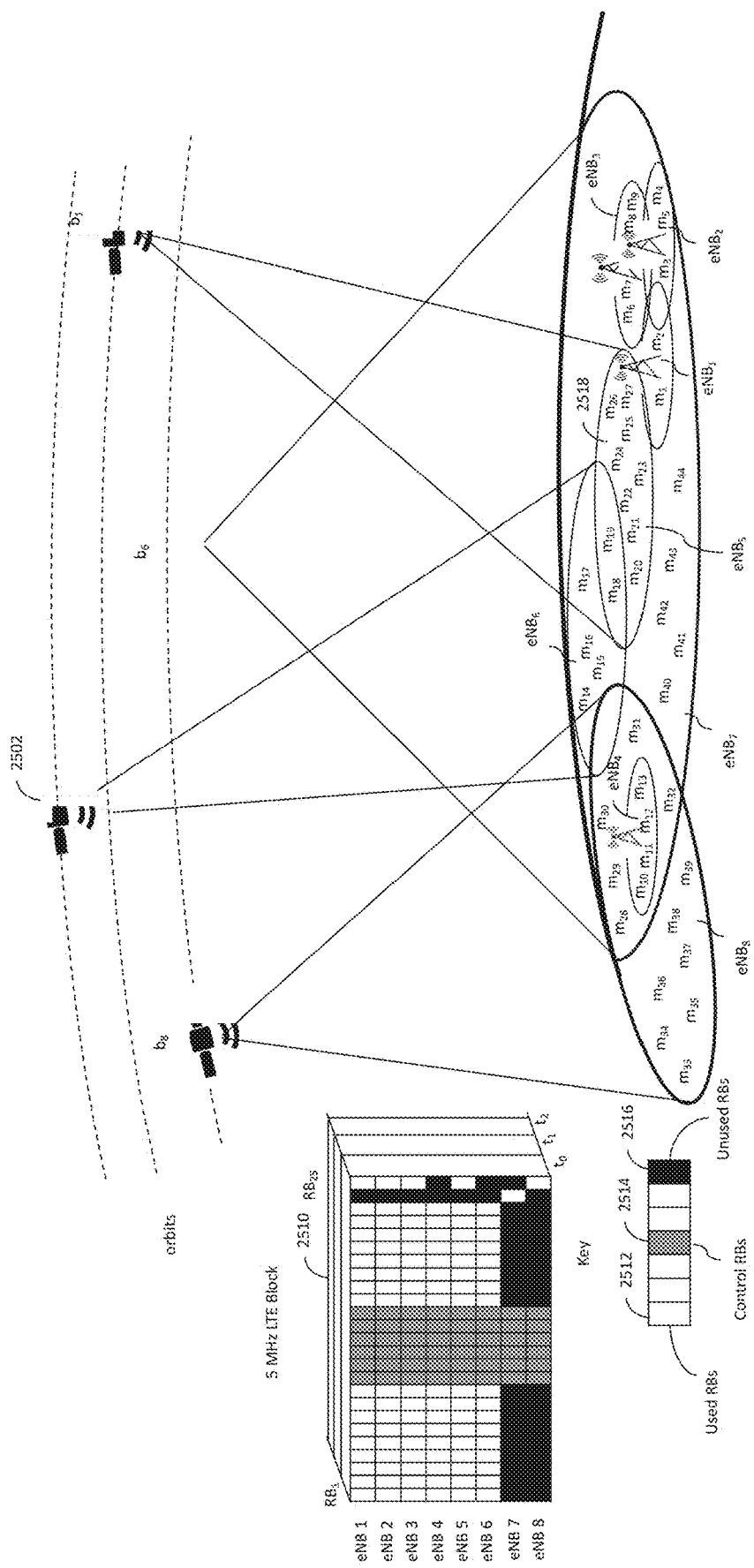
FIG. 25 illustrates how spectrum slicing between satellites in a space network as well as terrestrial base station cells might be conducted dynamically during satellite operations.

FIG. 25 illustrates how the scenario described in FIG. 24 might manifest itself in a real coordinate frame and how the resource blocks may be dynamically allocated to the space network for that time step, perhaps in a manner where an LTE block is "sliced" to allow specific spectrum slices to particular base stations, perhaps at certain moments in time (or perpetually, in another embodiment). In FIG. 25, each base station coverage polygon may be noted as an "eNB" but is referred to simply as "base station" in the following description (e.g., base station 5 is $eNB_5$). Each satellite 2502 may be equipped with one beam 2518 each. Space covered base station 5 to base station 8 are illustrated transmitting over each other as well as terrestrially covered base station 1 to base station 4. Each base station coverage polygon is provided coverage by some beam (e.g., beam, bi, is used to provide coverage to static polygon base station 5).

Within each base station coverage polygon, there can be corresponding mesh points (e.g., base station 1 coverage polygon includes mesh points, $m_1$ and $m_2$; and base station 5 coverage polygon includes mesh points, $m_{10}$-$m_{13}$ and $m_{28}$-$m_{39}$). A block 2510 of spectrum might need split allocation for non-interfering traffic channels in a 5 MHz LTE block over time (as an example—though the block could be as wide as LTE allows). The orbiting and terrestrial base stations may share the center six resource blocks for control channels and use a dynamic allocation of PCI codes for distinguishable use of the downlink control channel. There may be dynamic allocation of the number of PRACH preambles between the space network and the terrestrial network. Allocated between the space network and terrestrial network are used resource blocks 2512, control resource blocks 2514, and unused resource blocks 2516. These resource blocks may be allocated in various ways, but can be done so that there is no overlapping resource block among base stations that have overlapping coverage zones, beams, etc. Frequency resources may even be allocated as a function of time, where some where specific resource blocks and time slots are allocated. The space network can be implemented with GPS and thus, can be synchronized to understand where time slots fall with respect to each base station time-division multiple access implementation. This means that overlapping satellite coverage zones can share the same resource block simultaneously by allocating certain time slots on that resource block between satellites.

F.7 Network State Space Prediction for ISL and GSL

The network state space prediction function may evaluate link budgets for ISL as well as GSL. Based on link budget results for ISLs and GSL, the network can determine which connections are the best to make at each time step. Some satellites may be designed to support multiple links via ISLs, or even GSs. Depending on what network priorities are, network connections can be selected based on a variety of criteria (e.g., longest possible link, data rates, latency, etc.). Perhaps the network links are selected in order to reduce the root mean squared of network latency for each UE predicted to be connected to the network at each point in time. Once the most ideal links, and link alternates, are determined for moments in time, the network can determine what tunneling/routing links are available to move IP and network control signaling. Additionally, the network can use this to predict when tunneling routes need to be handed over in order to avoid disconnecting IP traffic connections in the network.

Figure 26:
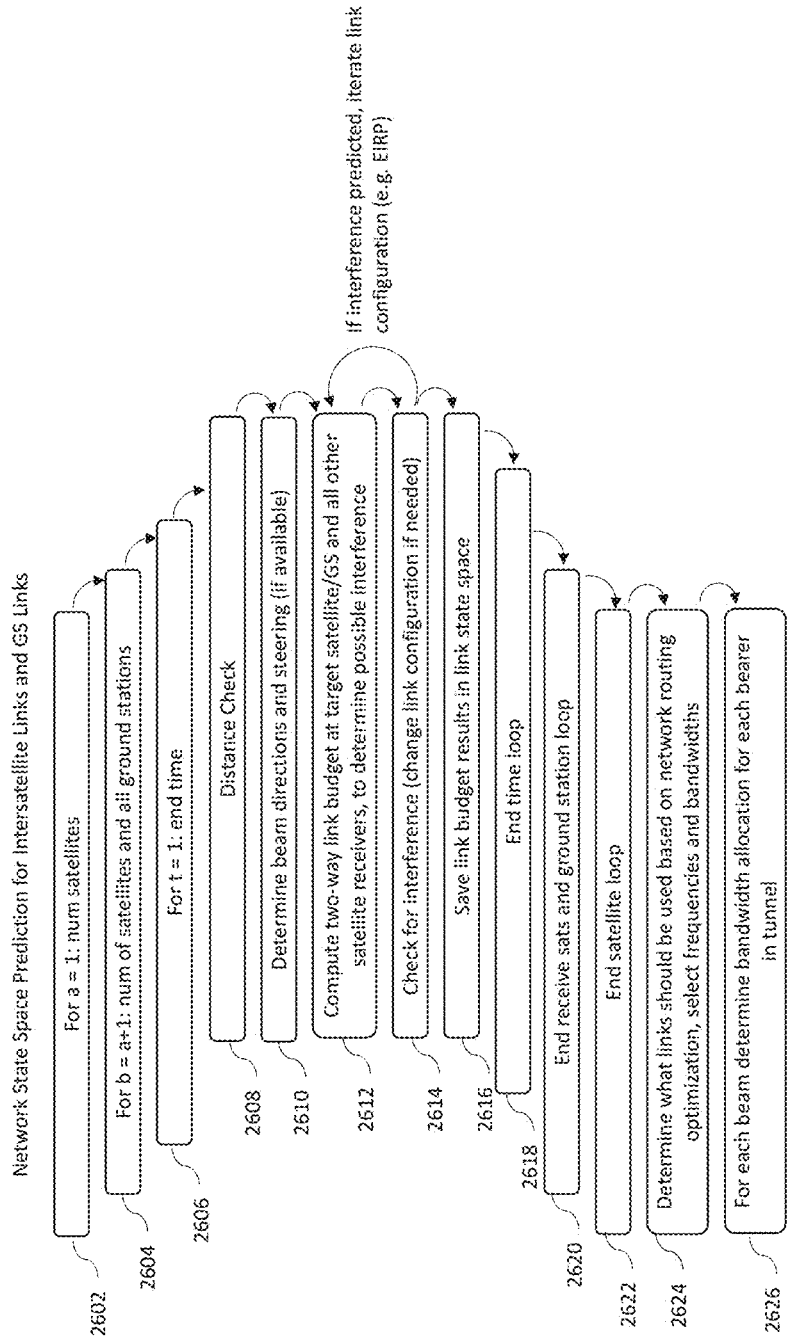
FIG. 26 illustrates how a network may determine what ISL and GSL to activate at moments in time.

FIG. 26 illustrates how the network state space prediction engine may evaluate ISL and GSL Step 1 2602 may be the initiation of a for loop for satellites in the network.

Step 2 2604 may be the initiation of a for loop for ground stations in the network as well as other satellites in the network not being looped, or been looped through, in step 1.

Step 3 2606 may be the initiation of a for loop to step through time steps in the simulation of the orbit and attitude dynamics of satellites.

Step 4 2608 may implement a distance check to ensure that the satellites, or satellite and ground station, are within a reasonable enough distance to merit a link budget computation.

Step 5 2610 if the link distance is deemed worthy of a calculation, the beam directions for satellites, or the satellites and ground stations may be determined. Ground stations may use dishes, or phased array beam steering technologies. Satellites may use beam steering arrays, mechanically steered apertures, or static mechanically mounted antenna apertures for ISLs.

Step 6 2612 may compute the link budget in the uplink and downlink directions for ISLs and GSL. Assuming link budget geometries and transmit powers, the link budget may be evaluated at many satellites and ground stations in the network in both directions. The links may be evaluated across discrete frequency channels allocated to each link. This may be similar to how the base station link budgets are evaluated across resource blocks. This information can be used to determine what level of interference may exist in certain ISL. This might trigger reduction of transmit power, appropriate dynamic allocation of bandwidth/spectrum split, or complete rejection of use of the interfering links.

Step 7 2614 may take the results of the link budget and check, or analyze them, for interference with other satellites that may be unacceptable and require a reconfiguration of the link (perhaps comprising geometry or power changes). If required, step back to the link computation based on the reconfigured link parameters.

Step 8 2616 Save the link budgets into the link state space, similar to the one illustrated in FIG. 24.

Steps 9 through 11 (2618, 2620, 2622) close the loops through each transmitting satellite, receiving satellite and/or ground station, and time step.

Step 12 2624 uses the link state space matrix results to determine what links should be used based on network routing optimization algorithms. The network may desire to minimize the root mean squared time/latency for moving packets from remote UEs to ground stations, as an example. For each of the links that are selected, a given frequency bandwidth should be determined based on proximity to other links using similar or nearby frequencies. A spectrum strategy may be implemented in a database describing frequency capability of each satellite and what frequencies to use with other satellites. Or the frequency sharing plane could be inherent in the satellite constellation design (e.g., every other ISL repeats frequency use).

Step 13 2626 may determine what bandwidth allocation there is for each tunnel for IP bearers moving both control traffic, user traffic, and TTCC&DH traffic between nodes in the network. This may be constant, or dynamic, based on predictive loading.

Figure 27:
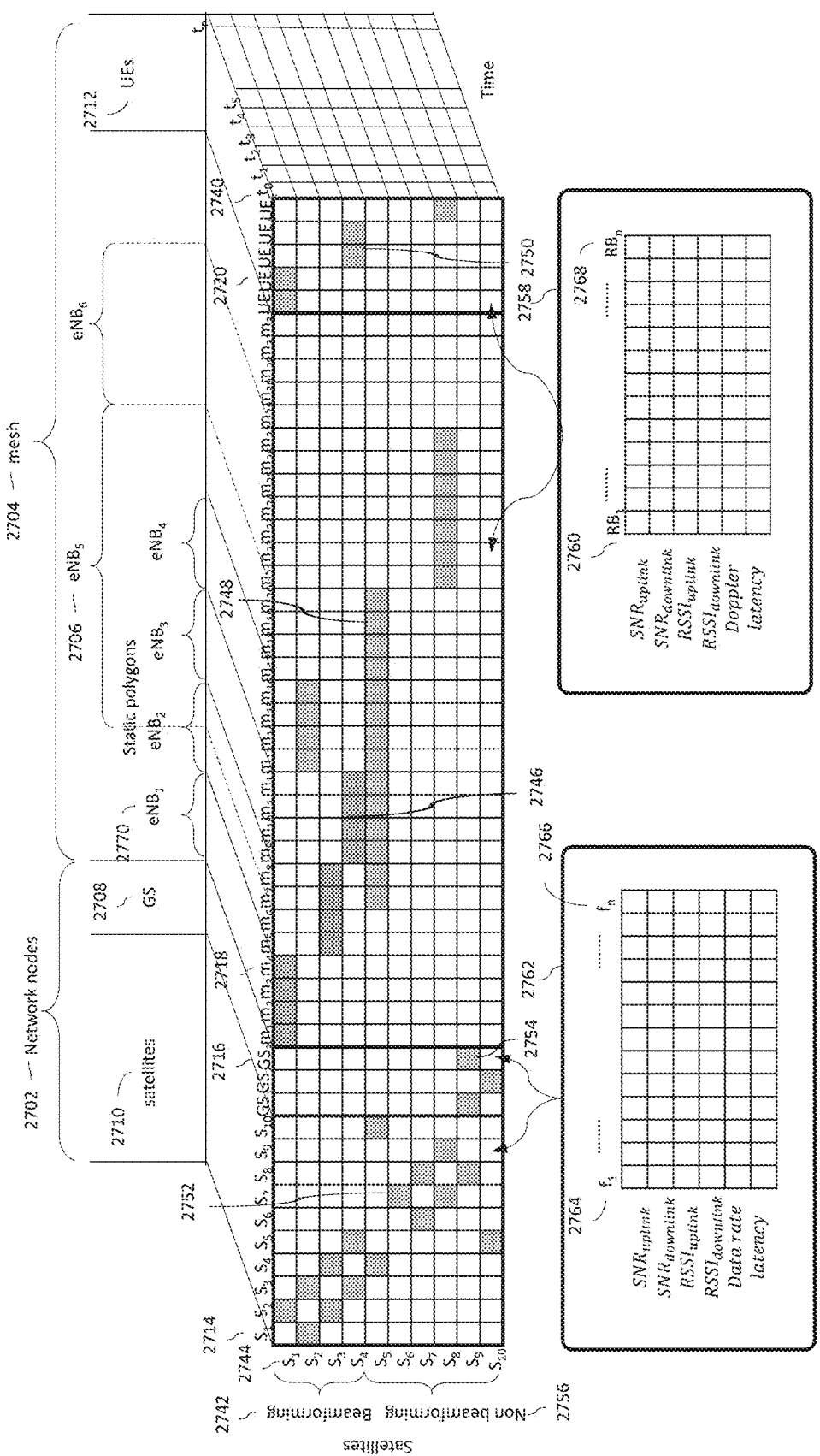
FIG. 27 illustrates a simplified portion of a link state space matrix that describes the nature of link budgets between links in the network (including ISL and GSL), and a hypothetical scenario for how the network may generate links.

FIG. 27 illustrates a graphical embodiment of the link state space matrix of the base station and ISL and GS link determinations. In this figure each base station coverage polygon may be noted as an "eNB" but is referred to simply as "base station" in the following description (e.g., base station 5 is $eNB_5$). As described before, the mesh 2704 may comprise points 2718 that make up static base stations 2770 (simplified to either terrestrial or space based base stations in FIG. 27 for simplicity) and dynamic base stations 2706. The mesh may also comprise points 2720 that describe locations on Earth for particular UEs that are subscribers of the network 2712. Similar to the mesh of the Earth points, there may be a set of network nodes 2702 that comprise other points 2716 that describe ground station locations 2708 and points 2714 that describe satellite locations 2710. The state space would represent link budget scenarios between satellites 2744, which may be split into two groups, beamforming 2742 and non-beamforming 2756 satellites. In this particular embodiment, each satellite may have only one beam to maintain simplicity of description of the disclosure. Each beamforming satellite may be selected 2746 to provide coverage to a static polygon on the Earth. Show here, satellite $S_4$ is providing coverage to base station 3, which may be a static coverage polygon. Non beamforming satellites are also selected to provide coverage 2748 to dynamic base stations. Shown here, satellite $S_5$ is selected in time step to 2740 to provide service to base station 5. Similarly, each ground station may communicate with satellites, and those links 2754 may be selected. Shown there, $S_9$ is communicating with both $GS_1$ and $GS_3$ in time step to. Similarly, ISL can be selected 2752 for each time slot as well. UEs that are being provided coverage to 2750 can also be computed in the link state space matrix. In FIG. 27, for example, $UE_1$ and $UE_2$ are being provided coverage by $S_1$ a beamforming satellite within base station 1, a static polygon. Each base station link budget prediction for each mesh 2758 may span any bandwidth, from resource block $RB_1$ 2760 to $RB_n$ 2768. Similarly, the ISL and GS link budgets 2762 might span the frequency possibilities for each link 2764 to 2766. The ISL, GSL, and base station links may be evaluated for SINR, RSSI, data rate, latency, Doppler shift, etc.

Figure 28:
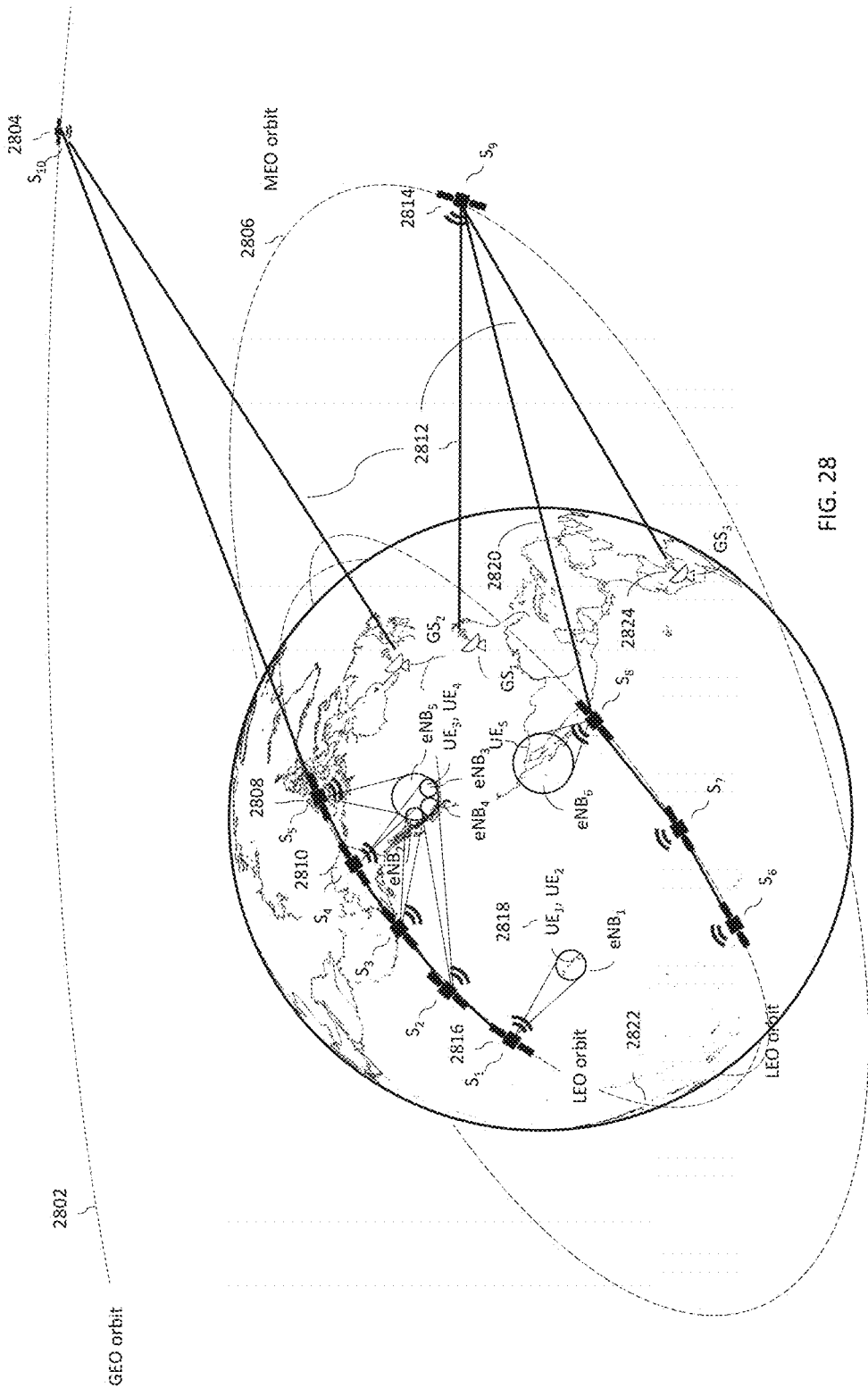
FIG. 28 illustrates how a network described by the link state space matrix in FIG. 27 might appear in inertial space.

FIG. 28 illustrates how the link state space matrix of FIG. 27 may manifest in a space network in Earth's coordinate frame. In this figure each base station coverage polygon may be noted as an "eNB" but is referred to simply as "base station" in the following description (e.g., base station 5 is $eNB_5$). $S_{10}$ 2804 may be in a GEO orbit 2802, which $S_9$ 2814 may be in a MEO orbit 2806. The base stations providing coverage to UEs may be in LEO orbits 2822. $S_1$ 2816 may be providing coverage as a beamforming satellite to the island of Hawaii via base station 1 servicing $UE_1$ 2818 and $UE_2$. $S_5$ 2808 may be a non-beamforming satellite providing coverage to $UE_3$ and $UE_4$ via base station 5 in western Canada. ISL 2810 and 2820 and GSL 2812 may exist between LEOs, MEOs, and GEOs, and GSs 2824. As a result, traffic can be routed in this scenario from $UE_1$ to $S_1$ to $S_2$ to $S_3$ to $S_4$ to $S_5$ to $S_{10}$ to $GS_2$ through the Internet to $GS_1$ to $S_9$ to $S_8$ to $UE_5$.

G. State Space Database

The network state space prediction engine creates a three-dimensional cell array, or the logical equivalent, of matrices/vectors that effectively define what transmitters and receivers are speaking to each other in a primary route at each point in time in the future—and which transmitters and receivers would speak to each other as a backup to the primary route, at points in time in the future. Based on this result, an IP routing table generation process might be used for routing of traffic from one node to another in the network for each moment in time. As the connections between transmitters and receivers—across base station links, ISL, and GSL—are handed over and change, the IP routing table process can generate an updated optimal route.

To achieve the desired network state space generated by the network state space prediction engine, another cell array of matrices/vectors might be created that defines commands, or time-base stored itineraries of actions, that each individual satellite might take in time in order to appropriately invoke what was optimized for by the simulation. This new three-dimensional cell array can be stored as the state space database.

The state space (SS) database comprises a set of itineraries that reflect actions, or intelligence, about network states/operating conditions. The first of the itineraries might be the spacecraft itineraries. This may be a three-dimensional cell array of vectors or matrices that describe spacecraft beam operations (e.g., beamforming directions, etc.), thruster utilization (e.g., thruster maneuvers for orbital maintenance), attitude control and pointing (e.g., spacecraft orientation controls or maneuvers over time), and/or the operating power mode. There might also be itineraries for the core network and the base station on each spacecraft. These itineraries may include network dynamic IP routing tables; network level handovers for IP bearers established through tunnels between satellites and ground stations, base station front end configurations (e.g., what band is being used) and power control (e.g., what EIRP limit), dynamic Master Information Block, and System Information Block information configuration, base station handovers, and spectrum analyzer control and digital signal processing analysis.

The state space database may be distributed through the network via the intersatellite link and ground station link tunnels on a particular bearer intended for network distribution of the state space database. This bearer may be a portion of the TTCC&DH tunnel bearer. As an IPv6 network, each static IP address assigned to a satellite can be used to send a unique packet with its needed information from the state space database. This may only be its own state space database sliver as well as those of satellites that intend to link with it in the future, or are back-up (perhaps even backups to backups) for future links in case of network satellite anomalies or failures between the time of the prediction and the time it is to occur. Telemetry monitoring of spacecraft health and operationality is implemented in the TTCC&DH system to provide automatic feedback for the state space prediction engine. As new information comes in about satellite positions, velocities, attitudes, and other vital system functionality information (e.g., thrusters, batteries, transmitters, computers, etc.) comes down from the space network to the ground node that is conducting many of the computations, the predictor can update the network state space in the future and send out the new state space vectors.

In real time, each satellite that tries to make a connection, or handover, that is planned in the itinerary, and fails, may be programmed to check the second priority link in the network if the first one does not work. This way, updates to the state space database can have some delay before the network is negatively impacted.

Figure 29:
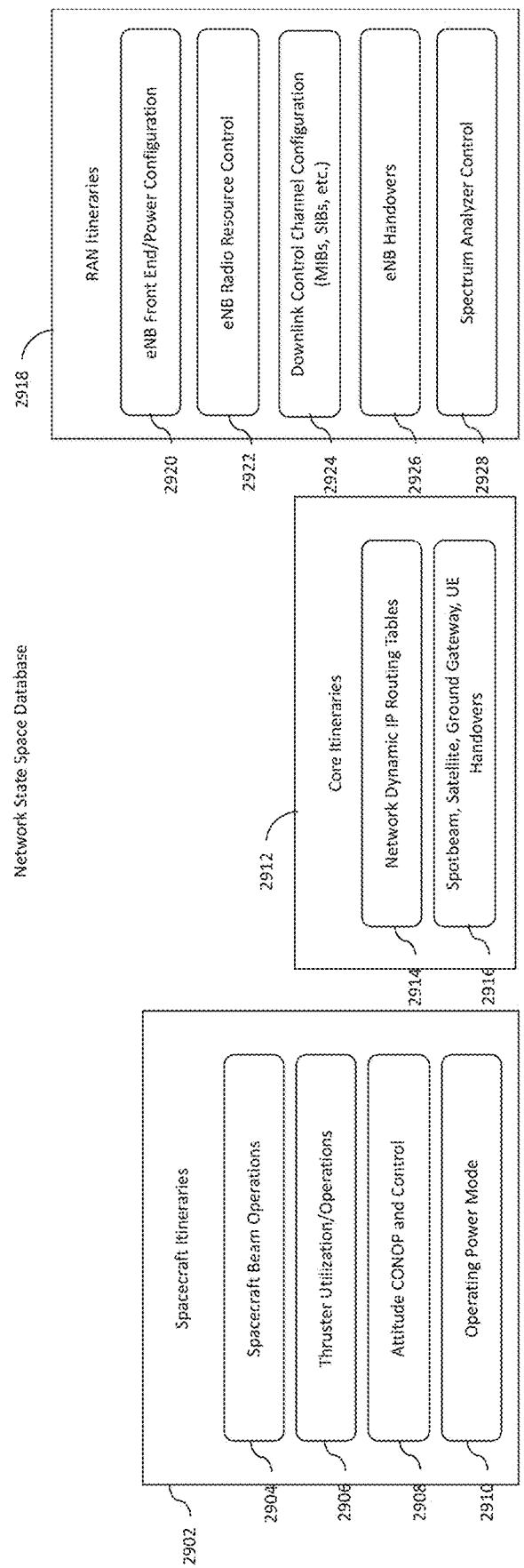
FIG. 29 illustrates a Network State Space Database comprising itineraries that are delivered to network nodes for storage and to inform operations in the future.

FIG. 29 illustrates the network state space database, which can comprise three itinerary sets. Spacecraft itineraries 2902 may comprise spacecraft beam operations 2904, thruster utilization/operations 2906, attitude CONOP and control 2908, and operating power mode 2910. There may also be Core itineraries 2912. Core itineraries may comprise network dynamic IP routing tables 2914, and spotbeam, satellites, ground gateway, and UE handovers 2916. Additionally, there may be radio access network itineraries 2918. These may comprise base station front end/power configuration 2920, base station radio resource control 2922, downlink control channel configuration 2924, base station handovers 2926, and spectrum analyzer control 2928.

The itineraries generated by the state space prediction engine may be generated across any feasible timeline that the simulation environment can model accurately. Specifically, modeling of orbital mechanics and attitude dynamics can drive the fidelity of the network state space predictions (e.g., in terms of position, velocity, attitude, and attitude rates) and this is more precise as more precise force models (e.g., gravity, atmospheric, magnetic, etc.) are used in the simulation. Low earth orbit trajectories may be the limiter, but still, they may be accurately predicted 1 hour, 12 hours, 24 hours, days, or possibly even a week into the future, meaning network state spaces may be predicted this far into the future as well.

In a world where rapid, low cost launch and access to space is the norm, there may be a use to implement a controller that analyzes rocket launch opportunities and a few weeks out, based on network state space predictions, might request that additional space assets be launched to orbit to support growing demand, as an example.

H. Network Handovers

The network state space prediction engine may generate handover itineraries for each of the orbiting craft in the network. These handover itineraries may be triggered by timers for signaling to transition ownership of both ISL and GS tunnels, as well as base station coverage polygons. Handover timing can be determined by the link state space predictor in the Enhanced MME. Handovers may be specified at a specific time and may also come with them an itinerary for building up the transmit power of the beam to slowly, or bringing down the transmit power slowly.

The network may implement some handovers in a somewhat conventional manner. This may be of particular use when individual satellites operate as a set of base stations, and are, therefore, internally providing coverage to the same UEs and can conduct rapid and seamless handovers between beams shared on the same satellite. These handovers might occur within software in the same computer, or between two computers in the same satellite running the base station software. However, between satellites, handovers can be more complicated. When satellites without beamforming arrays have overlapping beams, they can use the overlapping section as the area where UEs are handed over. This can be done with the typical UE signal measurement reports back to the base station, or it can be done automatically, based on known network motion over time and the known location of the UE in GPS coordinates at the time of the handover.

Figure 30:
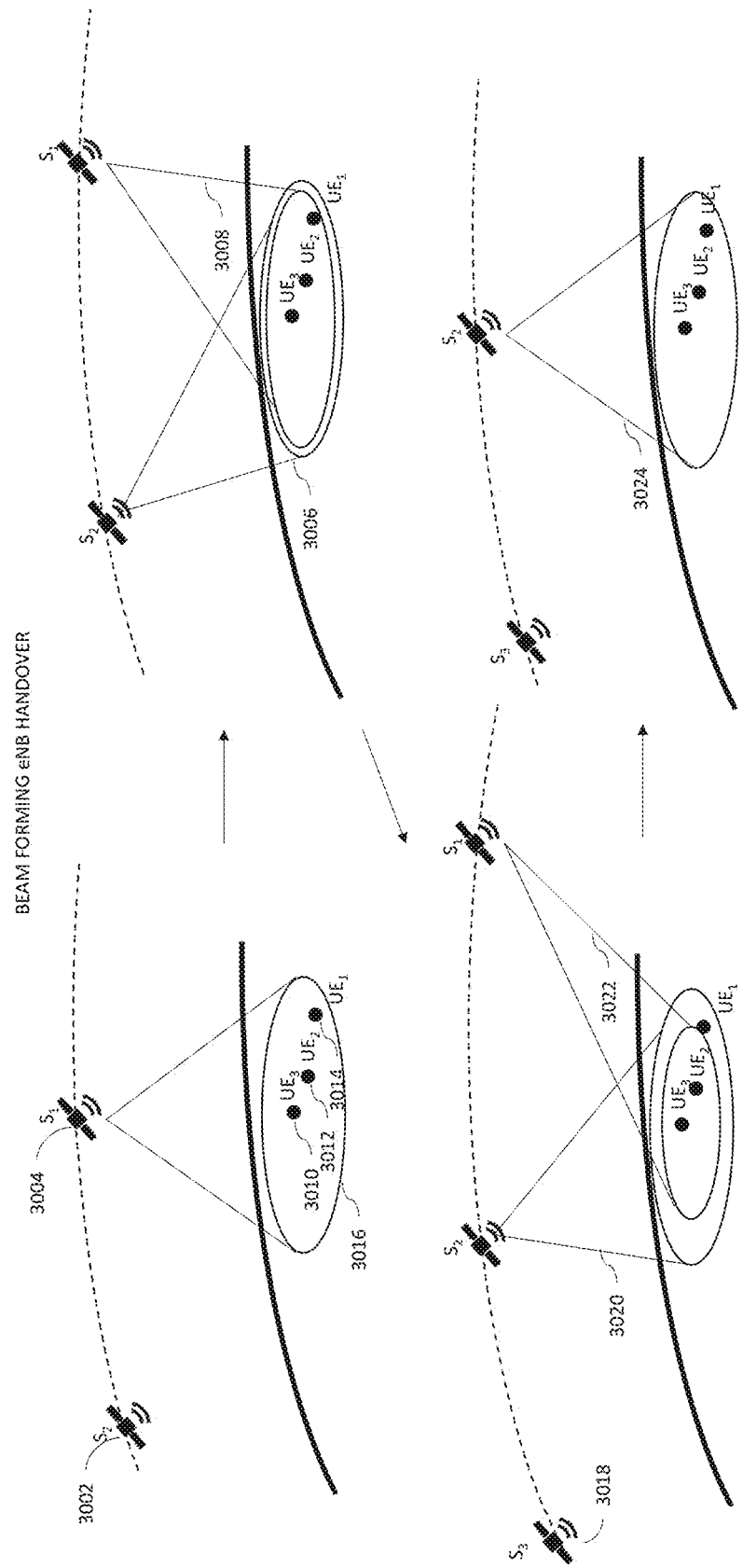
FIG. 30 illustrates an intersatellite handover of base stations with beamforming antennas.

FIG. 30 illustrates how the network may handover coverage of a static base station polygon described in the mesh in the CLR. A first satellite, 3004, may be providing coverage to $UE_1$, $UE_2$ and $UE_3$ (3010, 3012, and 3014). The coverage maybe provided by a beam covering a static base station polygon 3016. There may be a second, trailing, or nearby satellite, 3002, which is orbiting toward the static base station polygon. After some time, the first satellite may need to handover the cell to the second satellite. Perhaps through ISLs, or some other network tunnel route (e.g., through a GS), the second satellite may begin to transmit over the static cell being covered by the first satellite. This second satellite may generate a beam 3006, while the first satellite begins to reduce the transmit power on its beam 3008. As the first satellite reduces its beam size 3022, it can incrementally handover each UE in its spotbeam over to the second satellite beam 3020 starting at the UEs farthest from the center of the static polygon (e.g., $UE_1$ in FIG. 30). This allows the first satellite to hand over UEs to the second satellite in a way that may result in the transition/handover being smoother, possibly reducing network signaling traffic challenges. There may be a third satellite 3018 following the second which might prepare for another handover of the static base station cell. Eventually, the second satellite may no longer have a coverage beam and the second satellite will have resumed control of the static base station coverage cell 3024. It prepares to conduct a handover as well.

The embodiment described in FIG. 30 may be particularly useful when $S_1$, $S_2$, and $S_3$, all utilize the same center 6 RBs for downlink control channels, and UEs differentiate satellite base stations based on cell ID. When a UE detects a changing relative signal energy level from one base station moving lower than the signal energy level of another base station, it will report this to the base station with which it is currently communicating. This will kick off a handover to the next base station that has an increasingly better signal. This process may also be automatically kicked off by the initial satellite that must conduct the handover. The reduction in power of the first satellite on the static polygon may be a natural result of moving farther away from the static polygon, and not because of active power control on the transmitter at the satellite.

Figure 31:
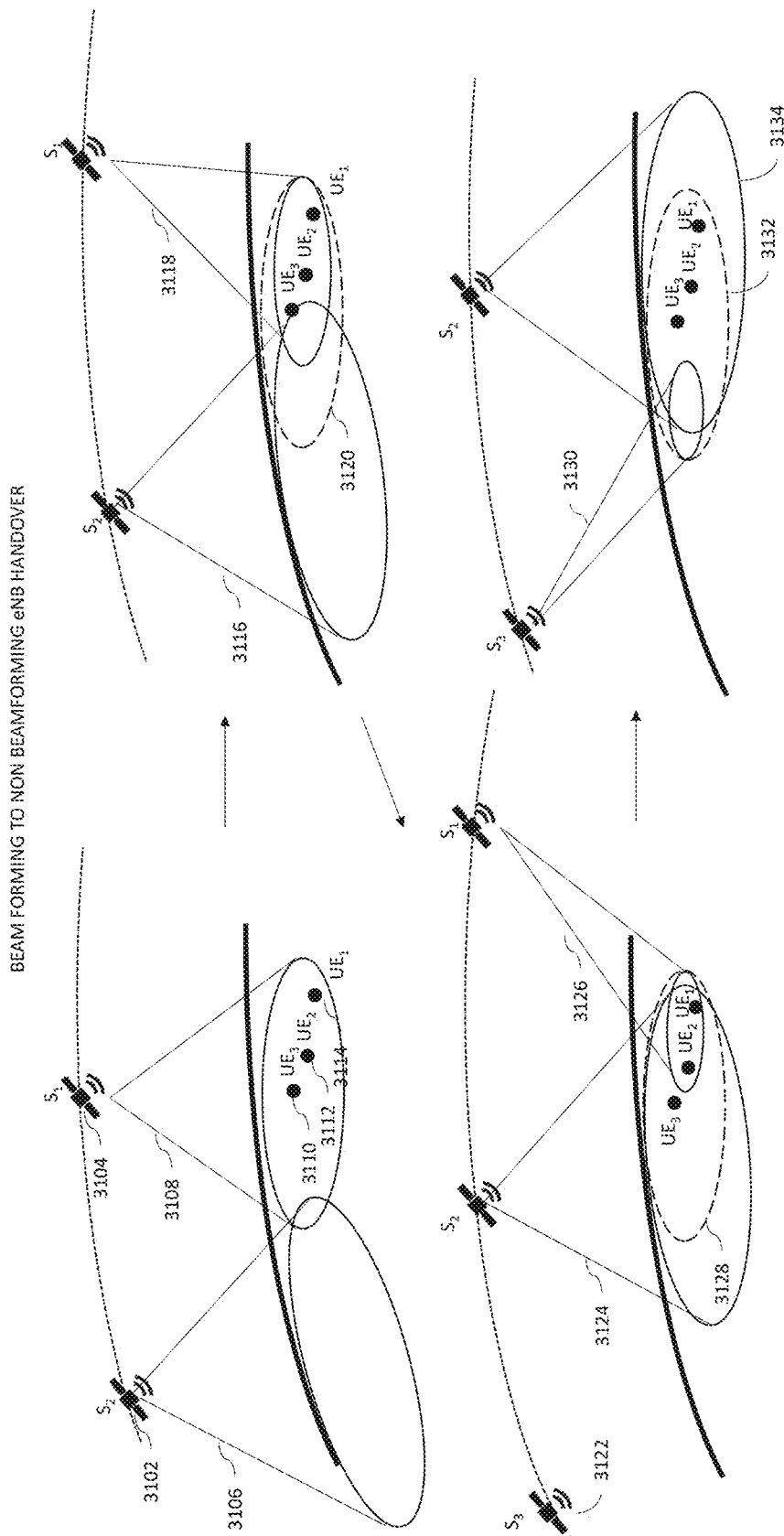
FIG. 31 illustrates an intersatellite handover of base stations with beamforming antennas to base stations with non-beamforming antennas, and back to a base station with a beamforming antenna.

FIG. 31 illustrates how a handover may occur between satellites that do and do not have beamforming base station antenna technologies. This technique would be valuable as the space network is upgraded, incrementally, from satellites with non-beamforming satellites to those with beamforming arrays. As a result, both co-exist. A first beamforming satellite 3104 may provide coverage to $UE_1$, $UE_2$ and $UE_3$ (3110, 3112, 3114) using a beam 3108. A second non-beamforming satellite 3102 may be trailing the first satellite, or moving toward its static base station coverage polygon, which transmitting a beam 3106. After some time, the second satellite beam 3116 may begin to overlap with the static base station coverage polygon 3120. The first satellite may know this from ISL connections, or from the state space predictor, and reduces its transmit power and shifts its beam 3118 toward the front edge, away from the second satellite beam (which it would have knowledge of because of the state space database). Slowly, the first satellite reduces its beam power 3126 and hands over UEs to the second satellite beam 3124 as it continues to overcome the static base station polygon 3128. In this figure, UE 3 is the first to be handed over. As the beam is reduced, it may continue to incrementally shift to keep coverage of UEs it needs to until a handover is made.

Additionally, there may be a third satellite 3122 (beamforming) behind the second satellite. Eventually the first beamforming satellite beam goes away and the second satellite has nearly full coverage of the static polygon 3132, with its dynamic beam 3134. However, the third satellite may begin transmitting a beam 3130, which starts at the back end of the second satellite beam and is planned to slowly grow into the static base station polygon coverage zone and take over control of covering the UEs.

Figure 32:
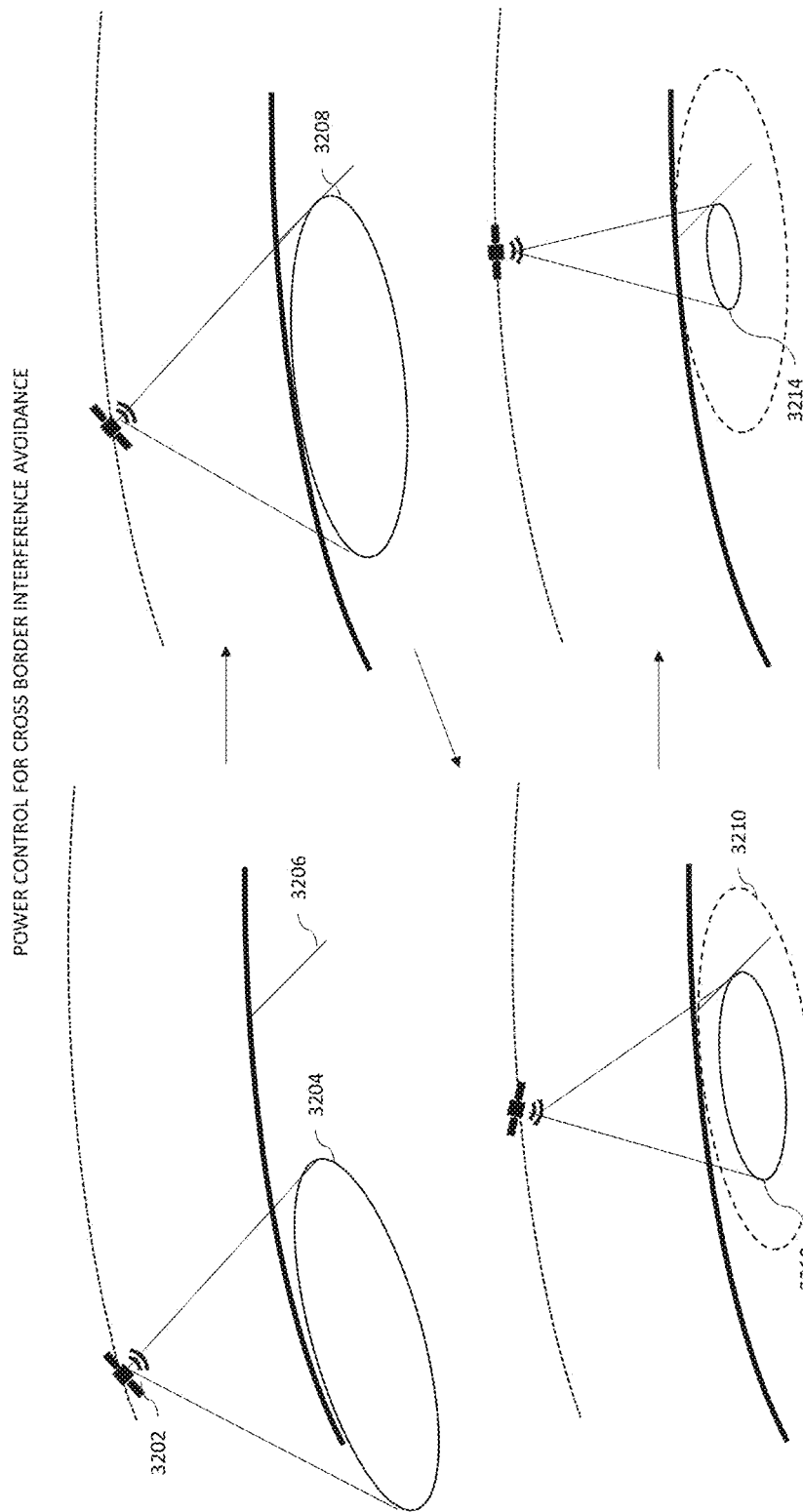
FIG. 32 illustrates how a satellite base station may implement a variation in transmit power to avoid cross border interference of its spotbeam based on regulatory requirements.

FIG. 32 illustrates how the network may transition use of spectrum in a given license geography. These non-beamforming satellites 3202 may generate beams 3204 that cover a dynamic polygon. There may be an approaching border line 3206 where the satellite cannot transmit over on a certain frequency. Eventually the satellite spotbeam reaches the border 3208. As the satellite continues to move, it reduces transmit power on its beam 3212 to ensure that it does not radiate interfering energy across the border. If radiating at normal power, the beam might provide coverage past the border 3210. As the satellite approaches the border further, the spotbeam 3214 is further reduced until the border proximity prevents the satellite from transmitting at all Another embodiment the satellite may rotate its attitude to turn back and continue to provide coverage of the correct side of the border. Any embodiment where the spotbeam is modified to accommodate a border edge via attitude or transmit power, or some other method is relevant to the invention.

I. Enhanced Base Station

The enhanced base station may offer several improvements over a standard base station, which enable it for more optimal operations in space and as part of the space network.

Figure 33:
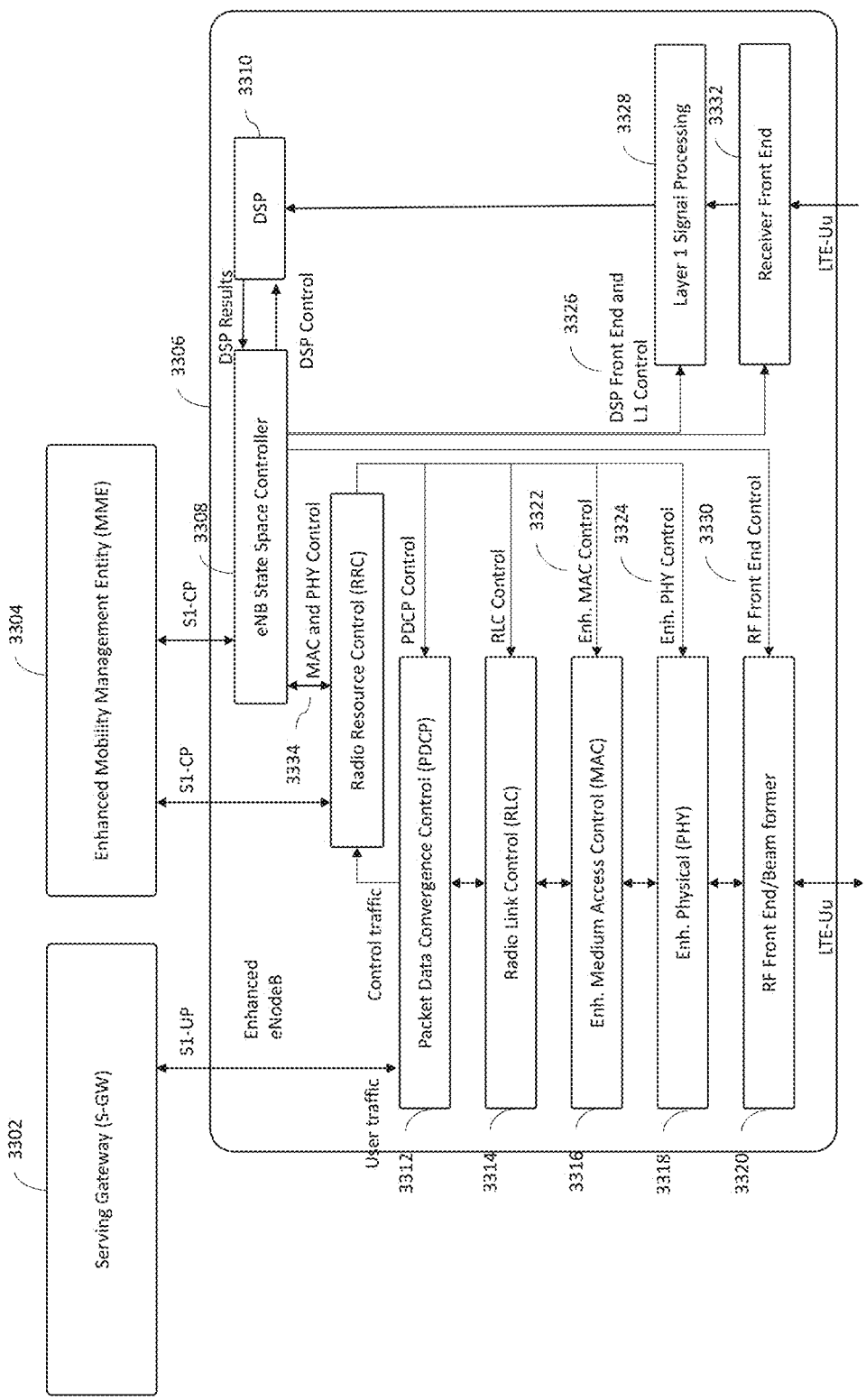
FIG. 33 illustrates an enhanced base station.

FIG. 33 illustrates an embodiment of an enhanced base station 3306. An enhanced MME 3304 may interface with the base station through a standard S1-CP interface, however the base station may operate an additional function called the base station state space controller 3308. The state space controller may receive instructions and itinerary actions from the enhanced MME in order to appropriately operate the base station stack. In particular, the base station state space controller may pass specific MAC and PHY control signals 3334 to the RRC. The RRC may be enhanced to allow for enhanced MAC control 3322 and enhanced PHY control 3324 so that the air interface can manage the Doppler shift and propagation delay over the base station LTE-Uu link to UEs. The enhanced base station stack may include an enhanced PHY 3318 to receive the enhanced commands, an enhanced MAC 3316, a radio Link control layer 3314, the packet data convergence control layer 3312, and connections with the user plane to a standard S-GW 3302. The base station state space controller may also be programmed to dynamically control 3330 the RF front end/beamformer 3320. This may involve steering beams during overpasses and, or switching into various filter banks, LNA stages, and amplifier stages in order to transmit and receive on the desired frequency band that the base station is operating on over that location of the world.

The base station state space controller may also control 3326 a DSP function. The enhanced MME base station may include a receiver only front end 3332 to support spectrum analysis functions. There may also be a Layer 1 signal processing block 3328 which is used to filter or sample the desired RF. The results of the sampling may produce I and Q from the RF sample and be passed to a DSP block 3310. The DSP block may be controlled by the base station state space controller and the results of analysis may be passed back to it from the DSP block. This information may be passed back to the enhanced MME for network mobility management functions (such as tracking UEs based on Doppler Shift and delay measurements). The base station state space controller may act as a stand in scheduler for the base station as well, effectively implementing the dynamic control needed for spectrum slicing and sharing amount satellites and terrestrial cells based on the state space predictor engine output.

I.1 Enhanced MAC and Enhanced PHY

An enhanced MAC and enhanced PHY layer modifying a typical 3GPP base station protocols might be as described in Speidel I. The enhancements described there may be generic to operations of satellite platforms, but may have configuration differences depending on which sections of a satellite field of view is being provided coverage to. Dynamic changes in frequency (and thus different Doppler cell contours depending on region of operation) as well as beamforming antennas (and thus dynamic ranging between the nearest and furthest target as well as absolute Doppler shift across the spotbeam) might be implemented for enhancements to the MAC and PHY controls.

Based on state space predictions and itineraries resulting from the enhanced MME, the base station might accept dynamic control of what is described in Speidel I. This dynamic configuring can be controlled by the base station state space controller, which effectively acts as the base station scheduler.

As defined in Speidel I, the Doppler shift of the signals from UEs to the orbiting base station can be monitored for Doppler shift and propagation delay without specific implementation of functions of the UEs. The Doppler Shift and propagation delay could be measured at the PHY and passed back up to the base station state space controller. This allows the satellite to position the UE to within one of two small grids within the entire footprint of the satellite. The location of these grids can be symmetric to each other about the vector defining the satellite's velocity vector. As the measurement for Doppler shift and propagation delay gets more and more accurate, the size of this grid can converge to two single points. When the satellite footprint comprises more than one spotbeam, the spotbeam that was used to conduct the communications with the device can be used as the piece of information to break the tie on where the UE is in an approximate GPS location. This can be computed because the GPS position of the base station in orbit may be known and the vector describing the position of the user with respect to the satellite velocity vector is known. With this information, the GPS position of the device may be computed. This GPS position can be stored as an additional element in the VLR, or HSS, used by the MME in the space-based network.

When a satellite footprint comprises one spotbeam, the exact location can be computed based on a second Doppler and propagation delay sample from another satellite orbiting over the UE in a slightly different geometry, as described herein.

I.2 Spectrum Analysis Capability

The spectrum analysis capability on the Enhanced base station comprises the additional elements DSP 3310; Layer 1 Signal Processing 3328; and receiver front end 3332. Together, these elements can be configured to generate a data set that can be passed back to the Enhanced MME through the base station state space controller to inform the interference table 1914 for link budget calculations. The receiver front end may be configurable to focus in particular bands of interest and may be similar to the front end used by the base station PHY. The front end may be responsible for filtering and low noise amplification of signals across some resource blocks of interest. The Layer 1 signal processing may perform the A/D conversion and digital filtering of the signal. This may involve an FPGA, which can be reprogrammed or reconfigured by the base station state space controller.

The digitally filtered signals, which might be I and Q from RF samples, from the Layer 1 signal processing may be passed back to the DSP block for further processing. If the spectrum analyzer front end is used to digitally sample I and Q, with 16-bit resolution, from spectrum amounting to a 20 MHz block of spectrum, it may need to sample at a rate of at least twice the bandwidth, or higher (e.g., 40 MHz). Since the data does not necessarily need to be demodulated at some bit rate when doing spectrum analysis, the sampling rate could be reduced in some embodiments. At this rate, a 10 ms sample (e.g., 1 LTE radio time frame) of a 20 MHz LTE uplink block will generate 1.6 Megabytes (MB) before any packet overhead or compression procedures. If left to sample continuously, the spectrum analyzer may generate data at a rate of 1.28 Gigabits/s. This may or may not exceed the capability for the spacecraft to downlink raw data at a faster rate than it can sample, and record the data, before it fills up memory, data buffers, etc. As a result, particularly in early phases of the constellation deployment, digital signal processing and compression algorithms may be desired, or even needed, in order to manage the size of the spectrum analysis data, which is the reason for the DSP block.

This block may implement algorithms to reduce the size of the data collected by doing a computation, or process, that generates some smaller sized numeric dataset to be used as actionable intelligence in the state space prediction engine. For instance, the DSP block may perform FFTs across time slots on certain resource blocks and evaluate interference margins (in dB) above the expected noise floor on the 180 kHz resource block. The interference could be evaluated across time windows and resource blocks and time tagged so that it could be passed back as a matrix of numbers representing interference environments on certain frequency channels at certain times.

The spectrum analysis capability may also be used as a supporting function for positioning of UEs on the network. During the state space prediction engine operations, there may be itineraries generated for base stations that request that they direct a beam and act as a receiver only for a static polygon that is being covered by another base station (either beamforming or non-beamforming).

The first base station may be the one scheduled to provide coverage to the static polygon, during this coverage, the first base station will communicate with UEs over the LTE-Uu interface as a normal orbiting base station might. The second base station may be the one scheduled to perform receive only operations on the static polygon. The first base station and the second, receive-only, base station may operate in different orbits, or perhaps behind each other in the same orbital plane. The two base stations may have a connection between each other either through ISL, or through GSL. These links may be used for the first base station to communicate framing/timing information to the second base station so that it can know where to scan in frequency and time to receive control channel, or traffic channel, signals from the UE intended for the first base station. If there is no intersatellite link, or ground station link, the second, receive only base station, may have an itinerary that receives RF spectrum over a time frame and records raw I and Q which is time stamped so that it can be post processing later after time stamps are known for uplink signals from UEs at the first base station (e.g., from log files stored in the Historic Network State Space Database). Based on the received RF from the UE at both satellites, the Doppler shift, propagation delay (or the variation between them), and the GPS positions of each base station at the time of each measurement can be used to compute the position of the UE in GPS coordinates.

I.3 Base Station State Space Controller

The base station state space controller is the central orchestrator for the base station enhancements. The base station state space controller receives information about RAN itineraries from the Enhanced MME and uses this information to coordinate operations among the base station eNB. This may comprise base station front end/power control and configuration, base station radio resource control, downlink control channel configuration, handovers between eNBs on the satellite and on other satellites, and spectrum analyzer control. In addition to receiving itinerary data, the base station state space controller also reports back to the Enhanced MME with data on Doppler Shift, propagation delay measurements for UEs so that positions can be computed. It also reports back on results of DSP analysis to inform the interference data base 1914.

I.3.a PSS, SSS, and Cell IDs

Initial access to the base station by the UE first starts with synchronization to the downlink base station slot and frame timing using synchronization signals transmitted by the base station on downlink control channels. The primary radio frame synchronization channels (P-SCH) and secondary symbol synchronization channels (S-SCH) use six central resource blocks in the frequency band (1.8 MHz) dedicated to the transmission of primary (PSS) and secondary synchronization signals (SSS) every 5 ms. The PSS is one of a set of 3 length-62 Zadoff-Chu sequences (with one zero subcarrier at DC) known to the UE. At only one time instant will the UE cell searcher/synchronization signal correlator indicate that the cyclic shifted sequence is correctly synchronized with the PSS timing reference signal. The SSS is generated from a pair of known m-sequences offset according to the cell group id [0, . . . , 167] and sector id [0, 1, 2] that together form the logical and normally physical cell-ID. As a result, there can be a total of 168*3=504 unique cell IDs. These synchronization signals also serve for the UE to identify a cell, among other cells that are sharing this center 6 RBs in the frequency band. In the 4G LTE terminology a 9-bit cell ID identifies the cell in a radio network and is encoded in the code sequences that form the synchronization signals.

The UE ultimately uses the reference signal to determine downlink control information and CRC checks to decode the information provided to the UE on other downlink control channels such as the physical broadcast control channel (PBCCH). The information that is decoded which is the Master Information Block (MIB), SIB1, and SIB2. SIB1 is identical for decoding SIB2, which informs the UE where the initial uplink transmit locations are (e.g., frequency block and timing).

One or more UE's will send a preamble on the Physical Random Access Channel (PRACH) after synchronization with the downlink channel. The PRACH procedures include contention resolution procedures if and when there is a collision between UE's transmitting identical preambles in the same time slot.

To share spectrum with the terrestrial network, but use the same center 6 RBs, or 1.8 MHz frequency as the eNB tower cells on the ground. The space base station may have pre-existing knowledge of what resource blocks are to be treated as control blocks and what other resource blocks do not get used as control blocks. Furthermore, since there are 504 cell ID options in the network, the space network may be allocated some finite number of them, ideally greater than four, so that frequency reuse patterns could be used between non beamforming satellites coverage areas. If less satellites exist where overlaps are less common, fewer cell IDs may be allocated to the space network. These cell IDs may possibly be dynamic over time in orbit and the itineraries would be implemented by the state space controller in the base station.

Additionally, the network would only allocate certain resource blocks, by spectrum slicing between the satellite network and the terrestrial network. In this way, satellite base stations are allocated certain resource blocks, time slots, or swaths of resource blocks and time slots, and the terrestrial towers on the ground are either prevented from using those resource blocks, or swaths of resource blocks, or are programmed/controlled to share them when the space base stations are operating them within a distance that creates interference with the terrestrial eNBs.

A space-based communications system described by the disclosure might be best implemented as an extension to existing mobile terrestrial networks. Where an instance of their Core and RAN elements are hosted on space-based infrastructure to extend their terrestrial coverage, but do so with the same spectrum as their terrestrial coverage, for the same devices, and allowing it to behave appropriately with existing terrestrial spectrum/waveform deployment. In this scenario, these resource block and PSS/SSS signals, or cell IDs, may need to be coordinated with MNOs on the ground. They may be coordinated dynamically, where the MNO can digitally inform the space network NOC of changes to the policy, QoS, etc. requirements for the polygons that may be a part of its mesh. As a result, this would be implemented in the Enhanced MME for future state space predictions and itinerary generation, and the base stations would conduct communications accordingly over the air interface using the state space controller in the base station.

I.3.b Tracking Area Codes

One of the most critical elements of the RAN itinerary is the downlink control channel configuration as this can be used to trigger certain behaviors in the UEs, which the network may want to control in a particular way. A particular example of an important downlink control channel configuration is the tracking area code.

In the network in space, base stations may operate in LEO, and can experience quick overpass windows between satellites and UEs. Typically, in a cellular network, the positions of UEs are traced based on the tracking area logged in the HSS. Generally, the location logged in the HSS is an address for a specific tracking area, provided coverage by a specific base station, or set of base stations. The cellular network therefore only tracks the specific cell that a user is in when operating in the network, and does not have exact position location (the user could be anywhere in a large, 35 km, cell, or group of 35 km cells). Sometimes cellular networks cannot locate users to within a better fidelity than a state county.

The satellite network may have a satellite overpass the UE every several of minutes (perhaps 1, 5, 10, 30, or 60) depending on the relative positions of the satellites in their orbits. If every satellite in the network operated as a network-in-a-box and hosted its own MME and S-GW, UEs would perceive a network tracking area change every time a new satellite would provide an overpass. As a result, the UE would update its location to the HSS every single overpass (e.g., every several minutes). This would generate a lot of relatively useless control signaling overhead for the network since, from the network's perspective, the device really is not moving very much, or even at all.

As a result, the satellites might need to maintain some semblance of network consistency with respect to the ground. Since the user on the ground is not moving, the space network would convey to the user that it is not changing its location so that no update request is made when it is superfluous.

When the base station transmits on the downlink control channels, it transmits its tracking area code in SIB 1, which the UE receives and uses to know whether or not its tracking area has been changed and it needs to conduct a tracking area update. There are other triggers, previously described before, that trigger tracking area update procedures on the network. This can be used for spoofing the UE to thinking that it has not changed tracking areas on the network even though it is in communication with a new MME every time a new satellite flies over to provide it with service.

As described above, inside the enhanced MME, there may be software that predicts network states and developed itineraries for network operations based on the predicted states. The network might operate each flight computer and satellite in the network as its own IP address (perhaps even static) as an IPv6 network. As a result, it can differentiate the difference in MME, and which MME (or satellite) is providing coverage to each UE at each moment in time. Depending on the location of the satellite (and possibly what static polygon it is providing coverage to at any moment of time) the MIB and SIB information may vary. This may be stored in the CLR where the mesh is informed with SIB and MIB information consistent with a tracking area design implementation around the Earth.

In one embodiment, every single satellite with a base station in the satellite constellation network might transmit the same 16-bit tracking area code on the SIB-1 block on downlink control channels. Each satellite base station may have a different cell ID and other downlink control information, but in this manner UEs would not perceive a change in location every satellite overpass and would not use spectrum on the uplink to access the network to conduct a tracking area update with the HSS (either on the ground or on the satellite, or a satellite). From the HSS perspective on the ground, possibly from the UE home network, may perceive the location of the device as "on the space network" and does not need to manage which satellite to send the traffic to if it needs to access the UE. Instead it just knows that the UE is on the MME that it perceives as the "space network" and the traffic would be routed to the MME in the space network corresponding to a central/home ground station. At this node, there would be an enhanced HSS and enhanced MME which together might predict, manage, and store the actual position of the UE in the network (e.g., which satellite is going to provide it coverage) both now and in the future. As a result, the space network can intelligently determine what satellite base station might be the appropriate satellite to deliver the traffic to and exactly what route to send it on to get there in the most optimal way (e.g., fastest route, most balanced traffic load around network, etc.).

I.3.c Mobile Country Codes and Mobile Network Codes

The space network may be implemented to broadcast the mobile country codes or mobile network codes of the operators who it is partnered with. Alternately, the space network may be allocated its own unique mobile country code and mobile network code which it uses across the Earth.

J. The Enhanced HSS

Database management procedures and functions in the space network can become particularly important when the network is configured to operate in orbit. For instance, the HSS, which is used to locate, authenticate, bill, provision services etc. to users is classically located away from the BTS and BSC functionalities in a terrestrial network. In many cases, the existence of an HLR is limited to only a few locations within the network as the validity of its "state" is highly important for proper network functionality. While service provisioning and billing could be completed on orbit, these functionalities need not necessarily be and can likely remain on the ground with the classical implementation. However, since the space network may comprise LEO satellites, the interaction time between a mobile device and the particular base station it is communicating with in the space network may be limited to a very short time window (perhaps minutes, or sometimes, less than one minute, depending on orbit configuration, link budget, and coverage footprint design of the satellite, and where the UE falls within the spotbeam, etc.).

As defined in Speidel I, and described briefly herein, the signals from UEs to the orbiting base station can be monitored for Doppler shift and propagation delay to determine the GPS position of the UE. As a result, the state space prediction engine can easily determine exactly which beam on exactly which satellite is planned to provide coverage to the UE in the future. This information can be saved in the HSS as an extension of the state space database. A standard HSS may be preserved so that queries to it can be made naturally. However, a separate function may exist that checks the clock and the latest state space database for the network to update the fields in the HSS for each IMSI under its provision. This HSS database, might be internal to the space network and not treated as a master, simply as a "check" for the instance when the network specifically needs to access that UE. A master HSS for the UE may be kept on the ground and be treated as the master HSS where each query for that UE are directed initially. Upon determining that the "space network" is servicing, or last serviced the UE, the traffic may be routed toward the ground node in the "space network", where it may then determine, what satellite to route the network traffic to be based on this internal only network mapping of tracking area codes with time.

J.1 Authentication Strategies

If authentication and network access granting procedures might be conducted through the ISL and then back down to the ground to bounce a query against the HSS on the terrestrial home network, the process may extend longer than any single overpass time. If the constellation is designed for ubiquitous coverage, then the response procedure may come back to the user on the ground through the next satellite that overpasses it. If authentication takes longer than the overpass period, the network can compute which satellite in the network may be the next available satellite to complete the authentication procedure. This might allow for a handover during authentication to manage the authentication procedure with the device while it is moving from connectivity session to connectivity session with different satellites before the procedure is complete.

J.1.a In-Orbit Relay for Centralized ISL to Support Rapid Authentication

The following technique could be used in the case of a fully ubiquitous system and also in the case of a small fleet of dispersed cellular nodes.

J.1.a(i) GEO, MEO, and LEO Relays as P-GW Extensions

An orbital relay could be used as an "always-one-way" intersatellite link from the satellites in LEO (or providing the air interface to the UEs on the ground) to the P-GW in the ground networks. The orbital relay P-GW (or could simply be a bent pipe or relay to a P-GW on the ground), communicating with each satellite "network-in-a-box". In this case, the P-GW might operate in a higher orbit, perhaps LEO, MEO or GEO or farther. With a further satellite relay, more view of the ground is available and fewer ground stations may be needed for global coverage of the relays. With this technique, every satellite in the LEO network would have access to a Ground Station gateway to the terrestrial cellular networks over a ~250 ms latency communications link (250 ms for speed of light latency from the LEO satellite to the GEO satellite and down to the ground station).

Voice latency requirements of 200-300 ms one-way could suffer under this relay link because the calculation does not include processing times or latencies through the ground network after hitting the ground station and before being sent to the terrestrial core network on the ground. These latency requirements are more than satisfactory for messaging and data services, however.

For continuous connectivity to the ground using GEO orbital relays might use four P-GW nodes, or P-GW relays, in GEO orbits.

J.1.a(ii) Relays as MME/S-GW for Network

Alternatively, the orbital relay could house the entire core network and serve as an MME/S-GW node (holding the VLR and HSS) for the entire LEO system, which would then comprise base station satellites. This could reduce the complexity of the many satellites in LEO and shift heavier core network functionalities to fewer, more capable, longer lifetime, satellites in higher orbits.

In both cases of using orbital relays, the ground station locations could be selected in very close proximity, or at the same location, as the HSS databases of the various roaming partner networks. Specifically speaking, the HSS database of various roaming partners, may be stored on high orbit satellites for storage and access easily from any satellite. This might be provided as a service even for MNOs to have more optimal service from the space-based network to their subscribers in remote areas where their terrestrial networks do not reach. With a proximal downlink location to the ground for the relay link, the authentication query can be completed more quickly and avoid links through a slower connection such as the SS7, etc.

J.1.b HSS Authentication Caching

The following is generic to orbital configurations. In other words, this implementation could be used via a sole LEO network, or in a network with additional relay satellites. A space-based cellular network comprising an HSS and/or VLR on orbit may be relevant.

Typical roaming authentication involves the visiting network to query the home network HSS to gather the needed authentication information every time the UE might authenticate. Generally, this is done every time a visiting subscriber roams onto a network that is not its own. In theory, the visiting network could cache the results of the query to the home HSS and save the authentication information for that IMSI in a database. With authentication information cached, after the first successful authentication procedure to the home network HSS, authentication could happen on orbit via a stored satellite HSS, from there on out. In this way, the handover technique could be used initially to get the IMSI through the first authentication procedure through the ground. The second attempt onward could rely on an on-orbit database for rapid authentication.

If the IMSIs that are authorized to use the satellite network are known in advance, or become known over time, the procedure for authentication could be spoofed to the home network HSS in advance of the first query from the device. This way, the results of the faux query (the "authentication vectors") can be cached and saved in the on-orbit HSS and AuC databases before the first authentication procedure occurs. This way every authentication procedure can occur on-orbit via a stored HSS-AuC of the necessary AuC information.

J.1.c Authentication Spoofing

In the case of avoiding a connectivity session to the ground entirely, the network could also spoof the authentication process. In other words, many users that attempt to authenticate to the network, are put through the authentication procedure with the base station. However, the space network may use computed, or stored, "dummy" authentication vector values (as if queried from the HSS) and pass them to the UE. The result of the authentication procedure using these authentication vector values may allow for device authentication to the network and the network just knows to allow authentication for a user based on IMSI.

J.1.d On-Orbit Authentication

The space network may employ a full HSS database for users that are provisioned to use its service on board each satellite. In this configuration, the space network may indeed be the home network and actually store the UE keys. This way, when a user tries to authenticate to the network, the satellite does not have to use an intersatellite link or feeder link to the ground, it simply queries in the on-orbit database to gather the needed authentication vectors (from the AuC) and can complete authentication in a rapid fashion (seconds, or less) and within the time of a given overpass for a user.

K. Application Servers/IMS Core on Board Satellites

Description of running instances of application servers on board satellites to serve as rapid IP bearer creation for store-and-forward of IP packets between two instances of the application layers in a PDN Server.

In some phases of the previously described constellation configurations, there may be intermittent connectivity where remote UEs have access to communicate with a satellite base station, but that satellite base station does not yet have access to the ground network where it can access application servers or IMS servers. As a result, IP traffic may be difficult or impossible to move between the application server and the mobile device, eliminating the possibility to access the Internet or use applications that require back end support. Even in scenarios where the satellite does have access to the ground, it may be fleeting, or require latency between the UE and the PDN server of interest that is not sufficient for useful transmission of data between the UE and the PDN server.

A solution to this problem would be a satellite in the constellation network that hosts a light version of server side code, such that communications could be handled with the UE temporarily enough to load the application and allow data to be requested from the server without there being a time out, or the application failing to load. The satellite constellation may host computers and memory, to employ a virtualized copy, cache, or mirror of "popular" servers accessed by users on the Internet. Computer and memory may even be dedicated specifically for this function, and sold, or rented to companies that manage websites, or applications, that would like to facilitate use, or access, to their service, or website, to users around the globe. Popular websites that operate servers in one country, as an example, are seeing increasing demand in other countries, so much so that a more local instance of the server is needed to relax network bottlenecks and relax DNS traffic on the home server. By placing those cached copies in orbit, their physical propagation around the globe allows for more readily available access to the data needed by remote users that are far away from the original server. These cached, or mirror copies, of the original servers may act as "slave" copies, where the original server acts as a "master" and pushes updates to the "slave" copies of the server. As a result, the servers in orbit may have slightly "delayed", or stale data.

Furthermore, a light version of the application server, or website server, could be used on orbit able to handle accepting IP packets from the device (for instance, as a WhatsApp message from a remote UE). The IP packets could be stored and forwarded to the appropriate ground-based application server where the data packets are received, and the message is unpacked for the intended recipient. Once the message arrives at the server, it could be routed to the appropriate recipient UE in the same way it might in a normal terrestrial scenario. By operating a light version of the server, it may be able to be virtualized onto hardware as small and power-light as a single board computer with a relatively simple processor and small amounts of memory (compared to the actual server hosting the "master" copy).

A similar technique could be employed with the IMS Core, allowing IMS based services, such as RCS, to operate in an extended, light fashion, out on the edge.

L. Enhanced User Equipment (UE)

L.1 Enhanced Network Overpass Prediction

To support functionality with the space based cellular network, the user equipment may benefit from slight enhancements. The UEs may be points possibly in the mesh of the link state space computed by the enhanced MME. As a result, an itinerary could also be created for the handsets on the network as well.

Primarily, based on GPS location, alone, the UE could be programmed to compute its next set of overpasses from satellites, using its own state space prediction engine. Similarly, the spacecraft, radio access, and core network itineraries developed by the enhanced MME on the ground, may define a set of coverage with which the UE would calculate instances of coverage for the current UE GPS location. The state space database for the space network (or pieces of it based on the location of the device) may be pushed to the UE so that it can be stored and used when outside of connectivity and access to the Internet/servers. The UE may also host the network state space propagator on the handset to do the calculations at the edge as well. When outside of coverage of a typical terrestrial cell, the UE may modify its cell search criteria and simply know that an overpassing satellite may be passing over and provide it with coverage in the next 5 seconds, 10 minutes, 30 minutes etc.

The prediction of satellite overpasses could be implemented at the application layer on the user interface side (e.g., a smartphone app). This might allow for the application to predict satellite overpasses and facilitate storing and forwarding data/messages/SMS sent between phones in messages applications. The application would know try to send its message at a particular time, and the software application may command the phone to do that. Additionally, the software application may toggle the airplane mode on the smartphone, which would instantly send the phone into a scan mode (e.g., effectively powering the device on and off) to find an available network.

Prediction of satellite overpasses may be provided by itineraries that inform the control plane between the UE and the network as well. As an example, a typical search procedure for a mobile device UE may be modified to include a timer that checks the time against a provided itinerary for overpasses. Based on the timer, the UE may implement a procedure to scan for a specific LTE ARFCN, bandwidth, PLMN code, and/or Cell ID code from the orbital base station if, for instance, no other terrestrial or orbital base station is available at that time. When outside of typically terrestrial coverage, this may facilitate saving battery power on the device, as it knowns exactly when to begin scanning for newly available network access from the orbiting base station. Furthermore, after connecting to an orbiting base station there may be pre-existing knowledge for how long that satellite will be available to the UE, and based on this duration, the UE may determine what two-way communications are feasible, and perhaps, what should be prioritized for a given overpass. Further to this point, the itinerary may include information about the level of service for a given overpass in terms of radio access technology (e.g., GSM or LTE), data rate expectations, etc., which may drive the devices decision for what applications/data to request/move to and from the network (e.g., on GSM the device may favor SMS/low data rate traffic it seeks to move, while on LTE it may favor applications with higher data rate requirements, etc.

Itineraries provided by the enhanced MME may include a specific time stamp for when the UE should request access to the space base station network, if it needs to conduct a connectivity session with the network or a back-end server/PDN server. The timing described above may be provided to UEs such that their planned network access request signals are time duplexed apart from each other to ameliorate the potential challenge of immediate PRACH activity and contention among UEs. The itineraries may include what PRACH channels are available to that particular UE, or even a set of UEs. Additional control channel signaling may be predicted or automated for the UE as well such as tracking area updates, authentication, L.2 Enhanced Transmit Power UEs may also be enhanced to include an increase in transmit power for the uplink to the base station. The benefit of this disclosure might be that UEs can use standard transmit powers in typical terrestrial cell locations, but in remote areas, where there are no towers to interfere with, the UE may uplink to the satellite at higher power than 200 mW for LTE (and 2 W for GSM).

The transmit power on the uplink may be triggered to go higher based on certain criteria like the MCC and MNC code of the network (e.g., if the network is a space-based network, allow higher transmit powers to support uplink closure). The SIB and MIB blocks are often used to indicate to the UE what the maximum transmit power is allowed on that cell. The space network base stations may be allowed to send a higher value than the terrestrial cells, which the UEs may be enhanced to understand and accommodate.

Existing UEs may be compatible with GSM and LTE protocols. As such, there may be existing configuration settings that can leverage the 2 W peak transmit power allowed in GSM to be used in LTE communications.

This may allow for closing the link in high attenuation circumstances. There may be a need for this in the protocol during a disaster when temporarily the device may want to surge power to support closing the link to the satellite above.

L.3 Enhancements to Antenna

Further to improving link budget conditions with the satellites, circular polarized antennas may be used in the enhanced UEs. With a circular polarized satellite signal, a circular polarized antenna may allow for a 3 dB increase in link margin (reduction in polarization loss from 3 dB to 0). This could be done by leveraging the GPS antenna (which is circularly polarized). While existing GPS antennas in mobile devices might not be tuned, or match well outside of the GPS L-Band frequencies, a new antenna could be installed that is both compatible with GPS L-Band channels, as well as near band cellular frequencies (e.g., 700 MHz, 800 MHz, 900 MHz, 1.8 GHz, 1.9 GHz, etc.)

The addition of circular polarization antenna features can work, notwithstanding the fact that multipath effects can degrade circularly polarized signals as signal bounces might create single reflections that no longer have the same polarization as the receiving antenna. As a result, single reflections cannot be easily received, and lacking line of sight communications can become a significant link inhibitor. Sometimes, multipath in terrestrial communications relies on linearly polarized signals, perhaps in multiple linearization angles, to support off angle polarization reception of one of the signals.

Classically with terrestrial systems, line of sight is not available for links because of the horizontal geometry of the link to a tower, thus the link can be modeled as a link with Raleigh fading (where bouncing signals dominate the link). With satellite communications, line of sight can often dominate the link, and circular polarized antennas can become particularly useful. In one embodiment, the circular polarized antenna in a UE may be enabled for communicating with satellites and disabled otherwise. However, the antenna may be able to receive linear signals.

L.4 Enhancements to UE-Base Station Air Interface Protocol

There may be further enhancements to the UEs used on cellular networks where more favorable link budget protocols might be used to support increased coverage of communications between UEs on the Earth's surface and satellite base stations in orbit. This may also be done to support communications between satellites and UEs that are within a building, or under a roof, in a metal container, etc. This may also be used for increased distance of communications with terrestrial towers. The focus of these protocols would be enhanced, or modified waveforms, that are used between the UE and the satellite base stations that either, increase the power spectral density of signals on the uplink, leverage some element of transmission diversity (e.g., frequency diversity, or code diversity), or perhaps leverage some additional signal processing gain for retrieving signals from UEs and base stations from the noise floor.

With orbiting base stations, using NB-IoT between the UE and the orbiting base station may offer a 20 dB increase in link budget by allowing the UE to transmit 200 mW of signal power across only a single 15 kHz subcarrier on the LTE protocol. By using the existing LTE resource block structure, modifications to the existing UE hardware implementing the baseband waveforms may be implemented to support NB-IoT from the UE.

There could be embodiments where the NB-IoT protocol is only used on the satellite network. Alternatively, there may be embodiments where the NB-IoT protocol is only used on the uplink to the satellite, but a different RF interface, such as LTE is used to communicate on the downlink (and sufficiently more power is used on the downlink to close the link that direction only).

There may be further embodiments where the UE is enhanced by some protocol that leverages either existing cellular bands, WiFi bands (2.4 GHz), or ISM bands (902-928 MHz), to communicate using some coded, or frequency hopped, signals that spread a low data rate signal over some bandwidth to provide a mechanism for communication with UEs under significantly restricted communication links (e.g., in basements, in buildings, in areas of significant RF interference).

M. Description of Alternate Enhancements

There may be an embodiment for an enhancement to the network described above where a UE is equipped to communicate on higher frequencies being allocated for the 5G NR air interface in the Ka, or Ku band. At these frequencies, antennas can get very small, but path loss can become exceeding large, particularly when using satellite communications from orbit to the ground.

In a scenario such as this, the UE may not be able to close the link on the uplink with the limited transmit power and reduced antenna gain on the device. However, satellites may be sized sufficiently enough that they may be capable of Ku or Ka band communications from orbit down to the UE, but not the other direction (without equipping the UE with substantially more transmit power and possibly beamforming capability).

In this instance, the communications network in the present disclosure might implement an asynchronous, in frequency, communication operation, where lower frequency cellular bands allow for a low data rate uplink to close from the UE directly to an orbiting eNB. On the uplink, the device may request access to high data rate downlink services (such as seamless movie streaming, or large data sets to download from the internet). The eNB in the satellite network may be able to communicate two ways with the UE on the lower frequency cellular bands, while also be enhanced to assign a set of downlink resource blocks, carriers, timeslots, etc. in an orthogonal frequency band (such as Ka or Ku band) with the capability of providing a high power, possibly beamformed downlink signal to the UE to provide the high data rate requirements requested by the service.

The downlinking satellite may even be a spacecraft that is different from the satellite base station that received the UE uplink signals. The downlinking spacecraft could be placed in LEO, MEO, or GEO, depending on characterization of the link budget and the requirements for closing at desired data rates.

There may be an embodiment for a cellular space network deployed for a use case where a thin uplink channel is needed to enable a large downlink channel. As an example, there may be a device that can receive high throughput satellite downlink data from GEOs (for entertainment) on a vehicle like a car. However, the vehicle may have no way to communicate back up to the GEO satellite to control the downlink. A cellular modem could be used to connect the car in a thin uplink to send a command to perform specific high throughput downlink from a GEO.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques, in an Earth-based platform or an orbital platform. Various forms of media may be involved in carrying one or more sequences of one or more instructions to a processor for execution. For example, the instructions may initially be carried on a magnetic disk or solid state drive of a remote computer. The remote computer can load the instructions into its dynamic memory and send the instructions over a network connection.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

Example Clauses

Embodiments of the disclosure can be described in view of the following clauses:

1. A cellular network management system, comprising: a first database table of first node records, wherein a first node record represents a terrestrial base station and the first node record includes operational details of the terrestrial base station; a second database table of second node records, wherein a second node record represents an orbital base station and the second node record includes operational details of the orbital base station; a state space prediction computer that computes link budgets for connections to base stations represented in the first database table and base stations represented in the second database table, to form a dataset of network usage; and a state space database including a plurality of state space records, at least some of which are derived from the dataset of network usage, wherein a state space record of the plurality of state space records indicates, for a plurality of mesh points in a coverage area, which active base stations provide link services within the coverage area and which deferring base stations pause their use of a shared protocol and shared frequency bands shared by the active base stations.

2. The cellular network management system of clause 1, wherein the deferring base stations pause their use of the shared protocol based on allocations of network resources, wherein the allocations of network resources exclude allocated network resources allocated to orbital base stations, thereby resulting in the deferring base stations pausing their use without requiring programming the deferring base stations for awareness of pause requests.

3. The cellular network management system of clause 1 or 2, wherein the active base stations comprise at least one active orbital base station and wherein the deferring base stations comprise at least one passive terrestrial base station, wherein the at least one passive terrestrial base station is in a passive state based on the dataset of network usage when the at least one active orbital base station is predicted to provide coverage for the coverage area.

4. The cellular network management system of any of clauses 1 to 3, wherein the space prediction computer includes logic to take into account an Earth gravitational model, an Earth atmospheric density model, a magnetic field model, spacecraft capability models, and/or antenna radiation pattern models in predicting future coverage of the orbital base station.

5. The cellular network management system of any of clauses 1 to 4, further comprising a coverage database comprising mesh points and polygon coverage areas, wherein polygon coverage areas are referenced in the coverage database for respective base stations, and wherein the respective base stations comprise at least some static-coverage terrestrial base stations, at least some static-coverage orbital base stations using beamforming, and at least some dynamic-coverage orbital base stations using dynamic beams that move over the coverage area as the at least some dynamic-coverage orbital base stations move in respective orbits.

6. The cellular network management system of any of clauses 1 to 5, wherein the state space database takes into account coverage dynamics including emerging events for which coverage by orbital base stations would vary based on the emerging events.

7. The cellular network management system of clause 6, wherein the emerging events include predicted natural disasters and the coverage dynamics include increased capacity in areas affected by the predicted natural disasters.

8. The cellular network management system of clause 6, wherein the emerging events include predicted natural disasters and the coverage dynamics include increased capacity in areas based on input data provided by first responders.

9. The cellular network management system of any of clauses 1 to 8, further comprising handover logic that signals to user equipment an impending handover of a link from a first orbital base station to a second orbital base station using signals consistent with terrestrial network handover protocols.

10. The cellular network management system of any of clauses 1 to 9, further comprising handover logic that signals to user equipment an impending handover of a connection to a tunneling link from a first orbital base station to a second orbital base station using signals consistent with terrestrial network handover protocols, thereby maintaining a tunneled data link between the user equipment and a computer system remote from a cellular network managed by the cellular network management system.

11. The cellular network management system of any of clauses 1 to 10, further comprising authentication logic that authenticates a user equipment (UE) device to a cellular network and maintains authentication of the UE device across a handover of a link from a first orbital base station to a second orbital base station using signals consistent with terrestrial network handover protocols.

12. The cellular network management system of clause 11, wherein the authentication logic is implemented in an authenticating orbital base station and authentications are cached for use at the first orbital base station and/or the second orbital base station.

13. An itinerary generator, for use in a cellular network having a plurality of base stations, at least one of which is a terrestrial base station and at least one of which is an orbital base station, the itinerary generator comprising: a first generator for generating spacecraft itineraries; a second generator for generating satellite function itineraries; a state space database that stores the spacecraft itineraries and the satellite function itineraries; a network planner computer that stores static positions for base stations and outputs coverage representations indicating which orbital base station provides coverage for which regions in a coverage area, based on the state space database; and a database distributor that distributes copies of the state space database to each of a plurality of spacecraft network nodes.

14. The itinerary generator of clause 13, further comprising: a command and control system, in communication with the network planner computer, including logic for managing state for orbital base stations usable for adjusting the state space database in response to changes in state.

15. The itinerary generator of clause 14, wherein state for the orbital base station comprises one or more of temperature, power level, fuel level, processor health, and/or radio health, wherein itineraries are adjusted based on the state.

16. The itinerary generator of any of clauses 13 to 15, wherein the state space database includes at least one backup itinerary for use when state conditions preclude use of a previously generated satellite function itinerary.

17. The itinerary generator of any of clauses 13 to 16, wherein the state space database includes itineraries optimized based on one or more of a set of rules or a quality of service requirement.

18. The itinerary generator of any of clauses 13 to 17, wherein the state space database includes itineraries computed for a ground station or an orbital element in the network.

19. A method of determining coverage for a cellular network, comprising: storing a database of mesh points, each mesh point having a position in a coverage area and metadata about service at that mesh point; storing a database of coverage regions, each having a finite area and at least some having polygonal boundaries; assigning the mesh points to coverage regions for an assignment time, wherein coverage regions vary over time based on orbits of orbital base stations; and controlling base stations to provide coverage to assigned coverage regions for assigned assignment times.

20. A method of controlling a mobility management entity comprising: performing physics simulations for orbital mechanics, attitude dynamics, and link budgets to derive a set of future link states of a network managed by the mobility management entity; and determine itineraries for spacecraft operations, radio access network operations, and core network operations based on the set of future link states.

21. A method of managing a plurality of orbital base stations that communicate with user equipment (UE) devices of a cellular network, the method comprising: determining a first coverage area for a first orbital base station of the plurality of orbital base stations; determining a second coverage area for a second orbital base station of the plurality of orbital base stations; determining a modification of signal from the second orbital base station for when the first coverage area and the second coverage area overlap, wherein the modification includes an alteration of the signal that a UE device is programmed to interpret as a loss of signal strength among stationary base stations, thereby triggering a request for a handoff to the first orbital base station.

22. The method of clause 21, further comprising: generating a plurality of mesh points, each representing a location in an overall coverage area; generating a plurality of polygons covering the plurality of mesh of points; for a given mesh point in the plurality of mesh points, determining a link budget; for the given mesh point, determining a set of applicable wireless communication constraints; and for each of a plurality of base station beams coincident with a particular polygon having coverage of the given mesh point, determining beam parameters based on the set of applicable wireless communication constraints for the given mesh point in the particular polygon.

23. A user equipment (UE) device capable of computation and mobile wireless communications, comprising: an operating system; memory, for storing application program code and a node availability table, wherein the node availability table indicates nodes of a wireless network that are predicted to be available at future pre-computed time periods determined, at least in part, on orbital dynamics for nodes implemented in orbital platforms; a processor for executing the application program code and for timing communication processes of the application program code to align with node availability indicated by the node availability table; and a communications circuit, usable for receiving at least a representation of the node availability table and for communicating with the wireless network.

24. The user equipment (UE) device of clause 23, wherein the node availability table indicates nodes of the wireless network that are predicted to be available at the future pre-computed time periods further determined by link budget computations for the nodes implemented in orbital platforms.

What is claimed is:

1. A cellular network management system, comprising:
a first database table of first node records, wherein a first node record of the first node records represents a terrestrial base station and the first node record includes operational details of the terrestrial base station;
a second database table of second node records, wherein a second node record of the second node records represents an orbital base station and the second node record includes operational details of the orbital base station;
a state space prediction computer that computes link budgets for UE-to-base-station connections between user equipment (UE) mobile devices and base stations represented in the first database table and/or base stations represented in the second database table, to form a dataset of network usage; and
a state space database including a plurality of state space records, at least some of which are derived from the dataset of network usage, wherein a state space record of the plurality of state space records indicates, for a plurality of mesh points in a coverage area, which active base stations provide link services to user equipment (UE) mobile devices, at least one of which is located at at least one of those mesh points within the coverage area and which deferring base stations pause their use of a shared protocol and shared frequency bands shared by the active base stations.

2. The cellular network management system of claim 1, wherein the deferring base stations pause their use of the shared protocol based on allocations of network resources, wherein the allocations of network resources exclude allocated network resources allocated to orbital base stations, thereby resulting in the deferring base stations pausing their use without requiring programming the deferring base stations for awareness of pause requests.

3. The cellular network management system of claim 1, wherein the active base stations comprise at least one active orbital base station and wherein the deferring base stations comprise at least one passive terrestrial base station, wherein the at least one passive terrestrial base station is in a passive state based on the dataset of network usage when the at least one active orbital base station is predicted to provide coverage for the coverage area.

4. The cellular network management system of claim 1, wherein the state space prediction computer includes logic to take into account an Earth gravitational model, an Earth atmospheric density model, a magnetic field model, spacecraft capability models, and/or antenna radiation pattern models in predicting future coverage of the orbital base station, and/or a coverage database comprising mesh points and polygon coverage areas, wherein polygon coverage areas are referenced in the coverage database for respective base stations, and wherein the respective base stations comprise at least some static-coverage terrestrial base stations, at least some static-coverage orbital base stations using beamforming, and at least some dynamic-coverage orbital base stations using dynamic beams that move over the coverage area as the at least some dynamic-coverage orbital base stations move in respective orbits.

5. The cellular network management system of claim 1, wherein the state space database takes into account coverage dynamics including emerging events for which coverage by orbital base stations would vary based on the emerging events.

6. The cellular network management system of claim 5, wherein the emerging events include predicted natural disasters and the coverage dynamics include increased capacity in areas affected by the predicted natural disasters and/or areas based on input data provided by first responders.

7. The cellular network management system of claim 1, further comprising handover logic that (1) signals to user equipment an impending handover of a link from a first orbital base station to a second orbital base station using signals consistent with terrestrial network handover protocols, and/or (2) signals to user equipment an impending handover of a connection to a tunneling link from a first orbital base station to a second orbital base station using signals consistent with terrestrial network handover protocols, thereby maintaining a tunneled data link between the user equipment and a computer system remote from a cellular network managed by the cellular network management system.

8. The cellular network management system of claim 1, further comprising authentication logic that authenticates a user equipment (UE) device to a cellular network and maintains authentication of the UE device across a handover of a link from a first orbital base station to a second orbital base station using signals consistent with terrestrial network handover protocols.

9. The cellular network management system of claim 8, wherein the authentication logic is implemented in an authenticating orbital base station and authentications are cached for use at the first orbital base station and/or the second orbital base station.

10. A method of managing cellular network connections between user equipment (UE) mobile devices and base stations in a cellular network, wherein at least one of the base stations is a terrestrial base station and at least one other one of the base stations is an orbital base station, the method comprising:
 recording a first node record in a first database table of first node records, wherein the first node record represents the terrestrial base station and the first node record includes operational details of the terrestrial base station;
 recording a second node record in a second database table of second node records, wherein the second node record represents the orbital base station and the second node record includes operational details of the orbital base station;
 computing link budgets for UE-to-base-station connections between user equipment (UE) mobile devices and base stations represented in the first database table and/or base stations represented in the second database table, to form a dataset of network usage; and
 deriving a state space record, to be stored in a state space database including a plurality of state space records, at least some of which are derived from the dataset of network usage, wherein the state space record indicates, for a plurality of mesh points in a coverage area, which active base stations provide link services to user equipment (UE) mobile devices, at least one of which is located at at least one of those mesh points within the coverage area and which deferring base stations pause their use of a shared protocol and shared frequency bands shared by the active base stations.

11. The method of claim 10, wherein the deferring base stations pause their use of the shared protocol based on allocations of network resources, wherein the allocations of network resources exclude allocated network resources allocated to orbital base stations, thereby resulting in the deferring base stations pausing their use without requiring programming the deferring base stations for awareness of pause requests.

12. The method of claim 10, wherein the active base stations comprise at least one active orbital base station and wherein the deferring base stations comprise at least one passive terrestrial base station, wherein the at least one passive terrestrial base station is in a passive state based on the dataset of network usage when the at least one active orbital base station is predicted to provide coverage for the coverage area.

13. The method of claim 10, further comprising:
 predicting future coverage of the orbital base station, and/or a coverage database comprising mesh points and polygon coverage areas taking into account one or more of an Earth gravitational model, an Earth atmospheric density model, a magnetic field model, a spacecraft capability model, and/or an antenna radiation pattern model, wherein polygon coverage areas are referenced in the coverage database for respective base stations, and wherein the respective base stations comprise at least some static-coverage terrestrial base stations, at least some static-coverage orbital base stations using beamforming, and at least some dynamic-coverage orbital base stations using dynamic beams that move over the coverage area as the at least some dynamic-coverage orbital base stations move in respective orbits.

14. The method of claim 10, further comprising taking into account coverage dynamics including emerging events for which coverage by orbital base stations would vary based on the emerging events.

15. The method of claim 14, wherein the emerging events include predicted natural disasters and the coverage dynamics include increased capacity in areas affected by the predicted natural disasters and/or areas based on input data provided by first responders.

16. The method of claim 10, further comprising:
 signaling to user equipment an impending handover of a link from a first orbital base station to a second orbital base station using signals consistent with terrestrial network handover protocols; and
 signaling to user equipment an impending handover of a connection to a tunneling link from the first orbital base station to the second orbital base station using signals consistent with terrestrial network handover protocols, thereby maintaining a tunneled data link between the user equipment and a computer system remote from the cellular network.

17. The method of claim 10, further comprising:
  authenticating a user equipment (UE) device to the cellular network; and
  maintaining authentication of the UE device across a handover of a link from a first orbital base station to a second orbital base station using signals consistent with terrestrial network handover protocols.

18. The method of claim 17, wherein authenticating the UE is performed by an authenticating orbital base station and authentications are cached for use at the first orbital base station and/or the second orbital base station.

* * * * *